US011249096B2

(12) United States Patent
Takemoto et al.

(10) Patent No.: US 11,249,096 B2
(45) Date of Patent: Feb. 15, 2022

(54) SPECIMEN ANALYZER AND SPECIMEN ANALYSIS METHOD FOR CONTROLLING AN OUTPUT OF A TARGET COMPONENT IN AN ABNORMAL RANGE TO PREVENT ERRONEOUS DIAGNOSIS

(71) Applicant: Sysmex Corporation, Kobe (JP)

(72) Inventors: Seiji Takemoto, Kobe (JP); Takeshi Komoto, Kobe (JP); Hideki Hirayama, Kobe (JP); Takashi Yoshida, Kobe (JP); James Ausdenmoore, Elgin, IL (US)

(73) Assignee: SYSMEX CORPORATION, Kobe (JP)

( * ) Notice: Subject to any disclaimer, the term of this patent is extended or adjusted under 35 U.S.C. 154(b) by 0 days.

(21) Appl. No.: 15/609,270

(22) Filed: May 31, 2017

(65) Prior Publication Data

US 2018/0348241 A1 Dec. 6, 2018

(51) Int. Cl.
*G01N 35/00* (2006.01)

(52) U.S. Cl.
CPC . *G01N 35/00623* (2013.01); *G01N 35/00722* (2013.01); *G01N 2035/00653* (2013.01); *G01N 2035/00891* (2013.01)

(58) Field of Classification Search
CPC ....... G01N 35/00623; G01N 35/00722; G01N 2035/00653; G01N 2035/00891
See application file for complete search history.

(56) References Cited

U.S. PATENT DOCUMENTS

| | | | |
|---|---|---|---|
| 7,427,376 B2 | 9/2008 | Nagai et al. | |
| 7,919,044 B2 | 4/2011 | Fukuju et al. | |
| 7,988,914 B2 | 8/2011 | Fukuju et al. | |
| 8,112,232 B2 * | 2/2012 | Parkhurst | G01N 35/00613 702/22 |
| 2015/0125938 A1 | 5/2015 | Terashima et al. | |

FOREIGN PATENT DOCUMENTS

| | | |
|---|---|---|
| JP | 2004-170156 A | 6/2004 |
| JP | 2015-163904 A | 9/2015 |

OTHER PUBLICATIONS

Coulter HmX Hematology Analyzer with Autoloader Operator's Guide, Jun. 1999, Coulter Corp., Miami, Florida: 128 pages (Year: 1999).*

* cited by examiner

*Primary Examiner* — G Steven Vanni
(74) *Attorney, Agent, or Firm* — Metrolex IP Law Group, PLLC

(57) ABSTRACT

A specimen analyzer includes: an analysis unit which analyzes a specimen collected from a subject and generates an analysis result including a component amount in the specimen; an output unit which outputs the analysis result; and a controller which causes the output unit to output or not to output the component amount based on a comparison between the component amount and a determination reference value.

16 Claims, 57 Drawing Sheets

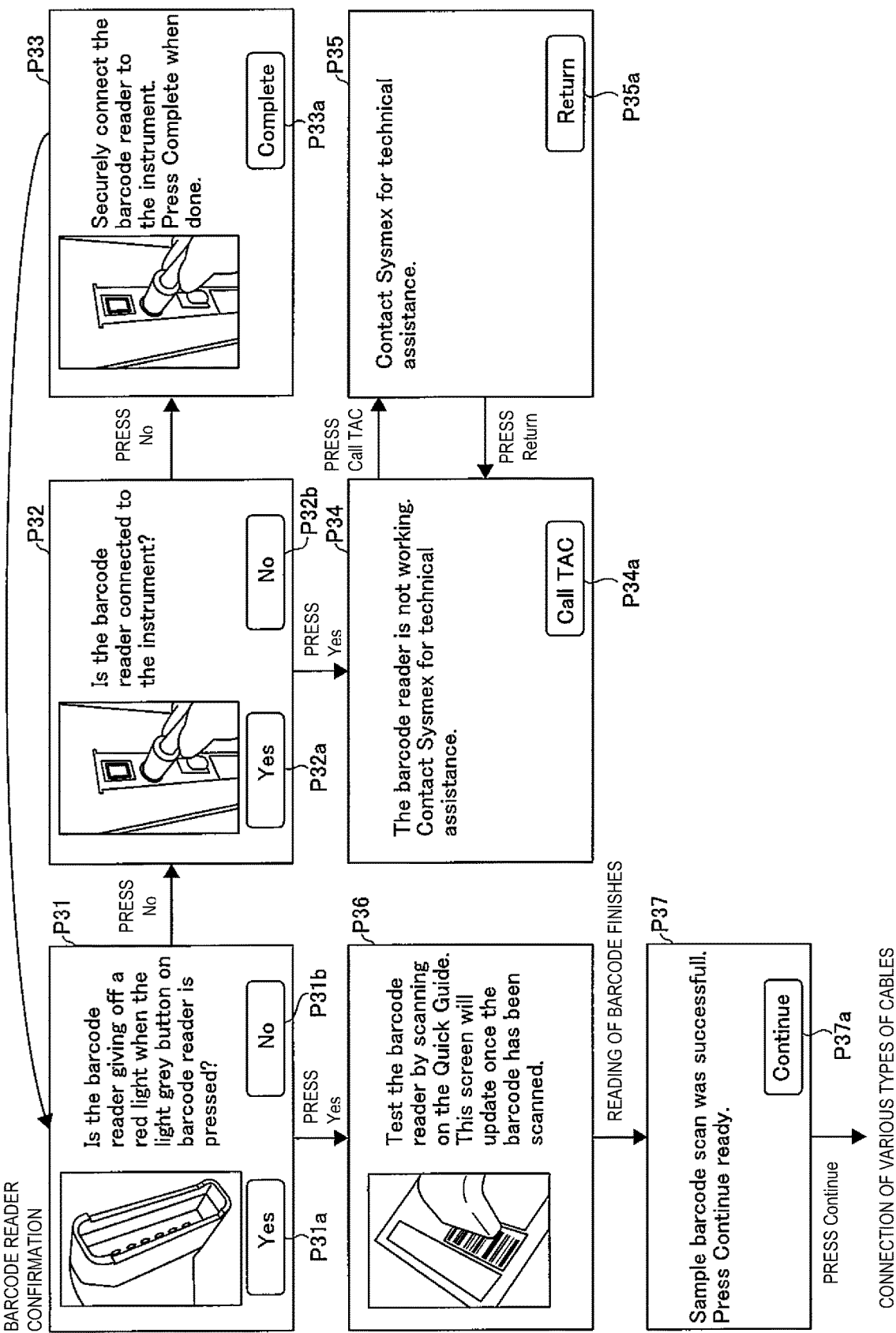

FIG. 14

CONNECTION OF VARIOUS TYPES OF CABLES

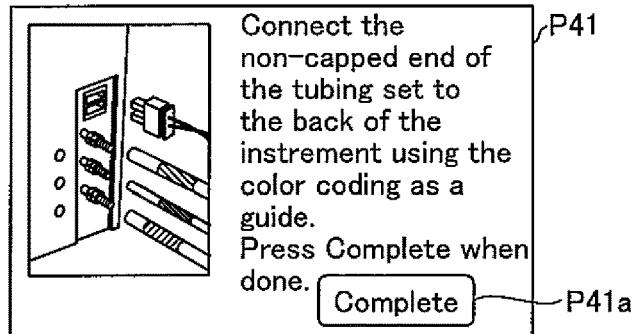

P41: Connect the non-capped end of the tubing set to the back of the instrument using the color coding as a guide.
Press Complete when done. [Complete] —P41a ↓ PRESS Complete

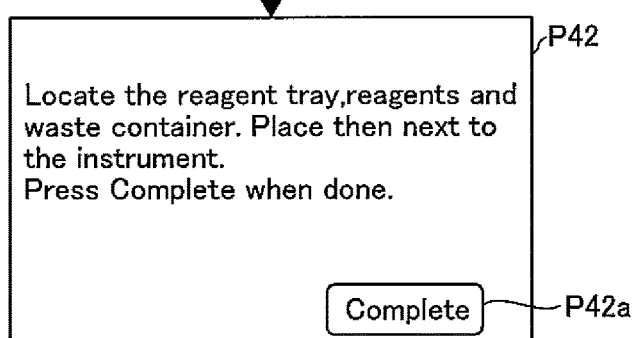

P42: Locate the reagent tray, reagents and waste container. Place then next to the instrument.
Press Complete when done. [Complete] —P42a ↓ PRESS Complete

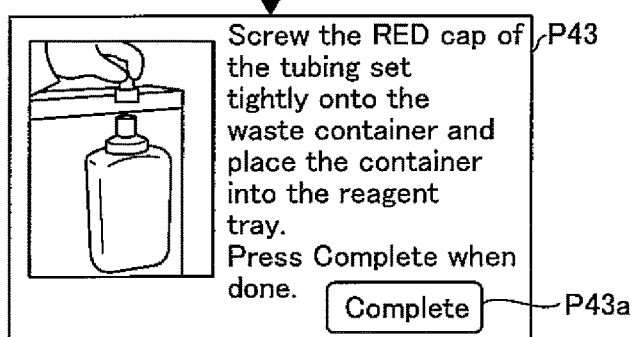

P43: Screw the RED cap of the tubing set tightly onto the waste container and place the container into the reagent tray.
Press Complete when done. [Complete] —P43a ↓ PRESS Complete

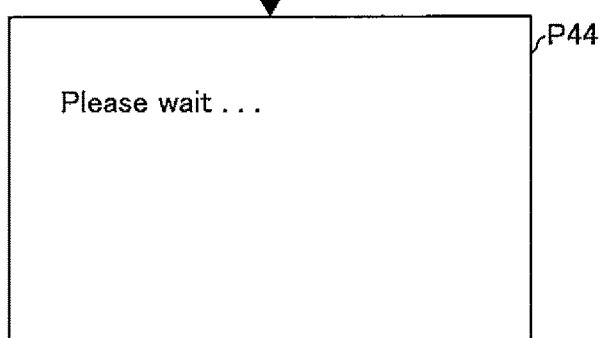

P44: Please wait . . .

↓

REAGENT SETTING

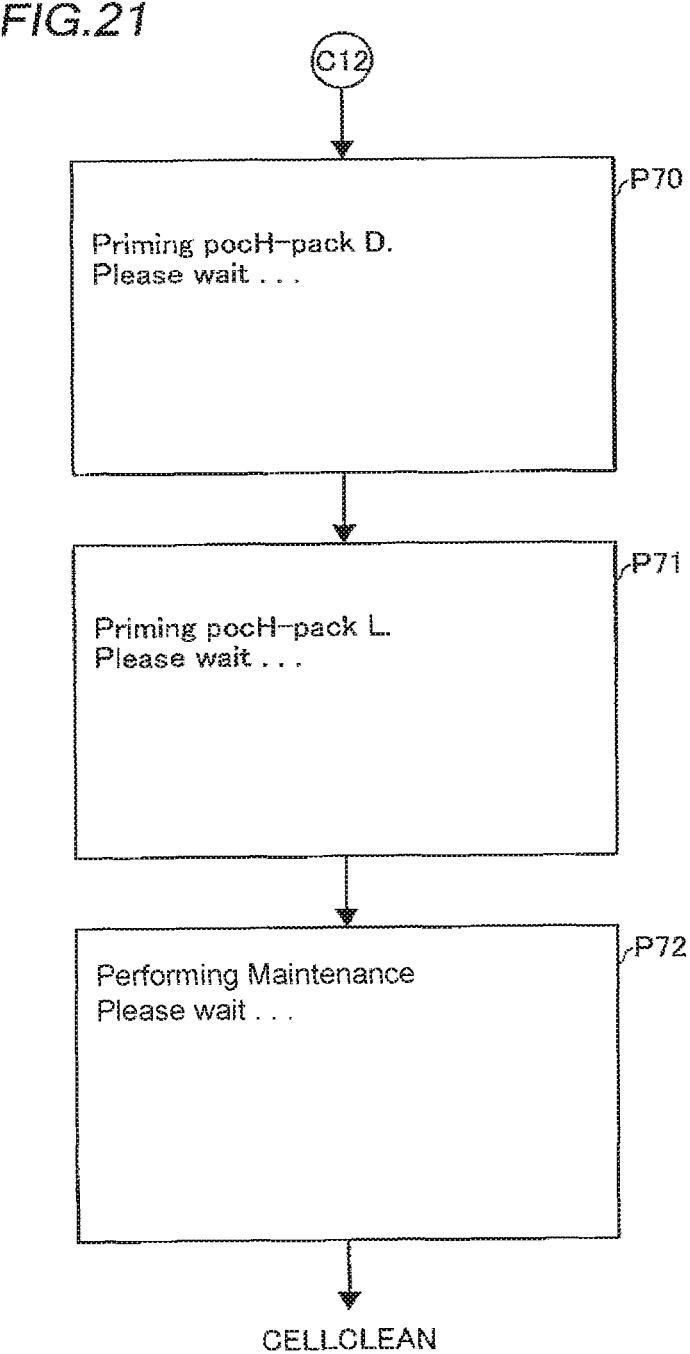

FIG.22

CELLCLEAN

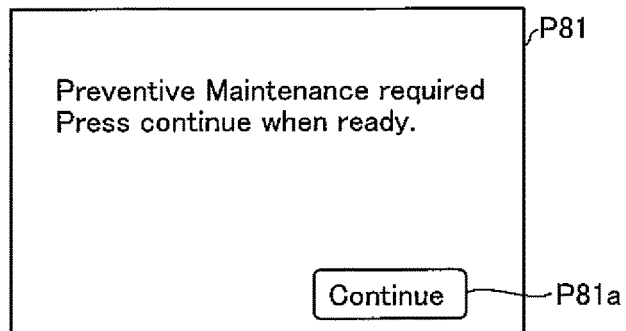

P81: Preventive Maintenance required Press continue when ready. [Continue] — P81a ↓ PRESS Continue

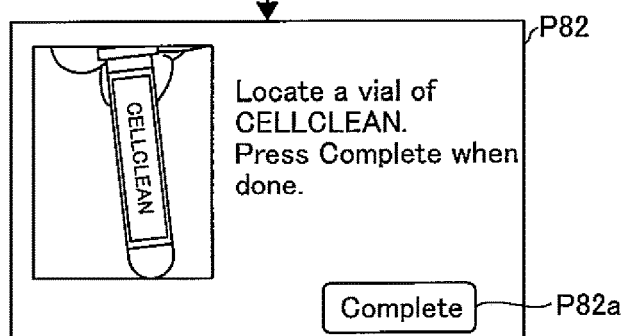

P82: Locate a vial of CELLCLEAN. Press Complete when done. [Complete] — P82a

↓ PRESS Complete

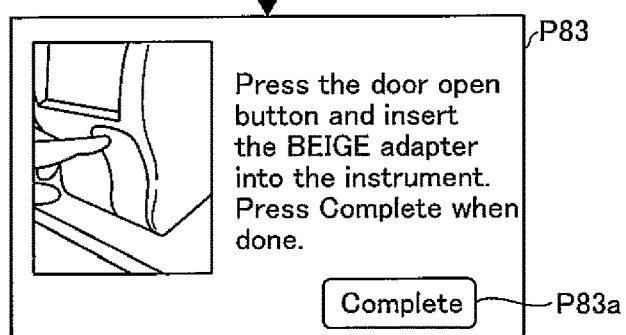

P83: Press the door open button and insert the BEIGE adapter into the instrument. Press Complete when done. [Complete] — P83a ↓ PRESS Complete

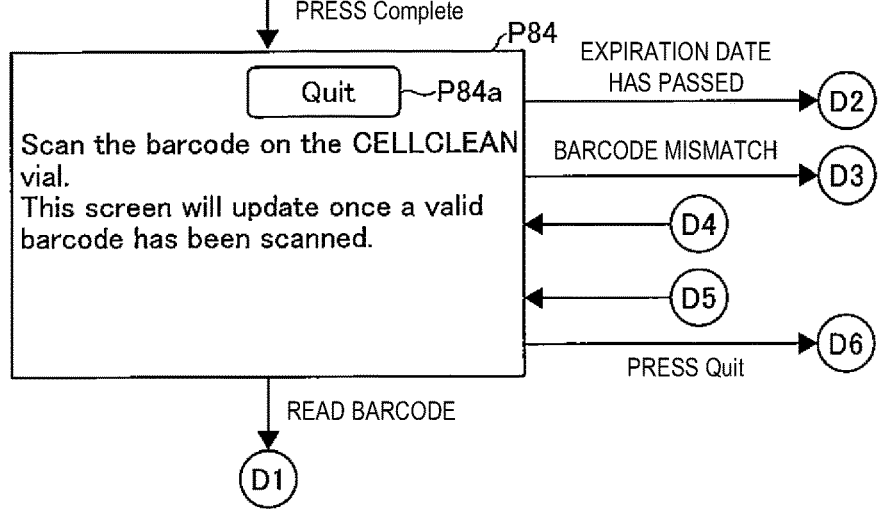

P84: [Quit] — P84a
Scan the barcode on the CELLCLEAN vial.
This screen will update once a valid barcode has been scanned.

EXPIRATION DATE HAS PASSED → D2
BARCODE MISMATCH → D3
← D4
← D5
PRESS Quit → D6

↓ READ BARCODE

D1

Auto Rinse

Remove Clog

FIG.45

Replace Pack-L

```
┌─────────────────────────────────┐ P181
│                                 │
│  pocH-pack L needs to be changed.│
│  Press Continue when ready.     │
│                                 │
│                                 │
│                    ┌─────────┐  │
│                    │Continue │──┼── P181a
│                    └─────────┘  │
└─────────────────────────────────┘
```
↓ PRESS Continue

SAME AS P51, P52, AND P172 TO P176

↓

SAMPLE MEASUREMENT

FIG.46

Prevent Maint

```
┌─────────────────────────────────┐ P191
│                                 │
│  Preventive Maintenance required.│
│  Press Continue when ready.     │
│                                 │
│                                 │
│                    ┌─────────┐  │
│                    │Continue │──┼── P191a
│                    └─────────┘  │
└─────────────────────────────────┘
```
↓ PRESS Continue

CELLCLEAN

↓

QC MEASUREMENT

↓

SAMPLE MEASUREMENT

FIG.49

```
                                                          ___300
┌──────────────────────────────┐
│ Any Clinic                    │----301
│ Anytown,State                 │
├──────────────────────────────┤
│ Instrument type XW100         │----302
│ Selial #                      │
├──────────────────────────────┤
│ Date Feb 25, 2016             │----303
│ Time 08:00 AM                 │
│ Operator                      │----304
├──────────────────────────────┤
│ Patient ID     0000000        │----305
│ Patient DOB Jun 24, 1965      │----306
├──────────────────────────────┤----307
│ WBC      ****      ALERT L    │
│ RBC      4.81 x 10⁶/μL        │
│ HGB      24.3 x g/dL  ALERT H │
│ HCT      43.1 %               │
│ PLT      ****      ALERT L    │
│                               │
│ #Neut    ****      WBC Diff   │
│ %Neut    ****      WBC Diff   │
│                               │
│ #Lymph   ****      WBC Diff   │
│ %Lymph   ****      WBC Diff   │
│                               │
│ #OtherWBC ****     WBC Diff   │
│ %OtherWBC ****     WBC Diff   │
│                               │
│ MCV      81.6 fL    Low       │
│                               │
│ MCH      29.8 pg              │
│                               │
│ MCHC     35.6 g/dL            │
│                               │
│ RDW SD   41.9 fL              │
│                               │
│ RDW CV   14.0 %               │
│                               │
│ MPV      10.0 fL              │
└──────────────────────────────┘
      102a(102)   102b(102)
```

Figure labels:
- 308
- NOTES
- RECOMMEND FURTHER TESTING — 311
- Potential ALERT Valve should be acted upon IMMEDIATELY — 312
- Adult Reference Ranges

| | |
|---|---|
| WBC | 3.9 – 10.4 x 10³/μL |
| RBC | 3.71 – 5.52 x 10⁶/μL |
| HGB | 10.9 – 16.7g/dL |
| HCT | 32.5 – 49.4% |
| PLT | 148 – 382 x 10³/μL |
| %Neut | 46.4 – 76.9% |
| %Lymph | 14.7 – 45.9% |
| %OtherWBC | 3.2 – 16.9% |
| MCV | 82.5 – 98.0 fL |
| MCH | 26.1 – 32.8 pg |
| MCHC | 30.7 – 35.9 g/dL |
| RDW SD | 39.1 – 51.6 fL |
| RDW CV | 11.8 – 15.8 % |
| MPV | 8.5 – 13.3 fL |

- - - End・Report - - -

| | | | |
|---|---|---|---|
| WBC | **** | ALERT L | 315 |
| RBC | 4.81 x 10⁶/μL | | |
| HGB | 24.3 x g/dL | ALERT H | 315 |
| HCT | 43.1 % | | |
| PLT | **** | ALERT L | 315 |
| #Neut | **** | WBC Diff | |
| %Neut | **** | WBC Diff | |
| #Lymph | **** | WBC Diff | |
| %Lymph | **** | WBC Diff | |
| #OtherWBC | **** | WBC Diff | |
| %OtherWBC | **** | WBC Diff | |
| MCV | 81.6 fL | Low | 314 |
| MCH | 29.8 pg | | |
| MCHC | 35.6 g/dL | | |
| RDW SD | 41.9 fL | | |
| RDW CV | 14.0 % | | |
| MPV | 10.0 fL | | |

FIG.51

| ANALYSIS RESULTS | | PERMISSION/ PROHIBITION OF OUTPUT | PRINT EMBODIMENTS WHEN OUTPUT IS PROHIBITED |
|---|---|---|---|
| OUTSIDE FIRST DETERMINATION RANGE | | | |
| | NUMERICAL INFORMATION | OUTPUT PROHIBITED | SUBSTITUTE INDICATION |
| | CONTENT OF ERROR | OUTPUT PROHIBITED | NOT DISPLAYED |
| WITHIN NORMAL RANGE (Reference Range) | | | |
| | NUMERICAL INFORMATION | OUTPUT PERMITTED | — |
| | CONTENT OF ERROR | — | — |
| WITHIN FIRST ERRONEOUS RANGE (High or Low) | | | |
| INITIAL TEST | NUMERICAL INFORMATION | OUTPUT PROHIBITED | PROHIBIT OUTPUT OF PRINTED MATTER |
| | CONTENT OF ERROR | OUTPUT PROHIBITED | |
| RETEST RESULTS DETERMINED AS MISMATCHED | NUMERICAL INFORMATION | OUTPUT PROHIBITED | SUBSTITUTE INDICATION |
| | CONTENT OF ERROR | OUTPUT PERMITTED | — |
| RETEST RESULTS DETERMINED AS MISMATCHED | NUMERICAL INFORMATION | OUTPUT PERMITTED | — |
| | CONTENT OF ERROR | OUTPUT PERMITTED | — |
| WITHIN SECOND ERRONEOUS RANGE (ALERT H or ALERT L) | | | |
| WITHIN SECOND DETERMINATION RANGE | NUMERICAL INFORMATION | OUTPUT PROHIBITED | SUBSTITUTE INDICATION |
| | CONTENT OF ERROR | OUTPUT PERMITTED | — |
| OUTSIDE SECOND DETERMINATION RANGE | NUMERICAL INFORMATION | OUTPUT PERMITTED | — |
| | CONTENT OF ERROR | OUTPUT PERMITTED | — |
| CONTENT OF ERROR | | | |
| | NUMERICAL INFORMATION | OUTPUT PROHIBITED | SUBSTITUTE INDICATION |
| | CONTENT OF ERROR | OUTPUT PERMITTED | — |

FIG.52

| | LINEARITY GUARANTEE RANGE |
|---|---|
| WBC | 1.0 – 99.9 ($\times 10^3/\mu L$) |
| RBC | 0.30 – 7.00 ($\times 10^6/\mu L$) |
| HGB | 1 – 250 (g/L) |
| HCT | 10.0 – 60.0 (%) |
| PLT | 10 – 999 ($\times 10^3/\mu L$) |

350

|  | Pediatric (≥2 to <12 years of age) | | | | |
|---|---|---|---|---|---|
|  | ALERT LOW | Low | Reference Range | High | ALERT HIGH |
| WBC(×10³/μL) | 1.0-2.9 | 3.0-4.7 | 4.8-13.5 | 13.6-50.0 | 50.1-63.2 |
| RBC(×10⁶/μL) | - | 0.30-4.10 | 4.20-5.40 | 5.50-7.00 | - |
| HGB(g/dL) | 0.1-9.9 | 10.0-10.4 | 10.5-16.0 | 16.1-24.0 | 24.1-25.0 |
| HCT (%) | 10.0-24.9 | 25.0-28.9 | 29.0-48.0 | 48.1-60.0 | - |
| PLT (×10³/μL) | 10-99 | 100-162 | 163-369 | 370-999 | - |
| %Neut (%) | - | 0.0-34.9 | 35.0-76.0 | 76.1-100.0 | - |
| #Neut (×10³/μL) | - | 1.0-1.8 | 1.9-8.6 | 8.7-63.2 | - |
| %Lymph (%) | - | 0.0-19.9 | 20.0-54.0 | 54.1-100.0 | - |
| #Lymph (×10³/μL) | - | - | 1.0-7.2 | 7.3-63.2 | - |
| %OtherWBC (%) | - | - | 0.0-19.0 | 19.1-100.0 | - |
| #OtherWBC(×10³/μL) | - | - | 1.0-2.2 | 2.3-63.2 | - |
| MCV (fL) | - | 0.0-75.9 | 76.0-99.0 | 99.1-999.9 | - |
| MCH (pg) | - | 0.0-25.5 | 25.6-32.2 | 32.3-999.9 | - |
| MCHC (g/dL) | - | 0.0-32.1 | 32.2-36.5 | 36.6-999.9 | - |
| RDW CV (%) | - | 0.0-35.0 | 35.1-46.1 | 46.2-100.0 | - |
| RDW SD(fL) | - | 0.0-11.5 | 11.6-14.4 | 14.5-250.0 | - |
| MPV (fL) | - | 0.0-9.3 | 9.4-12.4 | 12.5-40.0 | - |

| | Adolescents (≥12 to <21 years of age) | | | | |
|---|---|---|---|---|---|
| | ALERT LOW | Low | Reference Range | High | ALERT HIGH |
| WBC($\times 10^3/\mu L$) | 1.0-2.9 | 3.0-4.7 | 4.8-10.8 | 10.9-50.0 | 50.1-63.2 |
| RBC($\times 10^6/\mu L$) | - | 0.30-4.10 | 4.20-6.10 | 6.20-7.00 | - |
| HGB(g/dL) | 0.1-9.9 | 10.0-11.9 | 12.0-18.0 | 18.1-24.0 | 24.1-25.0 |
| HCT (%) | 10.0-24.9 | 25.0-36.9 | 37.0-52.0 | 52.1-60.0 | - |
| PLT ($\times 10^3/\mu L$) | 10-99 | 100-162 | 163-369 | 370-999 | - |
| %Neut (%) | - | 0.0-39.9 | 40.0-80.0 | 80.1-100.0 | - |
| #Neut ($\times 10^3/\mu L$) | - | 1.0-1.8 | 1.9-8.6 | 8.7-63.2 | - |
| %Lymph (%) | - | 0.0-14.9 | 15.0-40.0 | 40.1-100.0 | - |
| #Lymph ($\times 10^3/\mu L$) | - | - | 1.0-3.9 | 4.0-63.2 | - |
| %OtherWBC (%) | - | - | 0.0-19.0 | 19.1-100.0 | - |
| #OtherWBC($\times 10^3/\mu L$) | - | - | 1.0-2.0 | 2.1-63.2 | - |
| MCV (fL) | - | 0.0-79.9 | 80.0-99.0 | 99.1-999.9 | - |
| MCH (pg) | - | 0.0-25.5 | 25.6-32.2 | 32.3-999.9 | - |
| MCHC (g/dL) | - | 0.0-32.1 | 32.2-36.5 | 36.6-999.9 | - |
| RDW CV (%) | - | 0.0-35.0 | 35.1-46.1 | 46.2-100.0 | - |
| RDW SD(fL) | - | 0.0-11.5 | 11.6-14.4 | 14.5-250.0 | - |
| MPV (fL) | - | 0.0-9.3 | 9.4-12.4 | 12.5-40.0 | - |

360(373)　372　371　372　373

| | Adult (≥21 years of age) | | | | |
|---|---|---|---|---|---|
| | ALERT LOW | Low | Reference Range | High | ALERT HIGH |
| WBC (×10³/μL) | 1.0-2.9 | 3.0-3.8 | 3.9-10.4 | 10.5-50.0 | 50.1-63.2 |
| RBC (×10⁶/μL) | - | 0.30-3.70 | 3.71-5.52 | 5.53-7.00 | - |
| HGB (g/dL) | 0.1-9.9 | 10.0-10.8 | 10.9-16.7 | 16.8-24.0 | 24.1-25.0 |
| HCT (%) | 10.0-24.9 | 25.0-32.4 | 32.5-49.4 | 49.5-60.0 | - |
| PLT (×10³/μL) | 10-99 | 100-147 | 148-382 | 383-999 | - |
| %Neut (%) | | - | 0.0-46.3 | 46.4-76.9 | 77.0-100.0 | - |
| #Neut (×10³/μL) | - | 1.0-2.1 | 2.2-7.1 | 7.2-63.2 | - |
| %Lymph (%) | - | 0.0-14.6 | 14.7-45.9 | 46.0-100.0 | - |
| #Lymph (×10³/μL) | - | - | 1.0-3.4 | 3.5-63.2 | - |
| %OtherWBC (%) | - | 0.0-3.1 | 3.2-16.9 | 17.0-100.0 | - |
| #OtherWBC(×10³/μL) | - | - | 1.0-1.2 | 1.3-63.2 | - |
| MCV (fL) | - | 0.0-82.4 | 82.5-98.0 | 98.1-999.9 | - |
| MCH (pg) | - | 0.0-26.0 | 26.1-32.8 | 32.9-999.9 | - |
| MCHC (g/dL) | - | 0.0-30.6 | 30.7-35.9 | 36.0-999.9 | - |
| RDW CV (%) | - | 0.0-39.0 | 39.1-51.6 | 51.7-100.0 | - |
| RDW SD (fL) | - | 0.0-11.7 | 11.8-15.8 | 15.8-250.0 | - |
| MPV (fL) | - | 0.0-8.4 | 8.5-13.3 | 13.4-40.0 | - |

```
300 →        313    313   102
             WBC    ****          ALERT L    --- 315
             RBC    4.81 x 10⁶/μL
             HGB    ****          ALERT H    --- 315
307 →        HCT    43.1 %
             PLT    ****          ALERT L    --- 315
        313 ---

#Neut    ****        WBC Diff
             %Neut    ****        WBC Diff

#Lymph   ****        WBC Diff
             %Lymph   ****        WBC Diff

#OtherWBC ****       WBC Diff
             %OtherWBC ****       WBC Diff
```

FIG.57

```
300 →       RBC       4.81 x 10⁶/μL   ← 102
            HCT       43.1 %          ← 102

MCV       81.6 fL         Low   --- 314

307 →       MCH       29.8 pg

MCHC      35.6 g/dL

RDW SD    41.9 fL

RDW CV    14.0 %

MPV       10.0 fL

NOTES
            -------------------------------
            RECOMMEND FURTHER TESTING  ← 311

308 →       Potential ALERT Valve should be  ← 312
            acted upon IMMEDIATELY
```

FIG.58

| ANALYSIS RESULTS | | FIRST MODIFIED EXAMPLE | SECOND MODIFIED EXAMPLE |
|---|---|---|---|
| OUTSIDE FIRST DETERMINATION RANGE | | | |
| | NUMERICAL INFORMATION | OUTPUT PROHIBITED (SUBSTITUTE INDICATION) | OUTPUT PROHIBITED (NOT DISPLAYED) |
| | CONTENT OF ERROR | OUTPUT PROHIBITED | NOT DISPLAYED |
| WITHIN NORMAL RANGE (Reference Range) | | | |
| | NUMERICAL INFORMATION | OUTPUT PERMITTED | OUTPUT PERMITTED |
| | CONTENT OF ERROR | — | — |
| WITHIN FIRST ERRONEOUS RANGE (High or Low) | | | |
| | NUMERICAL INFORMATION | OUTPUT PROHIBITED (SUBSTITUTE INDICATION) | OUTPUT PROHIBITED (NOT DISPLAYED) |
| | CONTENT OF ERROR | OUTPUT PERMITTED | NOT DISPLAYED |
| WITHIN SECOND ERRONEOUS RANGE (= WITHIN SECOND DETERMINATION RANGE) (ALERT H or ALERT L) | | | |
| | NUMERICAL INFORMATION | OUTPUT PROHIBITED (SUBSTITUTE INDICATION) | OUTPUT PROHIBITED (NOT DISPLAYED) |
| | CONTENT OF ERROR | OUTPUT PERMITTED | NOT DISPLAYED |
| FRACTIONATION ERROR | | | |
| | NUMERICAL INFORMATION | OUTPUT PROHIBITED (SUBSTITUTE INDICATION) | OUTPUT PROHIBITED (NOT DISPLAYED) |
| | CONTENT OF ERROR | OUTPUT PERMITTED | NOT DISPLAYED |

SPECIMEN ANALYZER AND SPECIMEN ANALYSIS METHOD FOR CONTROLLING AN OUTPUT OF A TARGET COMPONENT IN AN ABNORMAL RANGE TO PREVENT ERRONEOUS DIAGNOSIS

BACKGROUND

The invention relates to a specimen analyzer and a specimen analysis method.

Conventionally, a specimen analyzer which analyzes a specimen collected from a subject is manipulated by an expert in a specific place such as a test room with a controlled environment. In recent years, it has been desired to loosen the limitation on use environment and users of the specimen analyzer. For example, there is a demand that a non-expert staff member be able to manipulate the specimen analyzer in a small medical facility which does not have a sufficient test room. This makes it possible to take, even in a small medical facility, a test which otherwise can be taken only in a medical facility provided with a test room.

On the other hand, use of a specimen analyzer by a non-expert staff member increases the risk of wrong treatment attributed to insufficient knowledge of the user.

Japanese Patent Application Publication No. 2015-163904 discloses specimen measurement apparatus 900 illustrated in FIG. 60 in which, if a result of measuring a glucose concentration by biosensor 901 is outside a predetermined measurement value range, display unit 902 is caused to display a measurement error warning instead of displaying the measurement result of the glucose concentration. This prevents an analysis result regarded as a measurement error from being provided.

However, in the condition in which the analyzer is expected to be used by a non-expert staff member in a small medical facility or the like as described above, the possibility cannot be denied of wrong treatment attributed to insufficient knowledge of the user even when correct analysis results not regarded as measurement errors are outputted. Additionally, a small medical facility or the like usually does not have a full range of doctors specialized in various fields. For this reason, there is a possibility of an inappropriate diagnosis or treatment made by non-specialist doctors depending on the analysis results. Hence, in the condition in which the analyzer is expected to be used by a non-expert staff member or a similar case, for example, a desirable action for which to analyze results which may lead to the diagnosis of a particular serious disease is to perform a detailed retest in another specialized medical organization or the like instead of making a diagnosis based on the obtained analysis results.

SUMMARY

The invention is aimed at avoiding the diagnosis of a particular disease by use of analysis results in the condition in which inappropriate treatment or diagnosis could potentially be made based on the analysis results.

A specimen analyzer according to a first aspect of the invention includes: analysis unit (10) which analyzes specimen (101) collected from a subject to generate analysis result (102) including component amount (102a) in specimen (101); output unit (20) which outputs analysis result (102); and controller (30) which causes output unit (20) to output or not to output component amount (102a) based on a comparison result between component amount (102a) and determination reference value (60) if component amount (102a) is a numerical value deemed to be reliable for the analysis.

As described above, the specimen analyzer according to the first aspect includes controller (30) which causes output unit (20) to output or not to output component amount (102a) based on a comparison result between component amount (102a) and determination reference value (60) if component amount (102a) is a numerical value deemed to be reliable for the analysis. This makes it possible to prohibit component amount (102a) from being provided to the user based on the comparison results between component amount (102a) and determination reference value (60) even when component amount (102a) is determined to be reliable for the analysis. By virtue of this, if determination reference value (60) is set in advance for a certain abnormal value which could lead to the diagnosis of a particular serious disease, it is possible to avoid an output of component amount (102a) representing the certain abnormality which could lead to the diagnosis of a particular serious disease. This makes it possible to avoid the diagnosis of a particular disease by use of analysis results (102) in the condition in which, based on correct analysis results (102), inappropriate treatment or diagnosis could potentially be made due to e.g. insufficient knowledge of the user.

In the above-described specimen analyzer according to the first aspect, it may be preferable that analysis unit (120) generate, as component amount (102a) included in analysis result (102), the number of particles in specimen (101). Here, the particle is a formed element which is contained in the specimen collected from the subject. In the case of blood specimen, for example, the particle can include blood cell components such as red blood cell, white blood cell, and platelet. In the case of blood specimen, for example, the particle can include blood cell component, cast, and crystal component. In such a configuration, if determination reference value (360) is set in advance for an abnormal number of particles which could lead to the diagnosis of a particular serious disease, it is possible to avoid an output of component amount (102a) representing the abnormal number of particles which could lead to the diagnosis of a particular serious disease.

In the above-described specimen analyzer according to the first aspect, it may be preferable that controller (140) determine whether or not component amount (102a) included in analysis result (102) is the numerical value deemed to be reliable for the analysis based on whether or not the component amount is within predetermined numerical value range (350), and determination reference value (360) be set within predetermined numerical value range (350). Such a configuration makes it possible to prohibit certain abnormal component amount (102a) from being provided to the user based on the comparison results between component amount (102a) and determination reference value (360) even when component amount (102a) within predetermined numerical value range (350) is determined to be reliable for the analysis.

In the above-described specimen analyzer according to the first aspect, it may be preferable that predetermined numerical value range (350) include normal range (371) indicating component amount (102a) is normal, first abnormal range (372) outside normal range (371), and second abnormal range (373) outside first abnormal range (372), and determination reference value (360) be set within second abnormal range (373). Such a configuration makes it possible for the user to output analysis results (102) of normal range (371) and first abnormal ranges (372). It is possible to perform control of determining whether to provide the user with component amount (102a) whose analysis results (102) belong to second abnormal ranges (373) based on the comparison results between component amount (102a) and determination reference value (360). Thus, without negatively affecting the convenience of the analyzer, it is possible to avoid the diagnosis of a particular disease by use of analysis results (102) determined to have certain abnormality based on the comparison results between component amount (102a) and determination reference value (360).

In this case, it may be preferable that specimen (101) be blood, and determination reference value (360) be set within an abnormally low value range of the second abnormal range set for at least one analysis item among a white blood cell count, a hemoglobin concentration, a hematocrit value, and a platelet count. The white blood cell count relates to an immune function, the hemoglobin concentration and the hematocrit value relate to an oxygen carrying function, and the platelet count relates to a coagulation function. The wrong diagnosis is not permitted because the abnormally low values for these analysis items concern the sustainment of life. For this reason, when determination reference value (360) is set particularly for the abnormally low values for the analysis items of the white blood cell count, the hemoglobin concentration, the hematocrit value, and the platelet count, it is possible to eliminate the risk of a wrong diagnosis based on analysis results (102) in the case of abnormally low values for particularly important analysis items.

In the above-described specimen analyzer according to the first aspect, it may be preferable that controller (140) cause output unit (130) to output information (102b) indicating a type of an abnormality of specimen (101) if controller (140) causes output unit (130) not to output component amount (102a) as a result of the comparison between component amount (102a) and determination reference value (360). Here, the information indicating the type of the abnormality is information indicating that component amount (102a) belongs to a certain abnormal value determined as a result of the comparison between component amount (102a) and determination reference value (360). This makes it possible for the user to grasp the type of the abnormality even without expertise on analysis results (102) when information (102b) indicating the type of the abnormality is outputted. In addition, since component amount (102a) is not outputted, it is possible to bring the ordering doctor or the like to attention by use of information (102b) indicating the type of the abnormality while reliably eliminating the risk of a wrong diagnosis or wrong treatment based on component amount (102a).

In the above-described specimen analyzer according to the first aspect, it may be preferable that controller (140) cause output unit (130) to output a predetermined message if controller (140) prohibits output unit (130) from outputting component amount (102a) as a result of the comparison between component amount (102a) and determination reference value (360). Such a configuration makes it possible to notify the user of helpful information or a recommended measure if component amount (102a) is not outputted. In particular, since output is performed in the form of a message, not of e.g. a sign indicating an abnormal value, it is possible for the user to more reliably grasp information that an abnormal value of great importance is obtained or information on how to deal with analysis results (102) even when a non-expert staff member uses the analyzer.

In this case, it may be preferable that the predetermined message include a message (311) prompting further testing.

In such a configuration, message (311) prompting further testing allows the user to propose to the patient that he/she have a detailed examination at, for example, a specialized medical facility, enabling an appropriate diagnosis based on more appropriate analysis results. Moreover, it is possible to seek instructions of the ordering doctor or the like even if the non-expert staff member does not understand the detail of analysis results (102).

In the above-described specimen analyzer according to the first aspect, it may be preferable that controller (140) cause output unit (130) to output substitute indication (313) substituting for component amount (102a) if controller (140) causes output unit (130) not to output component amount (102a) as a result of the comparison between component amount (102a) and determination reference value (360). Here, substitute indication (313) is a broad concept encompassing a character, a sign, or other symbols (including hatching) distinguishable from component amount (102a). Such a configuration makes it possible for the user to recognize that certain analysis results (102) are obtained by use of substitute indication (313) even in the condition in which component amount (102a) is not outputted as a result of the comparison between component amount (102a) and determination reference value (360). Hence, the user does not erroneously think that the analysis has not been performed for a reason, unlike the case of simply removing component amount (102a) equal to determination reference value (360).

In this case, it may be preferable that controller (140) cause output unit (130) to output information (102b) indicating a type of an abnormality of specimen (101) together with substitute indication (313). By use of information (102b) indicating the type of the abnormality, such a configuration makes it possible to notify the ordering doctor or the like that component amount (102a) is not outputted as a result of the comparison between component amount (102a) and determination reference value (360) and that there is an abnormal value, even when substitute indication (313) is substituted for component amount (102a).

In the above-described configuration which causes output unit (130) to output information (102b) indicating the type of the abnormality of specimen (101) together with substitute indication (313), it may be preferable that if component amount (102a) is not a numerical value deemed to be reliable for the analysis, controller (140) cause output unit (130) to output substitute indication (313) substituting for component amount (102a) instead of outputting information (102b) indicating the type of the abnormality of specimen (101). By using information (102b) indicating the type of the abnormality, such a configuration makes it possible in a distinguishable manner to know whether an analysis error has occurred in which component amount (102a) is outside predetermined numerical value range (350) or component amount (102a) is not outputted as a result of the comparison between component amount (102a) and determination reference value (360), even when substitute indication (313) is substituted for component amount (102a).

In the above-described specimen analyzer according to the first aspect, it may be preferable that output unit (130) include a print unit and a display unit, and controller (140) perform control of causing the print unit to print analysis result (102), and prohibiting the display unit from displaying analysis result (102). Here, for example, if information on some of analysis results (102) is not printed but displayed on display unit (131), there is a risk that only the printed sheet of analysis results (102) could be submitted to the ordering doctor or the like and the information displayed on display unit (131) could not be reported as a result. As opposed to this, the above configuration makes it possible to reliably grasp analysis results (102) by merely taking a look at printed sheet (300) because analysis results (102) are not displayed on display unit (131) but collectively outputted on printed sheet (300). Hence, it is possible to reliably report analysis results (102) by merely submitting only the printed sheet of analysis results (102) to the ordering doctor or the like.

In the above-described specimen analyzer according to the first aspect, it may be preferable that determination reference value (360) be a numerical value for use to determine whether or not the subject is suspected to have a predetermined serious disease. Such a configuration makes it possible to avoid providing the user with abnormal component amount (102a) as analysis results (102) which indicates that the subject is suspected to have a predetermined serious disease that could lead to a serious situation when inappropriately diagnosed or treated. For this reason, it is possible to avoid a potential inappropriate diagnosis and treatment of a predetermined serious disease by use of analysis results (102) including abnormal component amount (102a).

In the above-described specimen analyzer according to the first aspect, it may be preferable that analysis unit (120) determine component amount (102a) for each of a plurality of component types, and for each of the plurality of component types, controller (140) causes output unit (130) to output or not to output component amount (102a) based on the comparison result between component amount (102a) and its corresponding determination reference value (360) in a condition in which component amount (102a) for each of the plurality of component types is a numerical value deemed to be reliable for the analysis. In such a configuration, among the two or more types of components to be analyzed, it is possible to avoid providing the user with component amount (102a) which should not be outputted and to provide the user with component amount (102a) which can be outputted based on the comparison results between component amount (102a) and determination reference value (360). For this reason, it is possible to provide more analysis results (102) compared to the condition in which component amount (102a) for all types of components is not provided when component amount (102a) is obtained for a certain component type which should not be outputted. Hence, convenience of the apparatus can be improved.

In the above-described specimen analyzer according to the first aspect, it may be preferable that, in a condition in which controller (140) causes output unit (130) not output component amount (102a) as a result of the comparison between component amount (102a) and determination reference value (360), controller (140) cause output unit (130) to output an item name of a component type for which component amount (102a) is not outputted. Such a configuration makes it possible for the user to recognize, for which component item, component amount (102a) is prohibited from being outputted because the item name of the component type is outputted even when component amount (102a) is prohibited from being outputted.

In the above-described specimen analyzer according to the first aspect, it may be preferable that specimen (101) be blood, and analysis unit (120) analyze the number of blood cells and a concentration of a component contained in blood. To be more specific, the specimen analyzer is a blood cell counting apparatus. Analysis result (102) can include analysis values such as the number of cell components such as various blood cells and platelets, a measurement value of e.g. a concentration of a component in blood, ratios of blood cells based on the measured values, an average volume, and a distribution width. The blood cell counting apparatus performs some of the blood tests widely used in clinical examination. Thus, it is desired to immediately perform test even in a small medical facility which does not have a sufficient test room. On the other hand, analysis results (102) are very important in the field of clinical examination because they are related to various types of diseases. For this reason, it is desired to avoid a wrong diagnosis or wrong treatment attributed to insufficient knowledge of the user based on outputted component amount (102a). Hence, the invention is suitably applied to blood cell counting.

In this case, it may be preferable that determination reference value (360) be set within a predetermined abnormally low value range. The abnormally low value in analysis results (102) of blood components suggests a significant decrease in e.g. the immune function, the oxygen carrying function, and the coagulation function of blood. Thus, if determination reference value (360) is set within the predetermined abnormally low value range as described above, it is possible to eliminate the risk of a wrong diagnosis based on component amount (102a) which shows the abnormally low value requiring particular attention.

In the above-described configuration where determination reference value (360) is set within the predetermined abnormally low value range, determination reference value (360) is set for at least one analysis item among a white blood cell count, a hemoglobin concentration, a hematocrit value, and a platelet count. The white blood cell count relates to an immune function, the hemoglobin concentration and the hematocrit value relate to an oxygen carrying function, and the platelet count relates to a coagulation function. The wrong diagnosis or wrong treatment is not permitted because the abnormally low values for these analysis items concern the sustainment of life. For this reason, when determination reference value (360) is set particularly within the ranges of the abnormally low values for at least one of the analysis items of the white blood cell count, the hemoglobin concentration, the hematocrit value, and the platelet count, it is possible to eliminate the risk of a wrong diagnosis or wrong treatment based on component amount (102a) being an abnormally low value for a particularly important analysis item.

A specimen analysis method according to a second aspect of the invention includes: analyzing specimen (101) collected from a subject to generate analysis result (102) including component amount (102a) in specimen (101); and performing control of comparing component amount (102a) and determination reference value (60) to determine whether to output component amount (102a) based on a comparison result if component amount (102a) is a numerical value deemed to be reliable for the analysis.

As described above, in the specimen analysis method according to the second aspect performs control of comparing component amount (102a) and determination reference value (60) to determine whether to output component amount (102a) based on a comparison result if component amount (102a) is a numerical value deemed to be reliable for the analysis. This makes it possible to prohibit component amount (102a) from being provided to the user based on the comparison results between component amount (102a) and determination reference value (60) even when component amount (102a) is determined to be reliable for the analysis. By virtue of this, if determination reference value (60) is set in advance for a certain abnormal value which could lead to the diagnosis of a particular serious disease, it is possible to avoid an output of component amount (102a) representing the certain abnormality which could lead to the diagnosis of a particular serious disease. This makes it possible to avoid the diagnosis of a particular disease by use of analysis results (102) in the condition in which, based on correct analysis results (102), inappropriate treatment or diagnosis could potentially be made due to e.g. insufficient knowledge of the user.

BRIEF DESCRIPTION OF DRAWINGS

FIG. 13 is a diagram illustrating a display example for barcode reader confirmation;

FIG. 14 is a diagram illustrating a display example for connecting various types of tubes;

FIG. 21 is a diagram illustrating display example 7 for setting a reagent;

FIG. 22 is a diagram illustrating display example 1 for cleaning by CELLCLEAN;

FIG. 45 is a diagram illustrating display example 5 for maintenance;

FIG. 46 is a diagram illustrating display example 6 for maintenance;

FIG. 49 is a diagram illustrating an example of print content of printed sheet;

FIG. 50 is a diagram for explaining a result displaying section of the printed sheet;

FIG. 51 is a diagram for explaining rules of outputting analysis results on the printed sheet;

FIG. 52 is a diagram for explaining predetermined numerical value range;

FIG. 54 is a diagram for explaining numerical ranges for evaluating analysis results for a youth;

FIG. 56 is a diagram for explaining a first modification of a printing embodiment of the analysis results;

FIG. 57 is a diagram for explaining a second modification of the printing embodiment of the analysis results;

FIG. 58 is a diagram for explaining first and second modifications of the rules of outputting the analysis results;

DETAILED DESCRIPTION

Hereinafter, an embodiment is described based on the drawings.

[Overview of Specimen Analyzer and Specimen Analysis Method]

Figure 1:
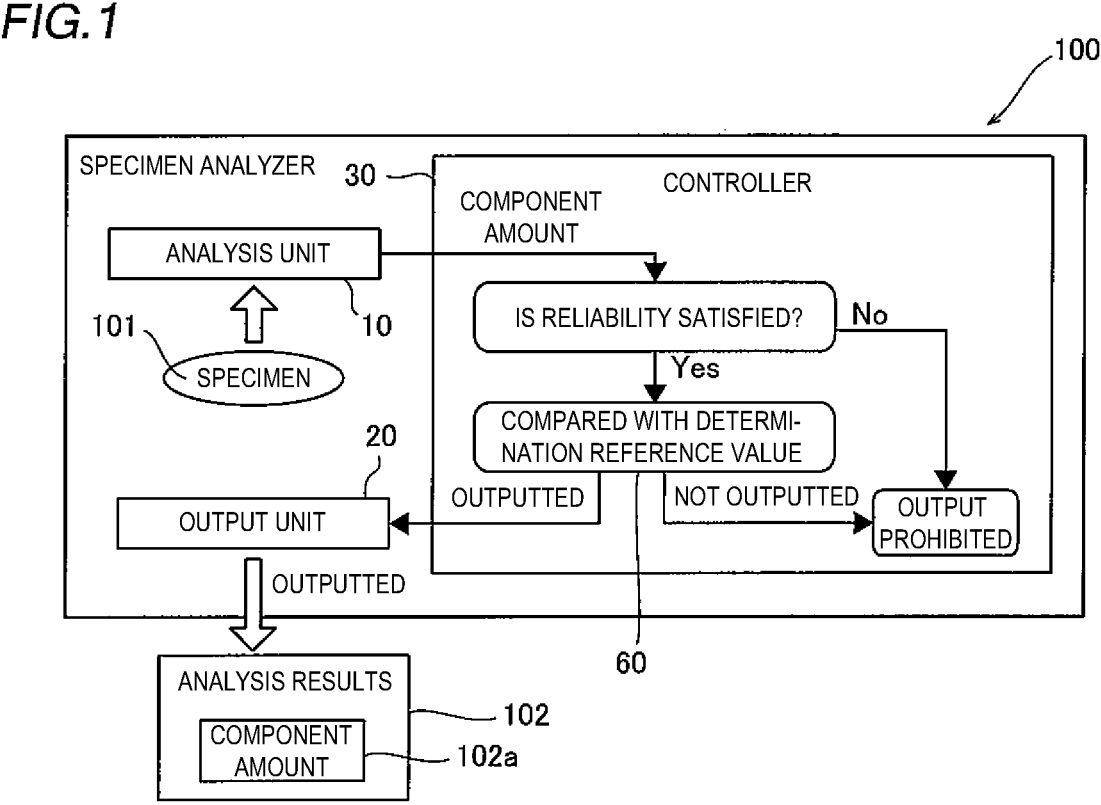
FIG. 1 is a diagram for explaining an overview of a specimen analyzer and a specimen analysis method.

With reference to FIG. 1, an overview of specimen analyzer 100 and a specimen analysis method according to the embodiment is described.

Specimen analyzer 100 according to the embodiment is an analyzer for analyzing a specimen collected from a subject. The subject is a human in most cases, but may be an animal other than a human. Specimen analyzer 100 performs measurement or analysis for clinical examination of the specimen collected from, for example, a patient. Thus, the specimen is a specimen of biological origin. A specimen of biological origin is, for example, a liquid such as blood (whole blood, serum, or plasma), urine, or other body fluids collected from the subject, or a liquid obtained by performing predetermined pre-treatment on a collected body fluid or blood. In addition, the specimen may be, for example, part of the tissue or a cell of the subject, rather than liquid. The specimen contains, for example, a target component designated as a test item for clinical examination. The target component may contain, for example, a predetermined component, cells, or particles in the blood or the urine specimen. The target component may be, for example, a nucleic acid such as DNA (deoxyribonucleic acid), a cell, an intracellular substance, an antigen, an antibody, a protein, or a peptide. Specimen analyzer 100 may be, for example, a blood cell counting apparatus, a blood coagulation analyzer, an immunoassay apparatus, and a urine particle analyzer, or an analyzer different from these.

For example, specimen analyzer 100 sets a container which contains specimen 101, performs predetermined operations, and thereby measures the target components depending on the analysis items in specimen 101. As a result, the specimen analyzer outputs analysis results 102. Analysis results 102 may be primary measurement results or detection results obtained by measuring the target components, or may be secondary analysis results obtained analytically based on the measurement results. Analysis results 102 include the numerical value of component amount 102 present in specimen 101. In addition to the component amount, analysis results 102 may have, for example, diagrams such as a scattergram and a histogram, other statistical quantities, and qualitative determination results (e.g. − and +).

Specimen analyzer 100 according to the embodiment may be an analyzer designed to be used by non-expert users. For this reason, specimen analyzer 100 is configured not to output some of analysis results 102 in certain cases, taking into account the risk of wrong treatment or a wrong diagnosis attributed to insufficient knowledge of the user. Specimen analyzer 100 is a small and simplified analyzer, for example, and is applicable in a small facility where a conventional analyzer cannot be installed.

As illustrated in FIG. 1, specimen analyzer 100 includes analysis unit 10, output unit 20m, and controller 30.

Analysis unit 10 is configured to analyze specimen 101 collected from the subject, and to generate analysis results 102 including component amount 102a in specimen 101. Analysis unit 10 includes, for example, one or more detectors corresponding to analysis items, and measures or detects the target component in specimen 101. In addition, analysis unit 10 includes a computer which has a processor and a memory, and generates analysis results by analyzing measurement results or detection results. The number of analysis items may be one or more. Analysis unit 10 generates analysis results 102 including component amount 102a as the generated measurement results and/or analysis results.

Output unit 20 is configured to output analysis results 102 of analysis unit 10. The user such as the operator of the analyzer acquires analysis results 102 outputted by output unit 20. Output unit 20 includes at least one of, for example, a print unit, a display unit, and an external output unit. The print unit may print in any way as long as it can print on a predetermined medium such as a print sheet. The display unit can include, for example, a liquid crystal monitor, an organic electroluminescent monitor, a projector, and an electronic paper. The external output unit can include a communication unit which transmits data such as analysis results 102 via a network.

Controller 30 is a computer which includes, for example, a processor such as a CPU and a memory which has a program recorded therein. Controller 30 of the embodiment can perform control of prohibiting an output of component amount 102a among analysis results 102 which should not be outputted to the user.

Controller 30 performs causes output unit 20 to output or not to output component amount 102a based on the comparison results between component amount 102a and determination reference value 60 if component amount 102a is a numerical value deemed to be reliable for the analysis. Controller 30 causes output unit 20 to output component amount 102a in the case of outputting component amount 102a based on the comparison results between component amount 102a and determination reference value 60. Controller 30 prohibits output unit 20 from outputting component amount 102a in the case of not outputting component amount 102a as a result of the comparison results between component amount 102a and determination reference value 60. Thus, if component amount 102a is not outputted, component amount 102a is prohibited from being outputted. Controller 30 prohibits an output of component amount 102a which is not deemed to be reliable for the analysis. Note that the controller may output component amount 102a which is not deemed to be reliable for the analysis together with e.g. a message saying the component amount is a numerical value deemed not to be reliable.

Determination as to whether or not the component amount is a numerical value deemed to be reliable for the analysis is made based on whether or not the component amount is an analysis error which occurs when e.g. the component amount is outside a measureable range of analysis unit 10. The numerical value deemed to be reliable for the analysis is a numerical value determined to pose no problem to the analysis itself of analysis unit 10.

For example, even when component amount 102a is deemed to be reliable for the analysis, controller 30 performs control of prohibiting an output of component amount 102a if component amount 102a is an abnormal value exceeding determination reference value 60, and performs control of permitting an output of component amount 102a if component amount 102a is a value not exceeding determination reference value 60.

To be more specific, in the embodiment, even when component amount 102a deemed to be reliable for the analysis is obtained, controller 30 could prohibit an output based on the comparison results between component amount 102a and determination reference value 60. Determination reference value 60 represents a certain abnormality of specimen 101, and is not set within a normal value range of component amount 102a. For example, determination reference value 60 is set within a certain abnormal value range. For example, determination reference value 60 is set in advance within a numerical value range representing a certain abnormality which particularly requires attention. The certain abnormality is an abnormality which could lead to, for example, the diagnosis of a particular serious disease. A detailed examination is recommended in the case of the certain abnormality. Hence, controller 30 prohibits an output of component amount 102a when comparison results between component amount 102a and determination reference value 60 show that component amount 102a is determined to represent a certain abnormal value. Since component amount 102a representing the certain abnormal value is not outputted, it is possible to prevent a situation where a non-expert staff member performs inappropriate treatment based on the abnormal value or where a non-specialist doctor makes a wrong diagnosis of a serious disease.

Among component amounts 102a generated by analysis unit 10, controller 30 permits an output of component amount 102a which is determined within the numerical value range deemed to be reliable for the analysis and which is determined unequal to a certain abnormality as a result of the comparison results between the component amount and determination reference value 60. Thus, in the absence of other errors and the like, output unit 20 outputs component amount 102a which is within predetermined numerical value range 50 and which does not exceed determination reference value 60. Output unit 20 outputs to the user component amount 102a which controller 30 permits to output.

As described above, specimen analyzer 100 of the embodiment is capable of prohibiting component amount 102a from being provided to the user based on the comparison results between the component amount and determination reference value 60 even when component amount 102a is determined to be reliable for the analysis by controller 30. By virtue of this, if determination reference value 60 is set in advance for a certain abnormal value which could lead to the diagnosis of a particular serious disease, it is possible to avoid an output of component amount 102a representing the certain abnormality which could lead to the diagnosis of a particular serious disease. This makes it possible to avoid the diagnosis of a particular disease by use of analysis results 102 in the case where, based on the correct analysis results, inappropriate treatment or diagnosis could potentially be made due to e.g. insufficient knowledge of the user.

Moreover, in the embodiment, specimen analyzer 100 carries out the following specimen analysis method. To be more specific, specimen analyzer 100 analyzes specimen 101 collected from a subject to generate analysis results 102 including component amount 102a in specimen 101. Specimen analyzer 100 performs control of comparing component amount 102a and determination reference value 60, and then determining whether to output component amount 102a based on a comparison result if component amount 102a is a numerical value deemed to be reliable for the analysis. Specimen analyzer 100 outputs component amount 102a with output permission.

This makes it possible to prohibit component amount 102a from being provided to the user based on the comparison results between the component amount and determination reference value 60 even when component amount 102a is determined to be reliable for the analysis. By virtue of this, if determination reference value 60 is set in advance for a certain abnormal value which could lead to the diagnosis of a particular serious disease, it is possible to avoid an output of component amount 102a representing the certain abnormality which could lead to the diagnosis of a particular serious disease. This makes it possible to avoid the diagnosis of a particular disease by use of analysis results 102 in the case where, based on the correct analysis results, inappropriate treatment or diagnosis could potentially be made due to e.g. insufficient knowledge of the user.

Note that no particular limitation is imposed on the target component whose component amount 102a is obtained by analysis unit 120. For example, analysis unit 120 generates the number of particles in specimen 101 as component amount 102a included in analysis results 102. The particle is a formed element which is contained in the specimen collected from the subject. The particle may be any element as long as it is individually countable. In the case of blood specimen, for example, the particle can include blood cell components such as red blood cell, white blood cell, and platelet. In the case of blood specimen, for example, the particle can include blood cell component, epithelial cell, cast, and crystal component. Thus, if determination reference value 360 is set in advance for an abnormal number of particles which could lead to the diagnosis of a particular serious disease, it is possible to avoid an output of component amount 102a representing the abnormal number of particles which could lead to the diagnosis of a particular serious disease.

[Configuration Example of Specimen Analyzer]

Figure 2:
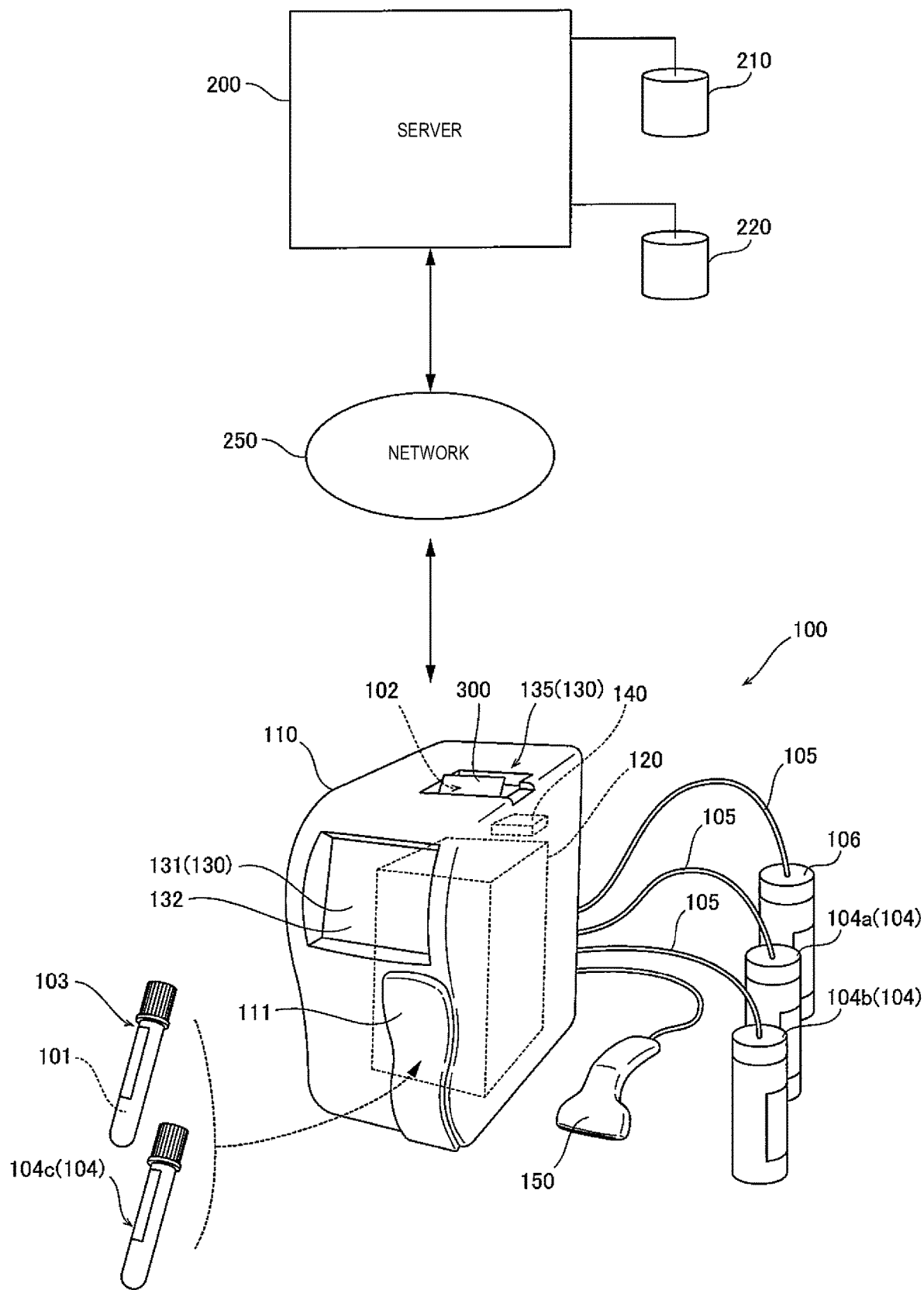
FIG. 2 is a perspective view illustrating a configuration example of the specimen analyzer.

With reference to FIG. 2 to FIG. 57, a configuration example of specimen analyzer 100 is described.

(Overall Configuration)

In the example illustrated in FIG. 2, specimen 101 is blood in specimen analyzer 100, and specimen analyzer 100 is a blood cell counting apparatus. The blood cell counting apparatus is an apparatus which counts the number of blood cells contained in a predetermined volume of blood specimen. Analysis result 102 can include analysis values such as the number of cell components such as various blood cells and platelets, a measurement value of e.g. a concentration of a component in blood, ratios of blood cells based on the measured values, an average volume, and a distribution width. The blood cell counting apparatus performs some of the blood tests widely used in clinical examination. Thus, it is desired to immediately perform test even in a small medical facility which does not have a sufficient test room. On the other hand, analysis results 102 are clinically very important because they are related to various types of diseases. For this reason, it is desired to avoid a wrong diagnosis or wrong treatment attributed to insufficient knowledge of the user based on outputted component amount 102a. Hence, the embodiment is suitably applied to blood cell counting.

When specimen container 103 containing specimen 101 is set, specimen analyzer 100 aspirates specimen 101 in specimen container 103 and analyzes the specimen. For example, a container in the shape of a generally-used blood collection tube can be used as specimen container 103. Specimen container 103 is, for example, a vacuum blood collection tube capped with a rubber cap or an open blood collection tube which has an opening. Specimen 101 to be contained in specimen container 103 is, for example, whole blood of a subject (human), and is added with an anticoagulant. The necessary amount of added anticoagulant is, for example, 10 µL to 15 µL inclusive.

Specimen analyzer 100 has apparatus body 110 which includes analysis unit 120 for analyzing the specimen collected from the subject, output unit 130 for outputting analysis results 102 of analysis unit 120, and controller 140. Moreover, specimen analyzer 100 includes information read unit 150 connected to apparatus body 110. Further, specimen analyzer 100 is connected to various types of consumables 104 used along with analysis operation for specimen 101.

Apparatus body 110 is a unit provided with analysis unit 120, output unit 130, etc. in a box-shaped housing. Apparatus body 110 is configured as a small blood cell counting apparatus which can be a desktop one, including information read unit 150 and consumables 104. Analysis unit 120 and controller 140 are built in apparatus body 110.

Container set unit 111 is provided at a front and lower portion of apparatus body 110. Container set unit 111 is configured such that it is openable and closable from the front surface of apparatus body 110 in the direction toward the user (see FIG. 3). Using container set unit 111, specimen container 103 containing specimen 101 is set in apparatus body 110.

In the example illustrated in FIG. 2, analysis unit 120 is configured to analyze multiple analysis items. As an example, as measurement items by analysis unit 120, the analysis items include e.g. eight items: white blood cell count (WBC), red blood cell count (RBC), hemoglobin concentration (HGB), hematocrit value (HCT), mean corpuscular volume (MCV), mean corpuscular hemoglobin (MCH), mean corpuscular hemoglobin concentration (MCHC), and platelet count (PLT). As analysis items to be analyzed on the basis of the analysis results of the measurement items, the analysis items include e.g. nine items: WBC-small cell ratio (% Lymph), WBC-middle cell ratio (% OtherWBC), WBC-large cell ratio (% Neut), WBC-small cell count (#Lymph), WBC-middle cell count (#OtherWBC), WBC-large cell ratio (#Neut), red blood cell distribution width (RDW-SD and RDW-CV), mean platelet volume (MPV). In this example, the number of analysis items of analysis unit 120 is 17.

Output unit 130 outputs various types of information on specimen analyzer 100 to the user. In the example of FIG. 2, output unit 130 includes display unit 131 and print unit 135. In the example of FIG. 2, display unit 131 is an LCD (liquid crystal display), and is disposed at a front and upper portion of apparatus body 110. In the example of FIG. 2, print unit 135 is a thermal printer which prints on thermal paper with use of heat, and is located on an upper surface of apparatus body 110.

Moreover, specimen analyzer 100 includes manual input unit 132 which receives an input operation of the user. In the example of FIG. 2, manual input unit 132 is a touch panel provided on display unit 131. The user is allowed to input information and perform various operations by touching the icons displayed on display unit 131.

In the example of FIG. 2, information read unit 150 is configured to read an identifier provided on each of consumables 104, and to receive inputted information. To be more specific, information read unit 150 is a read apparatus such as a barcode reader, a two-dimensional code reader, and a camera. The identifier is a barcode or a two-dimensional code.

In the example of FIG. 2, inputting of information on consumables 104 by manual input unit 132 is not permitted, but inputting by information read unit 150 is permitted. Controller 140 determines whether to use consumables 104 based on information on consumables 104 inputted by information read unit 150. To be more specific, controller 140 allows use of consumables 104 if information on consumables 104 inputted by information read unit 150 is registered on server 200.

Consumables 104 are consumed along with analysis operation of specimen 101 by specimen analyzer 100. Consumables 104 contain the reagent used for the analysis of specimen 101. In the example of FIG. 2, used as consumables 104 are diluted solution container 104a containing a diluted solution for diluting specimen 101 and hemolyzer container 104b containing a hemolyzer which hemolyzes blood cells. Moreover, consumables 104 contain a cleaning agent for cleaning specimen analyzer 100. In the example of FIG. 2, used as consumable 104 is cleaning agent container 104c containing a cleaning agent for cleaning a fluid circuit in the apparatus. Note that the diluted solution is used for a cleaning process. The cleaning agent contains a cleaning component such as a sodium hypochlorite solution, and has more cleaning power than the diluted solution. Cleaning with use of the cleaning agent is regularly carried out each time a predetermined period elapses, e.g. one week. Cleaning with use of the diluted solution is carried out more frequently than the cleaning with use of the cleaning agent each time the analysis of specimen 101 is performed, for example. The identifiers provided on consumables 104 have information on consumables 104 recorded therein. Information on consumables 104 includes at least one of the type of consumable 104, expiration date, lot number, and serial number.

As an example, in the example of FIG. 2, "pocH-pack D (manufactured by Sysmex Corporation, registered trademark)" is preferably used as the diluted solution, "pocH-pack L (manufactured by Sysmex Corporation, registered trademark)" is preferably used as the hemolyzer, and "CELLCLEAN (manufactured by Sysmex Corporation, registered trademark)" is preferably used as the cleaning agent.

(Configuration of Each of Units of Specimen Analyzer)

Figure 3:
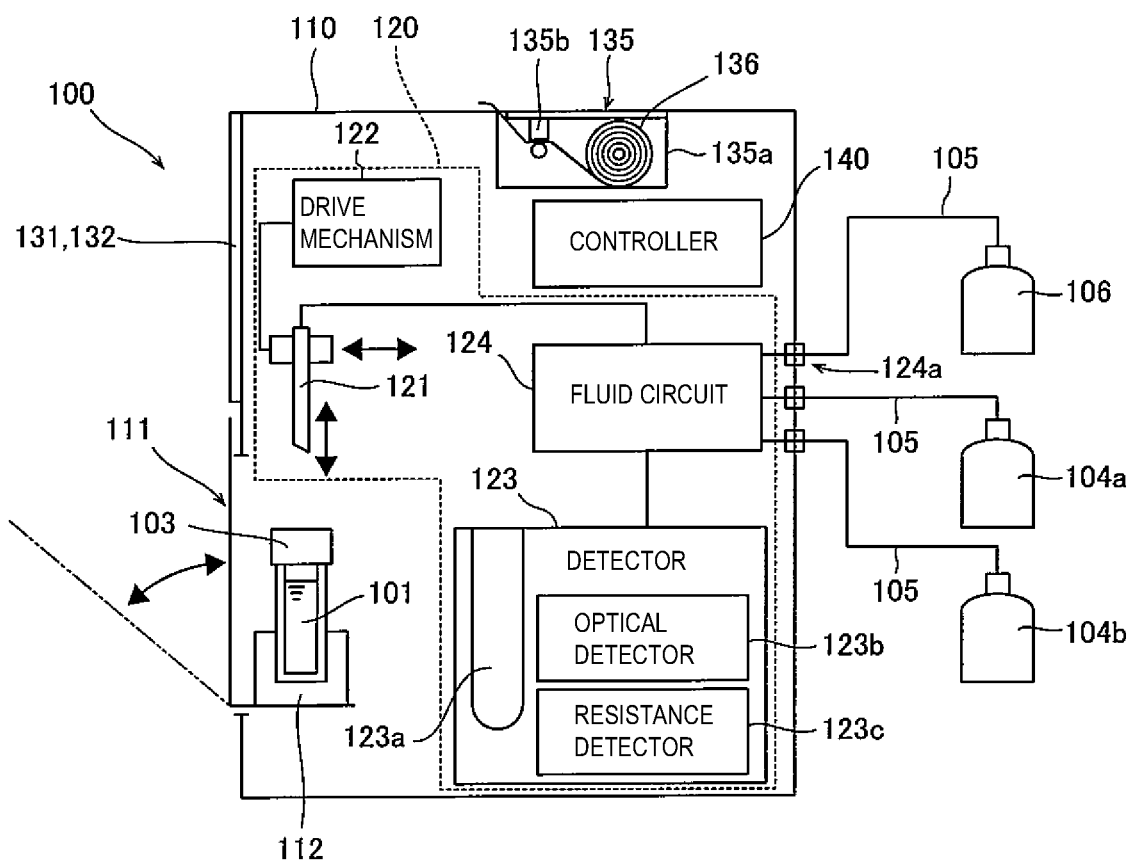
FIG. 3 is a schematic view illustrating an internal configuration example of the specimen analyzer.

In the example illustrated in FIG. 3, print unit 135 is configured such that it can change the size of print sheet 136, and is configured to print analysis results 102 on the same surface of a single piece of print sheet 136. To be more specific, print unit 135 includes sheet set unit 135a which holds print sheet 136 which is elongated, and changes the size of print sheet 136 by printing on an area of print sheet 136 with an appropriate length depending on the print amount. In the example of FIG. 3, set to sheet set unit 135a is print sheet 136 which is roll paper being rolled thermal paper which is elongated with a predetermined width. In addition, print unit 135 includes print head 135b which heats print sheet 136, and prints using print head 135b while forwarding rolled print sheet 136 with a not-illustrated motor. Thus, print unit 135 prints on an area of print sheet 136 with an appropriate length depending on the amount of information to be printed including analysis results 102. The user cuts the printed sheet sent from print unit 135 in an appropriate length, and acquires one sheet of printed sheet on which analysis results 102 are printed.

Container set unit 111 includes adapter 112 for holding a lower portion of specimen container 103. When open, container set unit 111 is capable of holding specimen container 103 in an upright state. Here, in addition to specimen container 103, it is possible to set, to container set unit 111, a QC reagent container (not illustrated) which contains a control specimen (hereinafter referred to as QC reagent) for quality control and cleaning agent container 104c.

Analysis unit 120 includes pipette 121 for aspirating specimen 101 from specimen container 103 set to container set unit 111 and drive mechanism 122 for pipette 121.

Moreover, analysis unit 120 includes detector 123 for detecting components in specimen 101 and fluid circuit 124 for feeding liquid. Furthermore, analysis unit 120 (see FIG. 4) includes a computer which has processor 141 and memory 142.

Pipette 121 is an aspiration tube for measuring the amount of a liquid. Drive mechanism 122 includes linear mechanisms made up of e.g. a guiderail, a motor, and a belt pulley mechanism, and holds pipette 121. Pipette 121 is provided at a position above specimen container 103 set in container set unit 111, and is configured such that it can move in the up-down direction and in the horizontal direction. Pipette 121 is connected to a syringe pump provided in fluid circuit 124, and is capable of aspirating a predetermined amount of specimen 101 contained in specimen container 103. Pipette 121 is moved down from a position above specimen container 103, enters the inside of specimen container 103, and is allowed to aspirate a predetermined amount of specimen 101 by fluid circuit 124. Moreover, pipette 121 is moved by drive mechanism 122 to a position above a mixing chamber of fluid circuit 124 to be described later and to a position above container unit 123*a* of detector 123, and is allowed to aspirate and discharge liquid by fluid circuit 124 at each of the positions. In the case where the QC reagent container containing the QC reagent and the cleaning agent container are set in container set unit 111, pipette 121 can also aspirate the QC reagent and the cleaning agent by performing the same or similar operations.

Fluid circuit 124 includes e.g. a mixing chamber, a pressure source, a syringe pump, a diluted solution, chambers for hemolyzer and waste liquid, a cleaning Spitz for cleaning pipette 121, various valves for switching liquid feed, and a sensor. Fluid circuit 124 connects pipette 121 and detector 123 together in a fluid manner via a flow path such as a liquid feed tube. Moreover, fluid circuit 124 is connected in a fluid manner to external connectors 124*a* provided on the back surface of apparatus body 110. The number of external connectors 124*a* provided is three, which are separately connected via connection tubes 105 to diluted solution container 104*a*, hemolyzer container 104*b*, and waste liquid container 106.

Fluid circuit 124 mixes a predetermined amount of specimen 101 aspirated by pipette 121 and a predetermined amount of diluted solution in a mixing chamber to prepare an RBC/PLT measurement specimen, which is a diluted specimen with a predetermined ratio. In addition, fluid circuit 124 mixes a predetermined amount of specimen 101, a predetermined amount of diluted solution, and a predetermined amount of hemolyzer to prepare a WBC/HGB measurement specimen which includes a mixed solution of blood specimen, diluted solution, and hemolyzer.

Detector 123 is configured to measure the target components in specimen 101 corresponding to the analysis items. In the example of FIG. 3, detector 123 measures multiple items. In the example of FIG. 3, detector 123 is configured to perform measurement in accordance with multiple measurement principles depending on the target components of the analysis items.

To be more specific, detector 123 performs RBC measurement and PLT measurement using a sheath flow electrical resistance method. Detector 123 performs WBC measurement using an electrical resistance method. Detector 123 includes resistance detector 123*b* for performing measurement using the sheath flow electrical resistance method and the electrical resistance method. Moreover, detector 123 performs HGB measurement using a colorimetric method. Detector 123 includes optical detector 123*c* for performing measurement using the colorimetric method.

The sheath flow electrical resistance method forms a sheath flow of a specimen flow and a flow of sheath liquid surrounding the specimen flow, and causes the sheath flow to pass through an orifice. Electrodes are provided in front and rear of the orifice, respectively, in the flow direction. A pulse signal, which represents the presence and volume information of each blood cell, is measured based on the change in resistance between the electrodes generated by the blood cells passing through the orifice.

Here, the diluted solution forms the flow of sheath liquid, and the RBC/PLT measurement specimen forms the specimen flow. Resistance detector 123*b* includes an orifice and a pair of electrodes used for measurement. Analysis unit 120 obtains the red blood cell count (RBC), the platelet count (PLT), and the hematocrit value (HCT) from the measured count value of the pulse signal.

The electrical resistance method causes the WBC/HGB measurement specimen to pass through an orifice, and measures a pulse signal which represents the presence and volume information of each blood cell based on the change in resistance between the front and rear electrodes of the orifice. Analysis unit 120 obtains the white blood cell count (WBC) from the measured count value of the pulse signal.

The colorimetric method causes a light source to emit measurement light to the WBC/HGB measurement specimen, and detects the measurement light having passed through the specimen with a light receiving element. Additionally, the same process is also performed on the diluted solution as a blank, and analysis unit 120 obtains the hemoglobin concentration (HGB) based on the difference in absorbance between the diluted solution and the WBC/HGB measurement specimen. Optical detector 123*c* includes the light source and the light receiving element used for measurement. The light source is, for example, an LED, and the light receiving element is, for example, a photodiode.

The mean corpuscular volume (MCV), the mean corpuscular hemoglobin (MCH), and the mean corpuscular hemoglobin concentration (MCHC) are calculated by analysis unit 120 from the measurement values of the red blood cell count (RBC), the platelet count (PLT), and the hematocrit value (HCT), respectively.

Based on the analysis results of the measurement items, analysis unit 120 obtains the analysis items of the WBC-small cell ratio (% Lymph), the WBC-middle cell ratio (% OtherWBC), the WBC-large cell ratio (% Neut), the WBC-small cell count (#Lymph), the WBC-middle cell count (#OtherWBC), the WBC-large cell ratio (#Neut), the red blood cell distribution width (RDW-SD and RDW-CV), the mean platelet volume (MPV).

Figure 4:
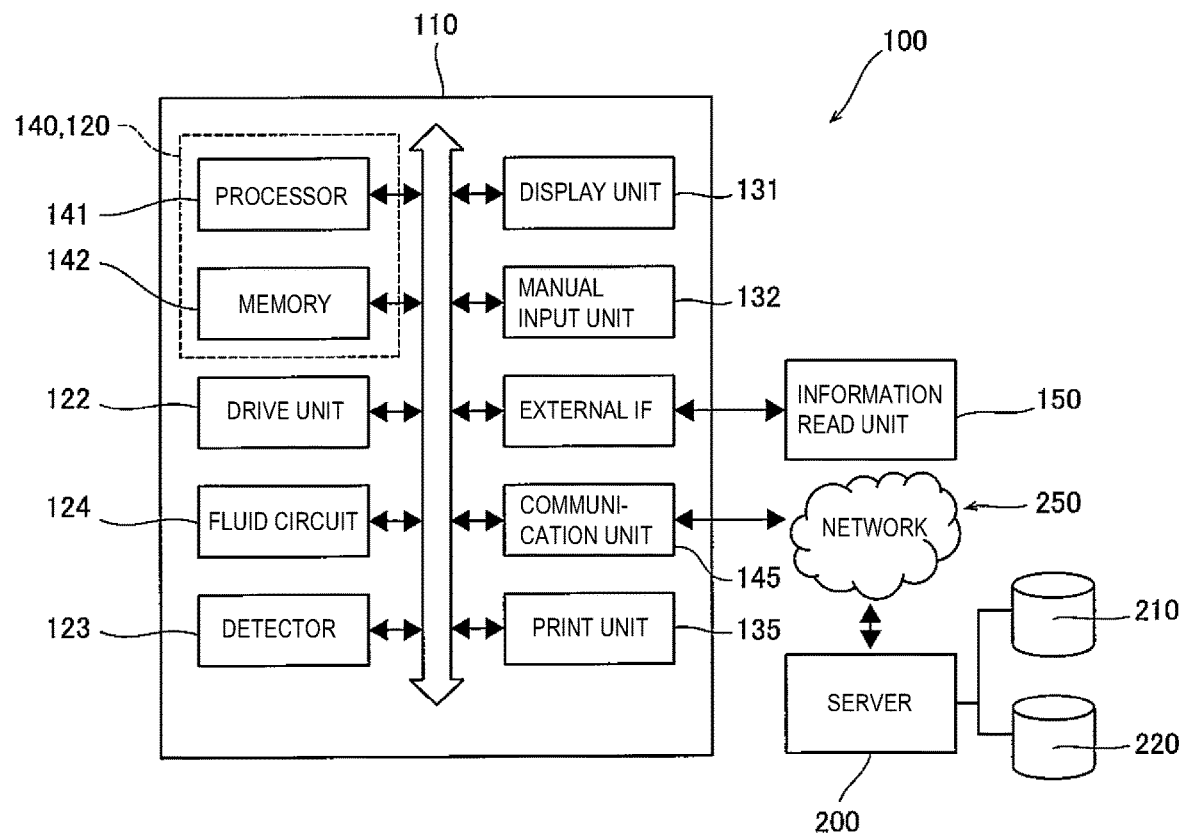
FIG. 4 is a block diagram illustrating a configuration of the specimen analyzer.

As illustrated in FIG. 4, controller 140 includes processor 141 such as a CPU and memory 142. Memory 142 can include a volatile memory such as a RAM, and a non-volatile memory such as a ROM, a flash memory, and a hard disk. Memory 142 has, for example, a control program for controlling specimen analyzer 100, analysis program for obtaining analysis results 102, and display screen data of display unit 131 recorded therein. Processor 141 executes a program recorded in memory 142 and thereby functions as controller 140 which performs operation control of units such as drive mechanism 122, fluid circuit 124, detector 123, display unit 131, and print unit 135. Moreover, processor 141 functions as part of analysis unit 120 which obtains analysis results 102 of the analysis items by executing the programs recorded in memory 142. Controller 140 and analysis unit 120 may be configured as a separate processor and memory. Furthermore, controller 140 obtains information inputted through manual input unit 132 and processes that information. What is more, controller 140 controls read operation by information read unit 150 through an external IF, and processes the read information. Still further, controller 140 is capable of connecting to network 250 via communication unit 145, and thus accessing management server 200 of specimen analyzer 100. Communication unit 145 includes a communication interface, and establishes cabled or wireless connection to network 250. Communication unit 145 connects to network 250 via, for example, an Ethernet cable.

(Description on Server)

Registered with storage unit 210 of server 200 are serial numbers of individual specimen analyzers 100. To be more specific, the user is allowed to use only specimen analyzers 100 registered with server 200. Registered with storage unit 220 of server 200 are lot numbers and serial numbers of reagents. To be more specific, the user is allowed to use only the reagents registered with server 200 in specimen analyzer 100. Moreover, stored in storage unit 220 of server 200 is information on a QC reagent being a control specimen for quality control. Information on a QC reagent is stored associated with the lot number of that QC reagent. To be more specific, information on a QC reagent includes information on a measurement range of the QC reagent. For example, QC reagents used include a High QC reagent containing a highly concentrated component, a Normal QC reagent containing a normally concentrated component, and a Low QC reagent containing a low concentrated component. A normal value of the measurement result is set for each QC reagent depending on High, Normal, and Low. Moreover, the QC reagent has a varying normal value depending on the lot. In light of this, storage unit 220 of server 200 stores ranges of normal values in the case of measuring QC reagents depending on the types High, Normal, and Low, and the lot number.

[Operation Example of Specimen Analyzer]

Figure 5:
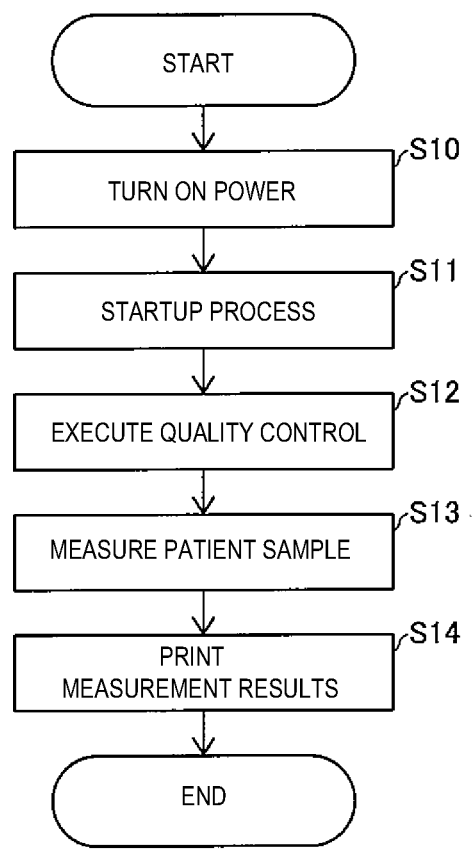
FIG. 5 is a flowchart illustrating an example of operations of the specimen analyzer.

With reference to FIG. 5, an operation example of specimen analyzer 100 is described.

When the power is turned ON at step S10, a startup process is performed at step S11. To be more specific, the system is automatically checked. Also, the inside of the apparatus is automatically cleaned. Additionally, blank check is performed.

At step S12, quality control is executed. The quality control is performed at predetermined time intervals. Display unit 131 displays a screen requiring quality control at predetermined time intervals. The user inputs data concerning quality control in accordance with what is being displayed, and instructs to measure quality control substances.

At step S13, a patient sample as a specimen is measured. Display unit 131 displays a screen of an instruction for sample measurement. The user performs sample measurement instruction in accordance with what is being displayed. At step S14, the measurement results are printed. To be more specific, the measured and analyzed results are printed and outputted from print unit 135. Note that display unit 131 does not display the measurement results.

[Description on Sample Measurement Process]

Figure 6:
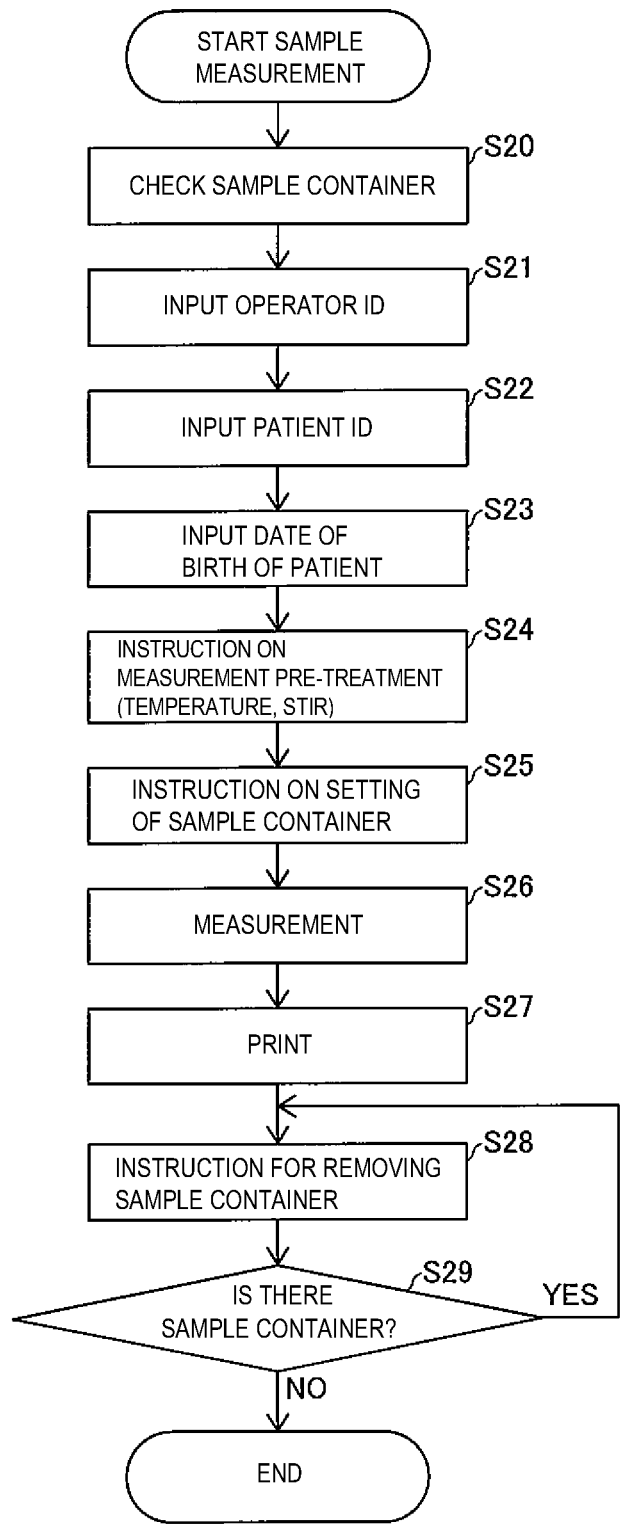
FIG. 6 is a flowchart illustrating an example of a sample measurement process.

With reference to FIG. 6, an example of a sample measurement process by specimen analyzer 100 is described. In the example illustrated in FIG. 6, specimen analyzer 100 measures and analyzes the sample of a patient as a specimen.

At step S20, a sample container is checked. To be more specific, display unit 131 displays images of the types of sample containers available. The user checks the sample container by comparing the images and the actual sample container. At step S21, an operator ID is inputted. To be more specific, the user inputs an ID for identifying the operator in accordance with the instructions of display unit 131.

At step S22, a patient ID is inputted. To be more specific, the user inputs an ID for identifying the patient in accordance with the instructions of display unit 131. At step S23, the date of birth of the patient is inputted. To be more specific, the user inputs the date of birth of the patient being the sample to be measured in accordance with the instructions of display unit 131.

At step S24, a measurement pre-treatment is performed. To be more specific, display unit 131 displays the instructions on the pre-treatment. The user performs the pre-treatment such as heating and stirring of the sample in accordance with the instructions of display unit 131. At step S25, a sample container is set. To be more specific, display unit 131 displays the instructions on the setting of the sample container. The user sets the sample container in specimen analyzer 100 in accordance with the instructions of display unit 131.

At step S26, the sample is measured. When the measurement of the sample finishes, measurement results are printed at step S27. To be more specific, after the measurement finishes, display unit 131 displays a button for starting of the printing. When the user operates the button for starting of the printing, print unit 135 prints the measurement result. The printing results are, for example, the name of the hospital, its location, the name of the measurement apparatus, the date and time of measurement, the operator ID, patient ID, the date of birth of the patient, the measurement results, messages, information on the reference value, and a print end mark.

At step S28, the sample container is removed. To be more specific, display unit 131 displays the instructions for removing the sample container. The user removes the sample container from specimen analyzer 100 in accordance with the instructions of display unit 131. At step S29, determination is made as to whether or not there is a sample container. If there is a sample container, the process returns to step S28, and if there is no sample container, the sample measurement process finishes.

[Display Example of Display Unit]

With reference to FIG. 7 to FIG. 48, a display example of display unit 131 in a case of using specimen analyzer 100 is described. It is possible to operate specimen analyzer 100 by following a series of instructions displayed on display unit 131.

(Display Example when Connecting Ethernet Cable)

Figure 7:
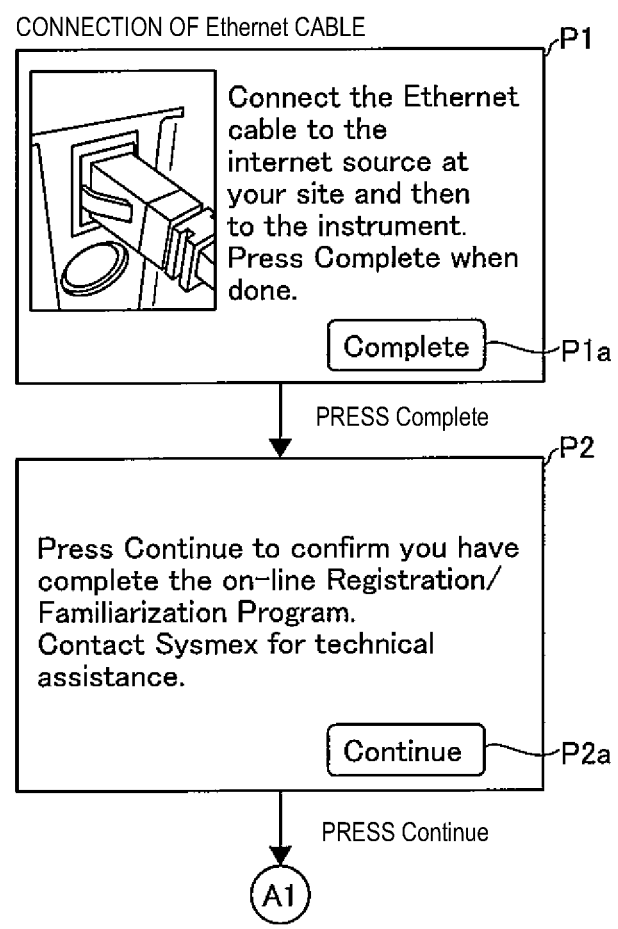
FIG. 7 is a diagram illustrating display example 1 for connecting an Ethernet cable.
Figure 8:
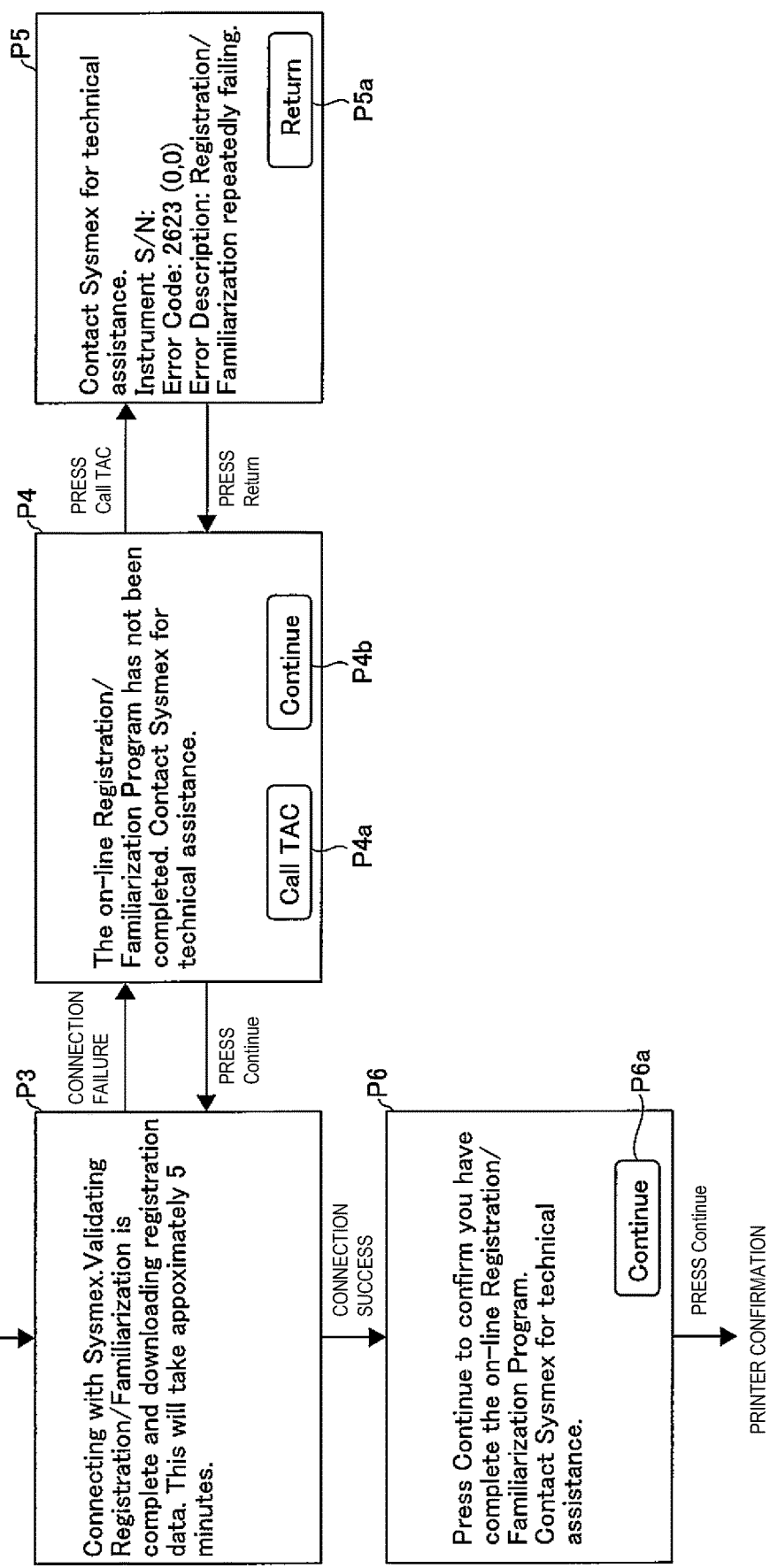
FIG. 8 is a diagram illustrating display example 2 for connecting an Ethernet cable.

With reference to FIG. 7 and FIG. 8, a display example when connecting an Ethernet cable is described.

It is impossible to use specimen analyzer 100 unless it is connected to server 200 via network 250. To be more specific, it is possible to use specimen analyzer 100 if it is registered with server 200. It is necessary to connect to server 200 in order to check whether or not specimen analyzer 100 is registered. Specimen analyzer 100 is connected to network 250 with an Ethernet cable. To this end, it is necessary to connect an Ethernet cable to specimen analyzer 100.

To begin with, when specimen analyzer 100 is set and the power is turned on, display unit 131 first displays a screen for connecting an Ethernet cable. To be more specific, as illustrated in FIG. 7, display unit 131 displays screen P1. Screen P1 shows a picture and an instruction on how to insert the Ethernet cable to specimen analyzer 100. Also, screen P1 shows Complete button P1a. When Complete button P1a is pressed, display unit 131 displays screen P2. Screen P2 shows Continue button P2a. When Continue button P2a is pressed, display unit 131 displays screen P3, as illustrated in FIG. 8. Thus, communication unit 145 of specimen analyzer 100 starts connection to server 200.

If the connection fails while screen P3 is being displayed, display unit 131 displays screen P4. Screen P4 shows Call TAC button P4a and Continue button P4b. When Call TAC button P4a is pressed, display unit 131 displays screen P5. When Continue button P4b is pressed, display unit 131 again displays screen P3.

Screen P5 shows error details. If the user telephones to a TAC (Technical Assistance Center) and communicates the description of screen P5, he/she can receive support smoothly. Screen P5 shows Return button P5a. When Return button P5a is pressed, display unit 131 displays screen P4.

If the connections succeeds while screen P3 is being displayed, display unit 131 displays screen P6. Screen P6 shows Continue button P6a. When Continue button P6a is pressed, the instructions to connect an Ethernet cable stop being displayed. Then, the screen proceeds to a screen of printer confirmation.

(Display Example at Printer Confirmation)

With reference to FIG. 9 to FIG. 12, a display example at printer confirmation is described.

Figure 9:
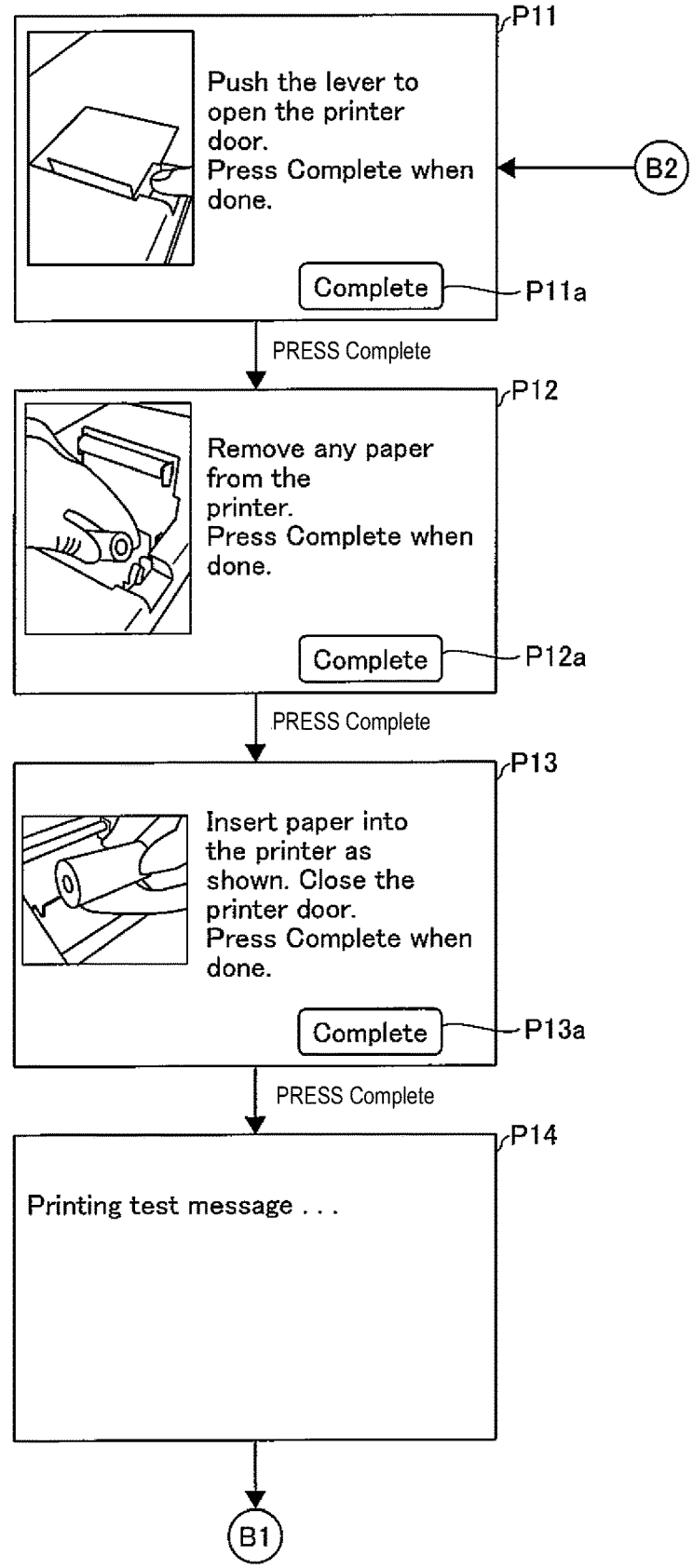
FIG. 9 is a diagram illustrating display example 1 for printer confirmation.

Display unit 131 displays a screen for confirming a printer as print unit 135. As illustrated in FIG. 9, display unit 131 displays screen P11. Screen P11 shows a picture and an instruction on how to open a door of the printer. Also, screen P11 shows Complete button P11a. When Complete button P11a is pressed, display unit 131 displays screen P12. Screen P12 shows a picture and an instruction on how to remove paper from the printer. Also, screen P12 shows Complete button P12a. When Complete button P12a is pressed, display unit 131 displays screen P13.

Screen P13 shows a picture and an instruction on how to insert paper in the printer and close the door. Also, screen P13 shows Complete button P13a. When Complete button P13a is pressed, display unit 131 displays screen P14. Thus, print unit 135 starts test printing.

Figure 10:
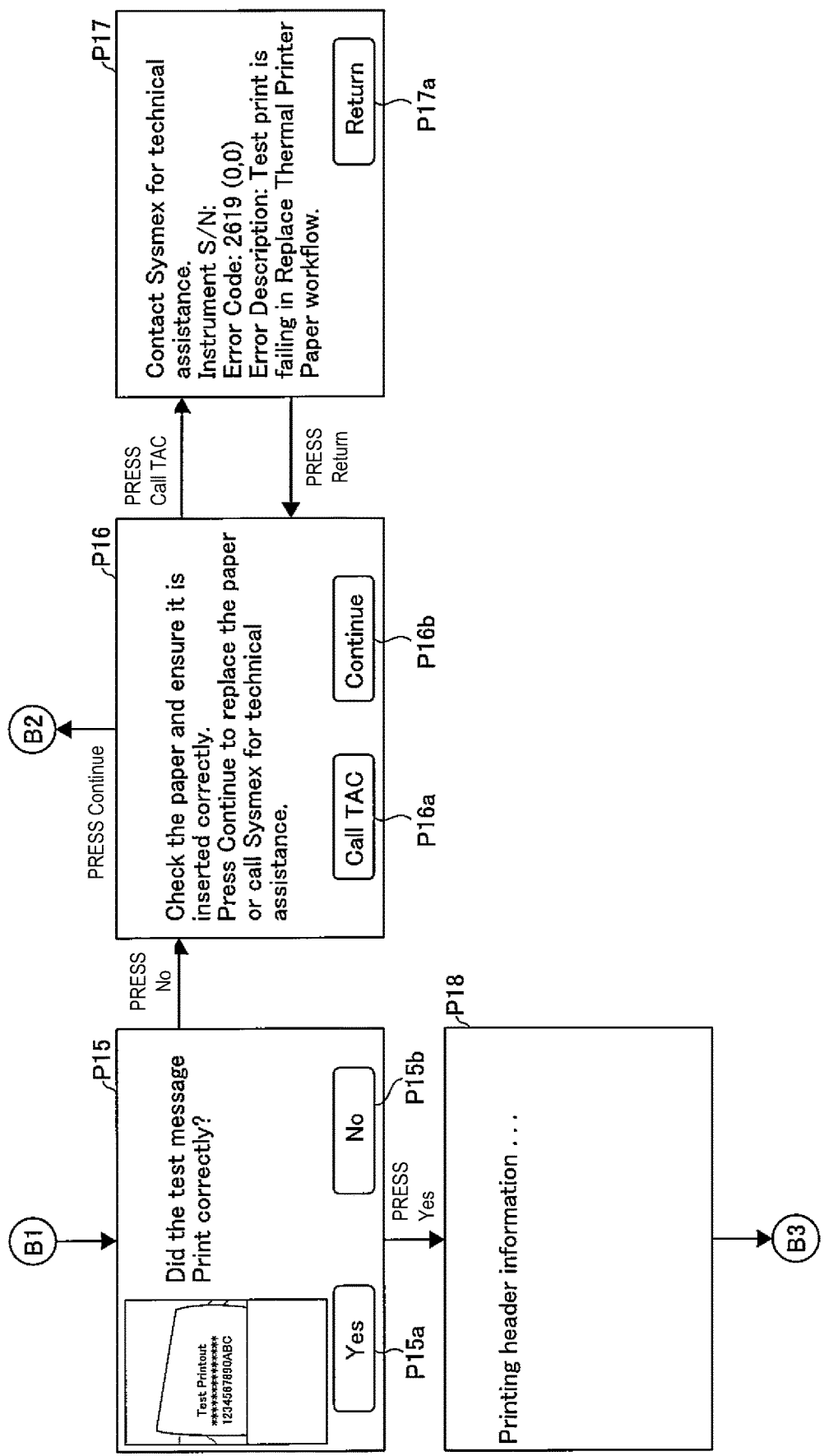
FIG. 10 is a diagram illustrating display example 2 for printer confirmation.

When the test printing finishes, display unit 131 displays screen P15 as illustrated in FIG. 10. Screen P15 shows a question asking whether or not the test printing has been correctly done, Yes button P15a, and No button P15b. When No button P15b is pressed, display unit 131 displays screen P16. When Yes button P15a is pressed, display unit 131 displays screen P18.

Screen P16 shows Call TAC button P16a and Continue button P16b. When Call TAC button P16a is pressed, display unit 131 displays screen P17. When Continue button P16b is pressed, display unit 131 again displays screen P11 (see FIG. 9).

Screen P17 shows error details. If the user telephones to the TAC and communicates the description of screen P17, he/she can receive support smoothly. Screen P17 shows Return button P17a. When Return button P17a is pressed, display unit 131 displays screen P16.

Figure 11:
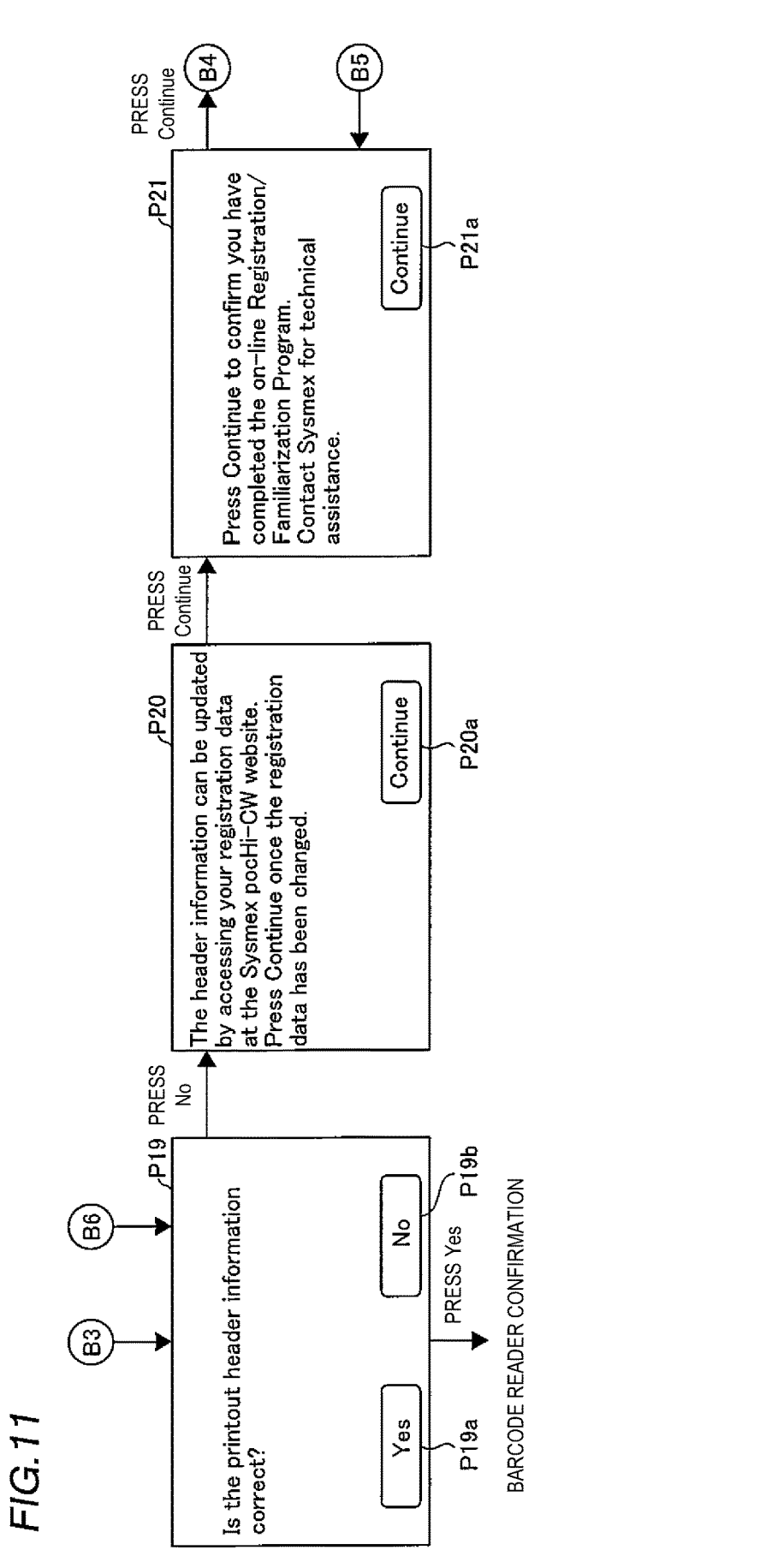
FIG. 11 is a diagram illustrating display example 3 for printer confirmation.

Display unit 131 displays screen P18 and print unit 135 starts printing header information. When the printing of the header information finishes, display unit 131 displays screen P19, as illustrated in FIG. 11. Screen P19 shows a question asking whether or not the header information is correct, Yes button P19a, and No button P19b. When No button P19b is pressed, display unit 131 displays screen P20. When Yes button P19a is pressed, printer confirmation stops being displayed. Then, the screen proceeds to a screen of barcode reader conformation.

Figure 12:
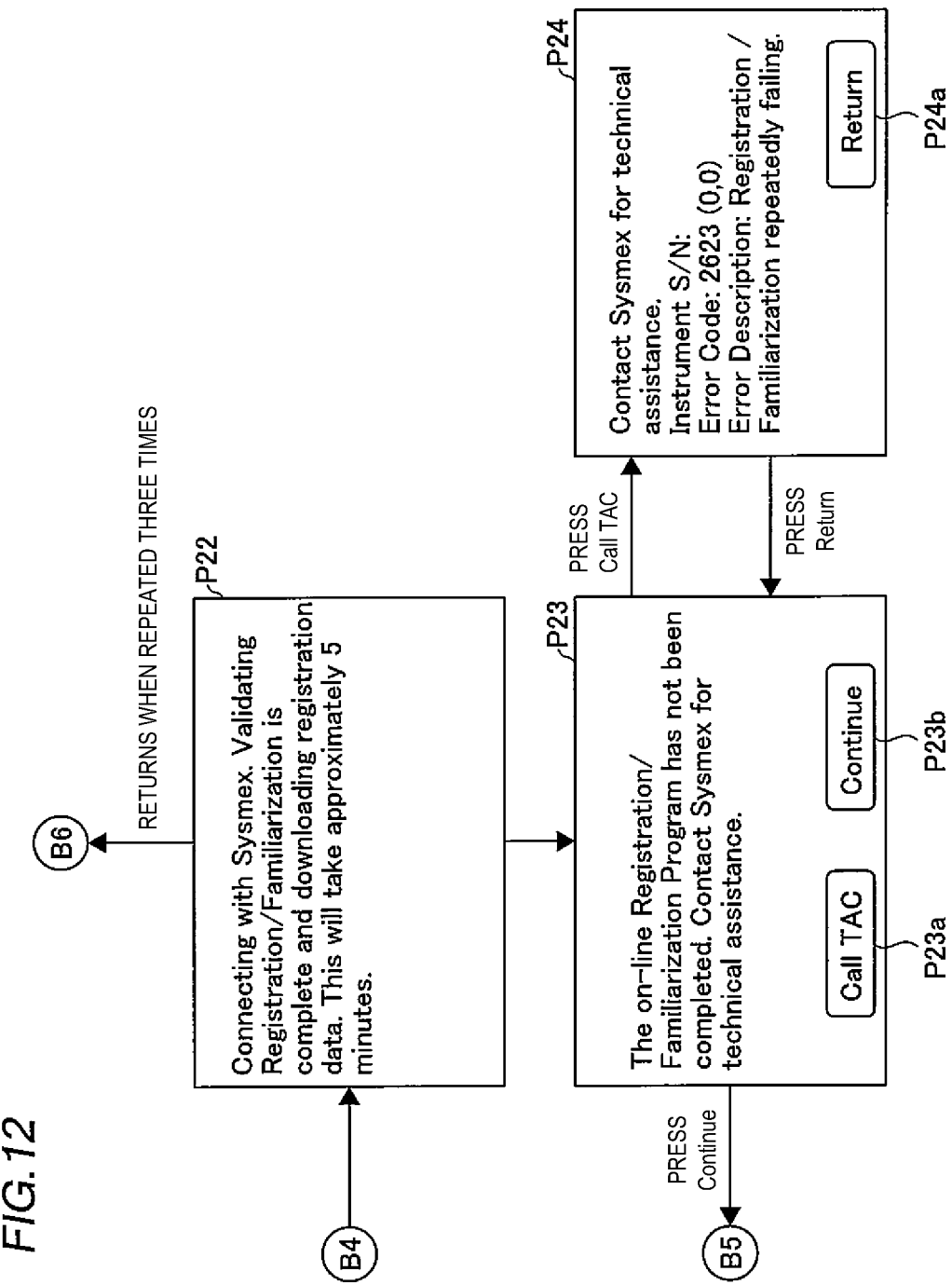
FIG. 12 is a diagram illustrating display example 4 for printer confirmation.

Screen P20 shows a description on update of header information and Continue button P20a. When Continue button P20a is pressed, display unit 131 displays screen P21. Screen P21 shows Continue button P21a. When Continue button P21a is pressed, screen P22 is displayed, as illustrated in FIG. 12.

Screen P22 shows a description on data download. Then, display unit 131 displays screen P23. It is to be noted that if screen P22 is repeated three times, display unit 131 displays screen P19 (see FIG. 11). Screen P23 shows Call TAC button P23a and Continue button P23b. When Call TAC button P23a is pressed, display unit 131 displays screen P24. When Continue button P23b is pressed, display unit 131 again displays screen P21 (see FIG. 11).

Screen P24 shows error details. If the user telephones to the TAC and communicates the description of screen P24, he/she can receive support smoothly. Screen P24 shows Return button P24a. When Return button P24a is pressed, display unit 131 displays screen P23.

(Display Example at Barcode Reader Confirmation)

With reference to FIG. 13, a display example at barcode reader confirmation is described.

Specimen analyzer 100 can input information on a reagent as a consumable and on CELLCLEAN for cleaning only through a barcode reader as information read unit 150. To be more specific, it is necessary to correctly attach a barcode reader to specimen analyzer 100.

As barcode reader confirmation, display unit 131 displays screen P31, as illustrated in FIG. 13. Screen P31 shows a picture of the barcode reader, a question asking whether or not the barcode reader gives off red light when the button is pressed, Yes button P31a, and No button P31b. When No button P31b is pressed, display unit 131 displays screen P32. When Yes button P31a is pressed, display unit 131 displays screen P36.

Screen P32 shows a picture instructing to connect the barcode reader, a question asking whether or not the barcode reader is connected to specimen analyzer 100, Yes button P32a, and No button P32b. When No button P32b is pressed, display unit 131 displays screen P33. When Yes button P32a is pressed, display unit 131 displays screen P34. Screen P33 shows a picture and an instruction on how to connect the barcode reader. Also, screen P33 shows Complete button P33a. When Complete button P33a is pressed, display unit 131 displays screen P31.

Screen P34 shows a description on a problem with the barcode reader and Call TAC button P34a. When Call TAC button P34a is pressed, display unit 131 displays screen P35. Screen P35 shows Return button P35a. When Return button P35a is pressed, display unit 131 displays screen P34.

Screen P36 shows a picture and an instruction on how to read the barcode of the Quick Guide using the barcode reader. When the barcode reader completes reading the barcode of the Quick Guide, display unit 131 displays screen P37. Screen P37 shows Continue button P37a. When Continue button P37a is pressed, the screen of barcode reader confirmation finishes being displayed. Then, the screen proceeds to a screen of the connection of various types of tubes.

(Display Example at Connection of Various Types of Tubes)

With reference to FIG. 14, a display example at the connection of various types of tubes is described.

Display unit 131 displays screen P41 in order to connect various types of tubes to specimen analyzer 100, as illustrated in FIG. 14. Screen P41 shows a picture and an instruction on how to connect various types of tubes to specimen analyzer 100. Also, screen P41 shows Complete button P41a. When Complete button P41a is pressed, display unit 131 displays screen P42. Screen P42 shows instructions to place a reagent container, a waste liquid container etc. to be connected to tubes next to specimen analyzer 100. Also, screen P42 shows Complete button P42a. When Complete button P42a is pressed, display unit 131 displays screen P43.

Screen P43 shows a picture and an instruction on how to connect the waste liquid container. Also, screen P43 shows Complete button P43a. When Complete button P43a is pressed, display unit 131 displays screen P44. Finally, the screen on connecting various types of tubes finishes being displayed. Then, the screen proceeds to a screen of reagent setting.

(Display Example when Setting Reagent)

With reference to FIG. 15 to FIG. 21, a display example when setting a reagent is described.

Figure 15:
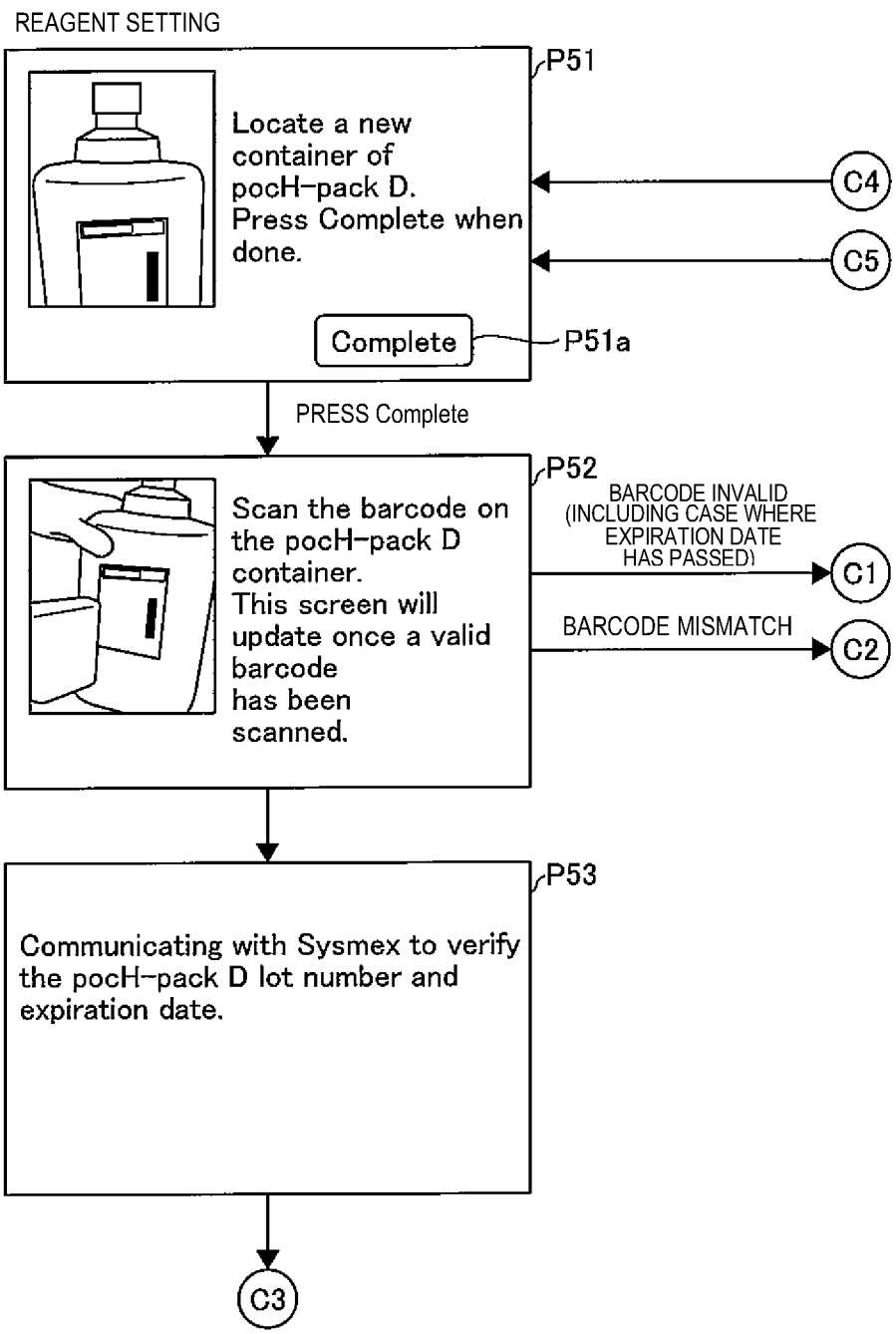
FIG. 15 is a diagram illustrating display example 1 for setting a reagent.

Display unit 131 displays screen P51 in order to set a reagent, as illustrated in FIG. 15. Screen P51 shows a picture and an instruction on how to set a container of a diluted solution used to analyze a specimen. Also, screen P51 shows Complete button P51a. When Complete button P51a is pressed, display unit 131 displays screen P52. Screen P52 shows a picture and an instruction on how to read a barcode attached on the container of the diluted solution. When the barcode is correctly read, display unit 131 displays screen P53. If a barcode is invalid, including the case where the expiration date has passed, display unit 131 displays screen P54 (see FIG. 16). If the barcode does not match, display unit 131 displays screen P55 (see FIG. 16).

While screen P53 is being displayed, connection is established to server 200, and whether or not the reagent can be used is checked. Thereafter, display unit 131 displays screen P57 (see FIG. 17).

Figure 16:
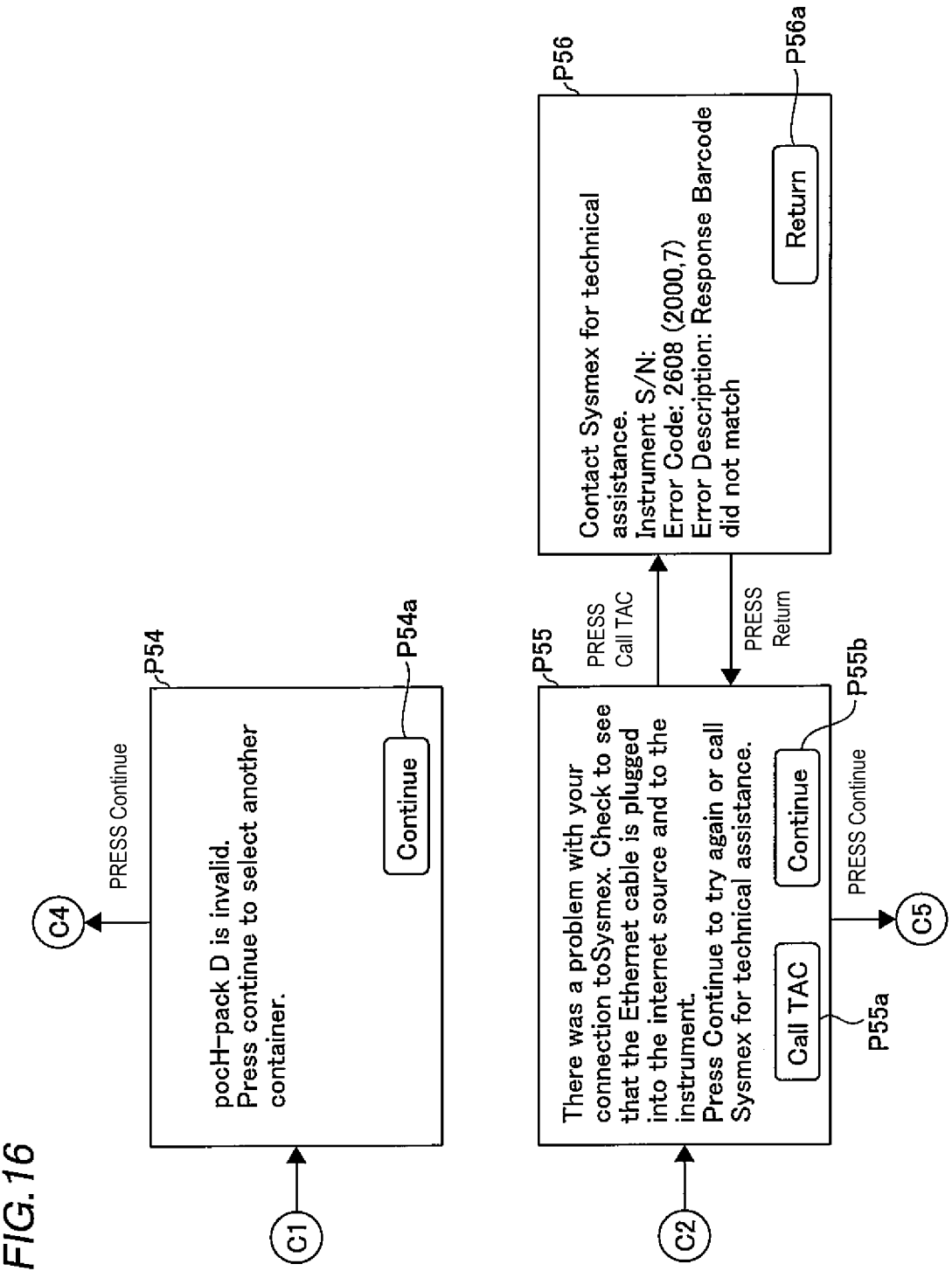
FIG. 16 is a diagram illustrating display example 2 for setting a reagent.

As illustrated in FIG. 16, screen P54 shows a description that the reagent of the read barcode is invalid. Also, screen P54 shows Continue button P54a. When Continue button P54a is pressed, display unit 131 displays screen P51 (see FIG. 15).

Screen P55 shows a description that there is a problem with the connection. Also, screen P55 shows Call TAC button P55a and Continue button P55b. When Call TAC button P55a is pressed, display unit 131 displays screen P56. When Continue button P55b is pressed, display unit 131 displays screen P51 (see FIG. 15). Screen P56 shows error details. If the user telephones to the TAC and communicates the description of screen P56, he/she can receive support smoothly. Screen P56 shows Return button P56a. When Return button P56a is pressed, display unit 131 displays screen P55.

Figure 17:
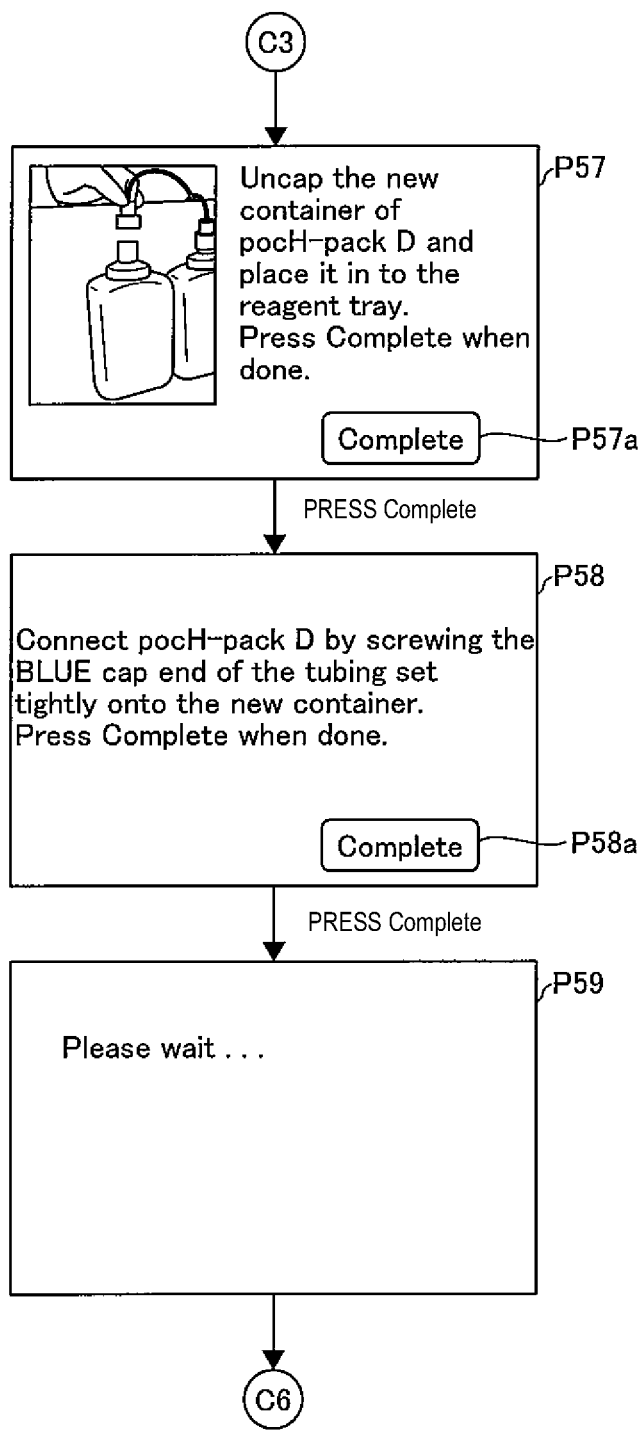
FIG. 17 is a diagram illustrating display example 3 for setting a reagent.
Figure 18:
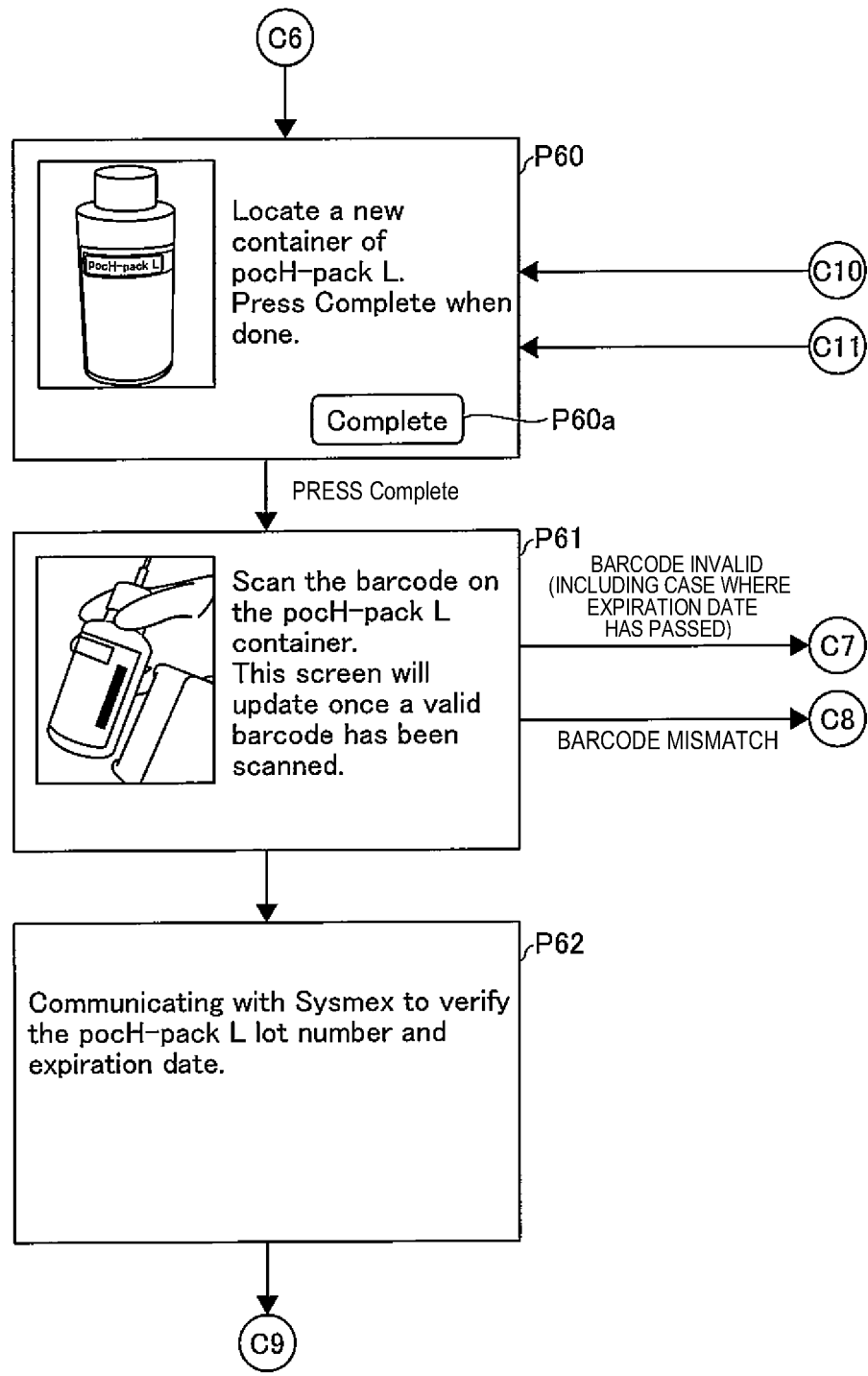
FIG. 18 is a diagram illustrating display example 4 for setting a reagent.

As illustrated in FIG. 17, screen P57 shows a picture and an instruction on how to place the reagent container. Also, screen P57 shows Complete button P57a. When Complete button P57a is pressed, display unit 131 displays screen P58. Screen P58 shows a description to connect the reagent container and the tube together. Also, screen P58 shows Complete button P58a. When Complete button P58a is pressed, display unit 131 displays screen P59. Thereafter, as illustrated in FIG. 18, display unit 131 displays screen P60.

Screen P60 shows a picture and an instruction on how to set a container of a hemolyzer used to analyze a specimen. Also, screen P60 shows Complete button P60a. When Complete button P60a is pressed, display unit 131 displays screen P61. Screen P61 shows a picture and an instruction on how to read a barcode attached on the container of the hemolyzer. When the barcode is correctly read, display unit 131 displays screen P62. If a barcode is invalid, including the case where the expiration date has passed, display unit 131 displays screen P63 (see FIG. 19). If the barcode does not match, display unit 131 displays screen P64 (see FIG. 19).

While screen P62 is being displayed, connection is established to server 200, and whether or not the reagent can be used is checked. Thereafter, display unit 131 displays screen P66 (see FIG. 20).

Figure 19:
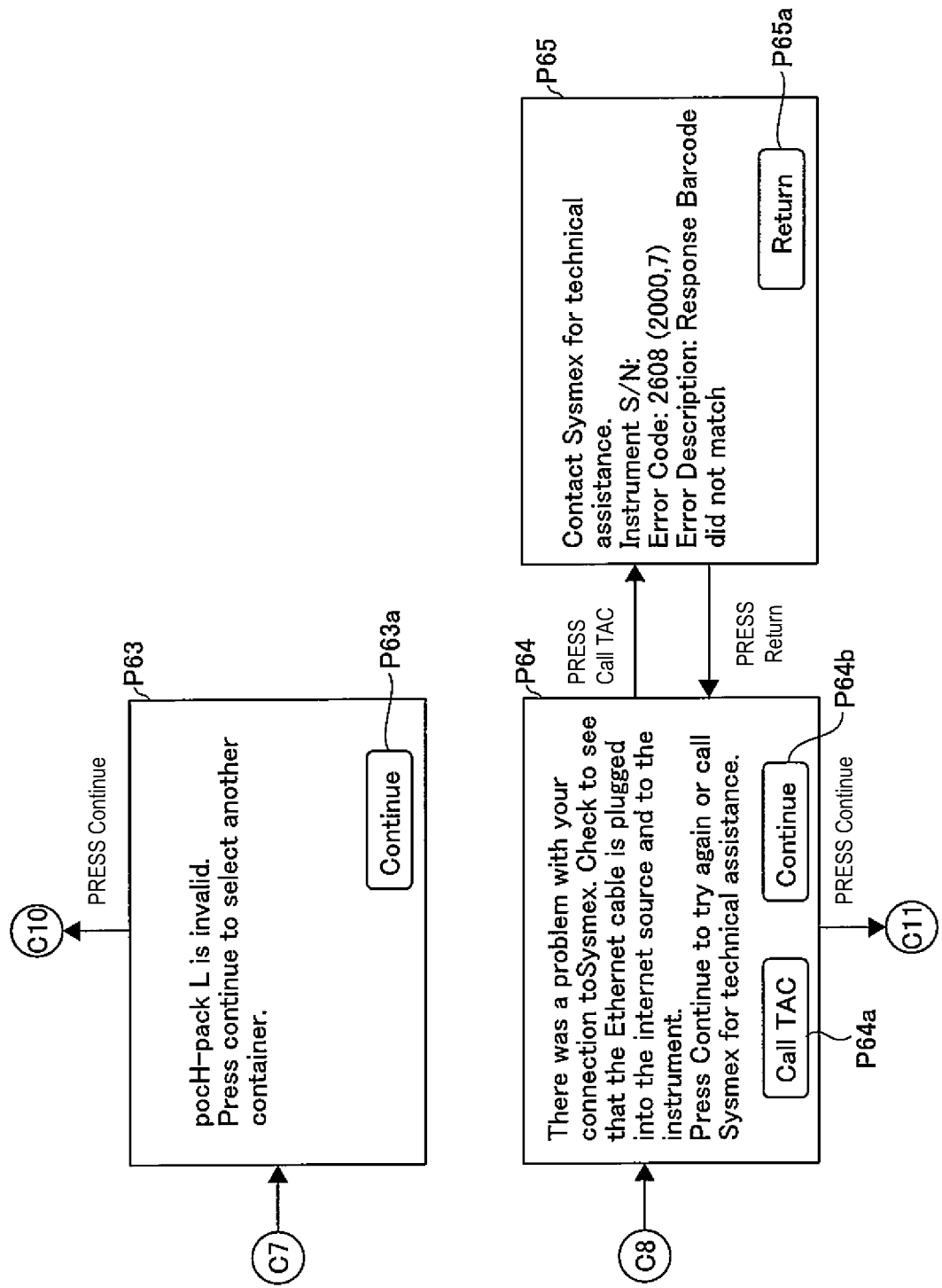
FIG. 19 is a diagram illustrating display example 5 for setting a reagent.

As illustrated in FIG. 19, screen P63 shows a description that the reagent of the read barcode is invalid. Also, screen P63 shows Continue button P63a. When Continue button P63a is pressed, display unit 131 displays screen P60 (see FIG. 18).

Screen P64 shows a description that there is a problem with the connection. Also, screen P64 shows Call TAC button P64a and Continue button P64b. When Call TAC button P64a is pressed, display unit 131 displays screen P65. When Continue button P64b is pressed, display unit 131 displays screen P60 (see FIG. 18). Screen P65 shows error details. If the user telephones to the TAC and communicates the description of screen P65, he/she can receive support smoothly. Screen P65 shows Return button P65a. When Return button P65a is pressed, display unit 131 displays screen P64.

Figure 20:
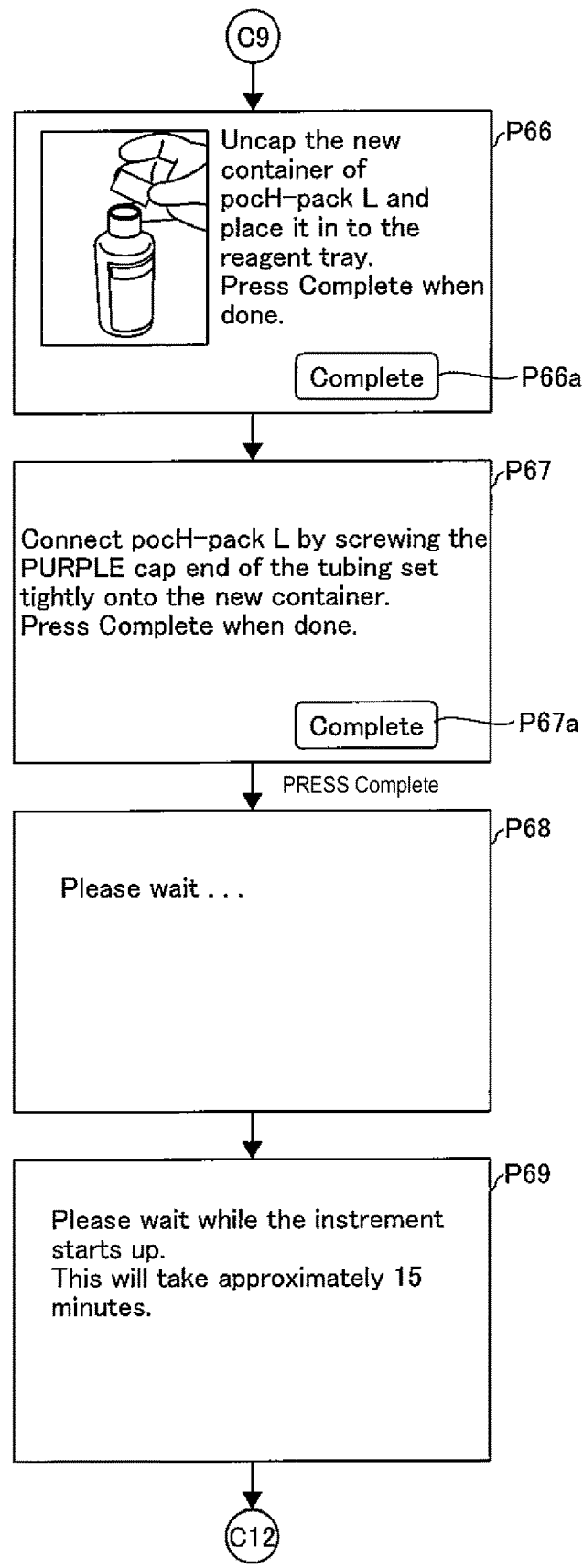
FIG. 20 is a diagram illustrating display example 6 for setting a reagent.
Figure 23:
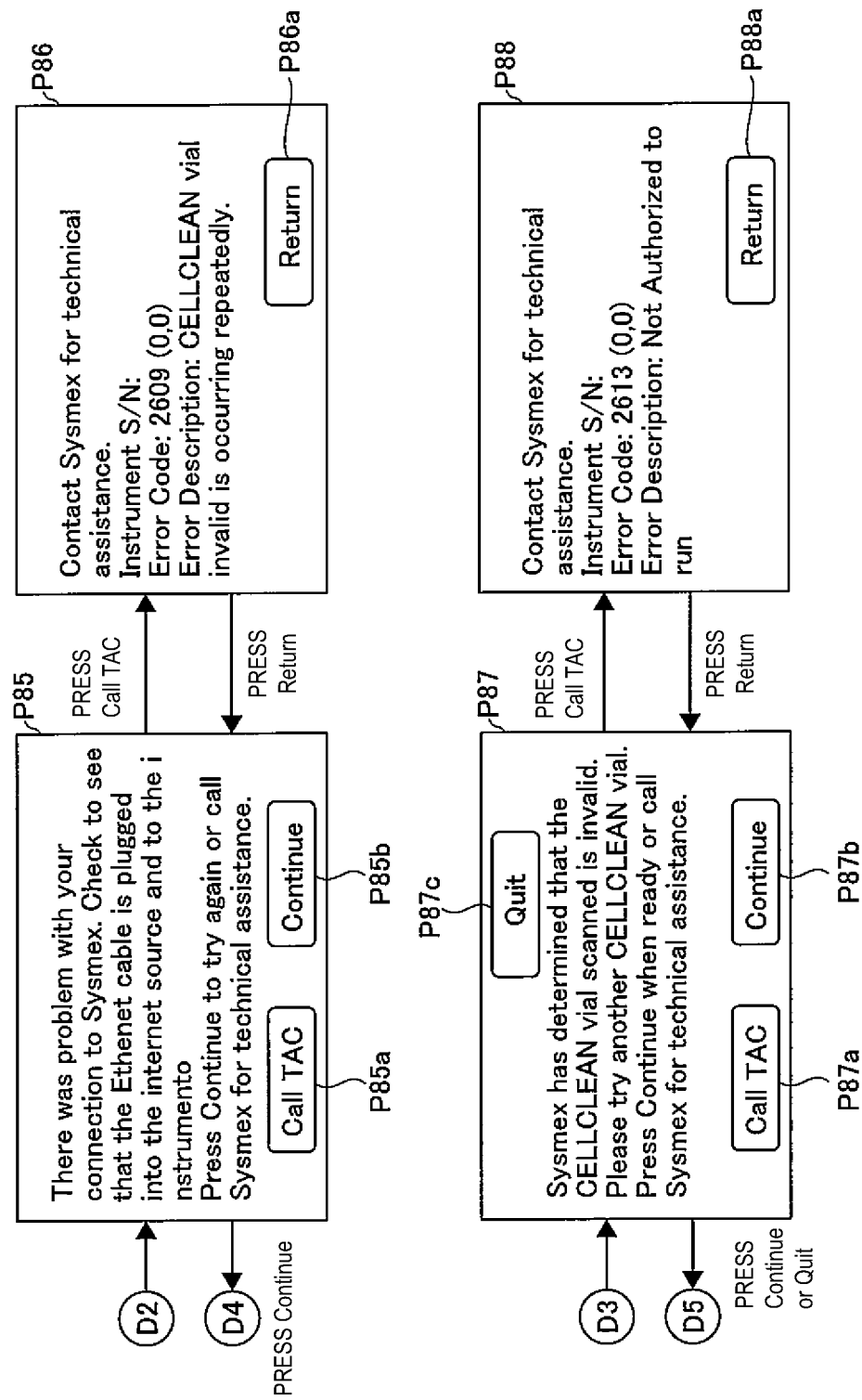
FIG. 23 is a diagram illustrating display example 2 for cleaning by CELLCLEAN.

As illustrated in FIG. 20, screen P66 shows a picture and an instruction on how to place the reagent container. Also, screen P66 shows Complete button P66a. When Complete button P66a is pressed, display unit 131 displays screen P67. Screen P67 shows a description to connect the reagent container and the tube together. Also, screen P67 shows Complete button P67a. When Complete button P67a is pressed, display unit 131 displays screen P68. Thereafter, display unit 131 displays screen P69.

Subsequently, as illustrated in FIG. 21, display unit 131 displays screen P70. In addition, the diluted solution is fed to specimen analyzer 100. Thereafter, display unit 131 displays screen P71. Moreover, the hemolyzer is fed to specimen analyzer 100. Thereafter, display unit 131 displays screen P72. Finally, the screen of setting the reagent finished being displayed. Then, the screen proceeds to a screen of cleaning by CELLCLEAN.

(Display Example of Cleaning by CELLCLEAN)

With reference to FIG. 22 to FIG. 25, a display example of cleaning by CELLCLEAN is described.

As illustrated in FIG. 22, display unit 131 displays screen P81 in order to indicate the necessity of cleaning by CELLCLEAN. Screen P81 shows Continue button P81a. When Continue button P81a is pressed, display unit 131 displays screen P82. Screen P82 shows a picture and an instruction on CELLCLEAN to be used. Also, screen P82 shows Complete button P82a. When Complete button P82a is pressed, display unit 131 displays screen P83.

Screen P83 shows a picture and an instruction on how to open a door and insert an adapter. Also, screen P83 shows Complete button P83a. When Complete button P83a is pressed, display unit 131 displays screen P84. Screen P84 shows a description to read a barcode attached on the container of CELLCLEAN. Also, screen P84 shows Quit button P84a. When the barcode is correctly read, display unit 131 displays screen P89 (see FIG. 24). In the case where the expiration date has passed, display unit 131 displays screen P85 (see FIG. 23). If the barcode does not match, display unit 131 displays screen P87 (see FIG. 23). When Quit button P84a is pressed, display unit 131 displays screen P91 (see FIG. 24).

Screen P85 shows a description that there is a problem with the connection. Also, screen P85 shows Call TAC button P85a and Continue button P85b. When Call TAC button P85a is pressed, display unit 131 displays screen P86. When Continue button P85b is pressed, display unit 131 displays screen P84 (see FIG. 22). Screen P86 shows error details. If the user telephones to the TAC and communicates the description of screen P86, he/she can receive support smoothly. Screen P86 shows Return button P86a. When Return button P86a is pressed, display unit 131 displays screen P85.

Screen P87 shows a description that CELLCLEAN is invalid. Also, screen P87 shows Call TAC button P87a, Continue button P87b, and Quit button P87c. When Call TAC button P87a is pressed, display unit 131 displays screen P88. When Continue button P87b or Quit button P87c is pressed, display unit 131 displays screen P84 (see FIG. 22). Screen P88 shows error details. If the user telephones to the TAC and communicates the description of screen P88, he/she can receive support smoothly. Screen P88 shows Return button P88a. When Return button P88a is pressed, display unit 131 displays screen P87.

Figure 24:
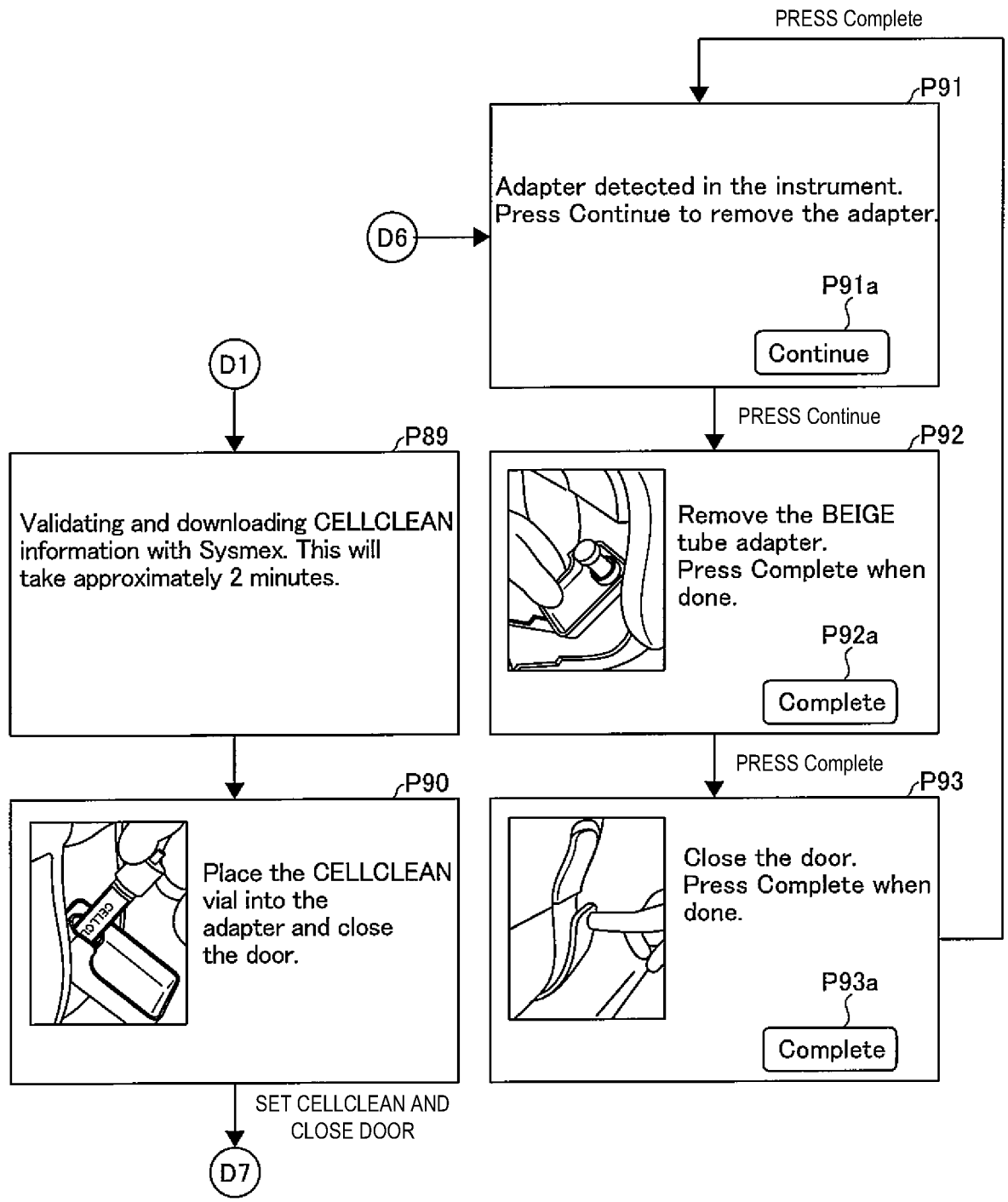
FIG. 24 is a diagram illustrating display example 3 for cleaning by CELLCLEAN.

As illustrated in FIG. 24, screen P89 shows a description on validation and download of CELLCLEAN information. Thereafter, display unit 131 displays screen P90. Screen P90 shows a picture and an instruction on how to place CELLCLEAN. After CELLCLEAN is placed and the door is closed, display unit 131 displays screen P94 (see FIG. 25).

Screen P91 shows a description that the adapter is set and Continue button P91a. When Continue button P91a is pressed, display unit 131 displays screen P92. Screen P92 shows a picture and an instruction on how to remove the adapter. Also, screen P92 shows Complete button P92a. When Complete button P92a is pressed, display unit 131 displays screen P93. Screen P93 shows a picture and an instruction on how to close the door. Also, screen P93 shows Complete button P93a. When Complete button P93a is pressed, display unit 131 displays screen P91.

Figure 25:
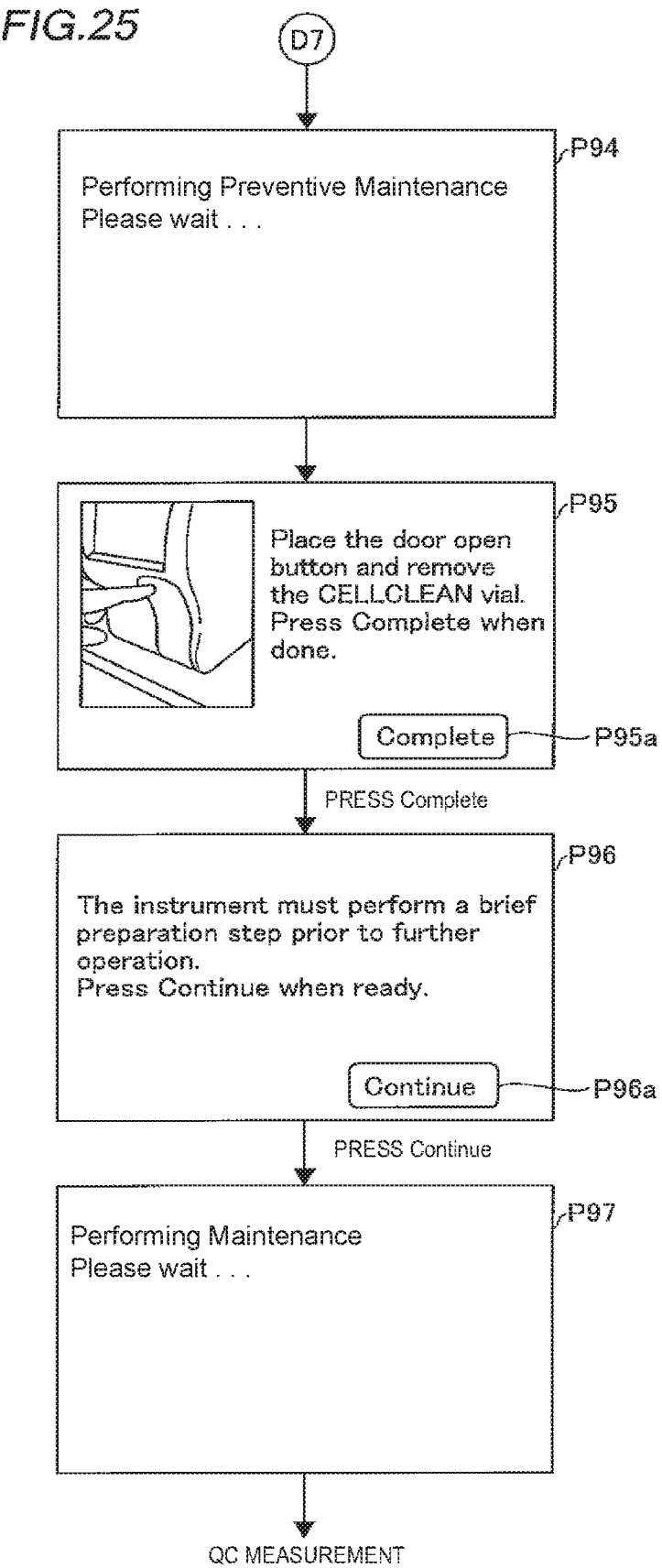
FIG. 25 is a diagram illustrating display example 4 for cleaning by CELLCLEAN.

As illustrated in FIG. 25, display unit 131 displays screen P94. Also, CELLCLEAN cleans the inside of specimen analyzer 100. Thereafter, display unit 131 displays screen P95. Screen P95 shows a picture and an instruction on how to remove the container of CELLCLEAN from specimen analyzer 100. Also, screen P95 shows Complete button P95a. When Complete button P95a is pressed, display unit 131 shows screen P96.

Screen P96 shows a description to prepare specimen analyzer 100 and Continue button P96a. When Continue button P96a is pressed, display unit 131 displays screen P97. Also, the preparation of specimen analyzer 100 proceeds. Finally, the screen of cleaning by CELLCLEAN finishes being displayed. Then, the screen proceeds to a screen of QC measurement.

(Display Example at QC Measurement)

With reference to FIG. 26 to FIG. 32, a display example at QC measurement is described.

Figure 26:
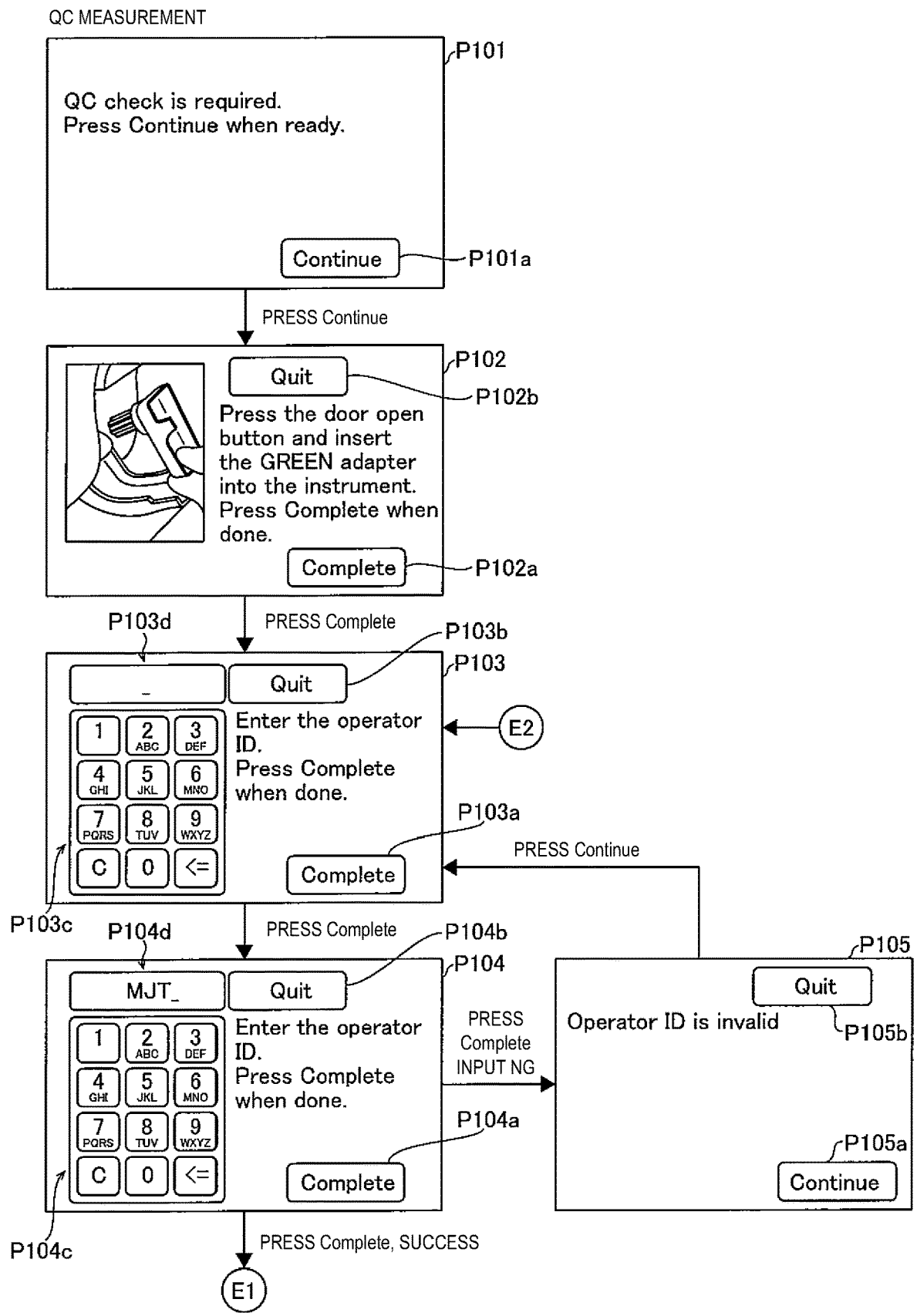
FIG. 26 is a diagram illustrating display example 1 for QC measurement.

As illustrated in FIG. 26, display unit 131 displays screen P101 in order to indicate the necessity of QC (Quality Control) measurement. Screen P101 shows Continue button P101a. When Continue button P101a is pressed, display unit 131 displays screen P102. Screen P102 shows a picture and an instruction on how to open the door and insert the adapter. Also, screen P102 shows Complete button P102a. When Complete button P102a is pressed, display unit 131 displays screen P103.

Screen P103 shows a description to input the ID of the operator. Also, screen P103 shows Complete button P103a, Quit button P103b, input buttons P103c, and input region P103d. When input buttons P103c are operated, input region P103d displays inputted characters. The ID of the operator can be set using, for example, any one to three alphabetical letters. Also, the ID of the operator may be different for each of the High, Low, and Normal QC reagents.

When Complete button P103a is pressed, display unit 131 displays screen P104. In the example of FIG. 26, the string "MJT" is inputted as the ID of the operator. Screen P104 shows Complete button P104a, Quit button P104b, input buttons P104c, and input region P104d. When the pressing of Complete button P104a succeeds, display unit 131 displays screen P106 (see FIG. 27). When Complete button P104a is pressed but the input is NG, display unit 131 displays screen P105.

Screen P105 shows a description that the operator ID is invalid, Continue button P105a, and Quit button P105b. When Continue button P105a is pressed, display unit 131 displays screen P103.

Figure 27:
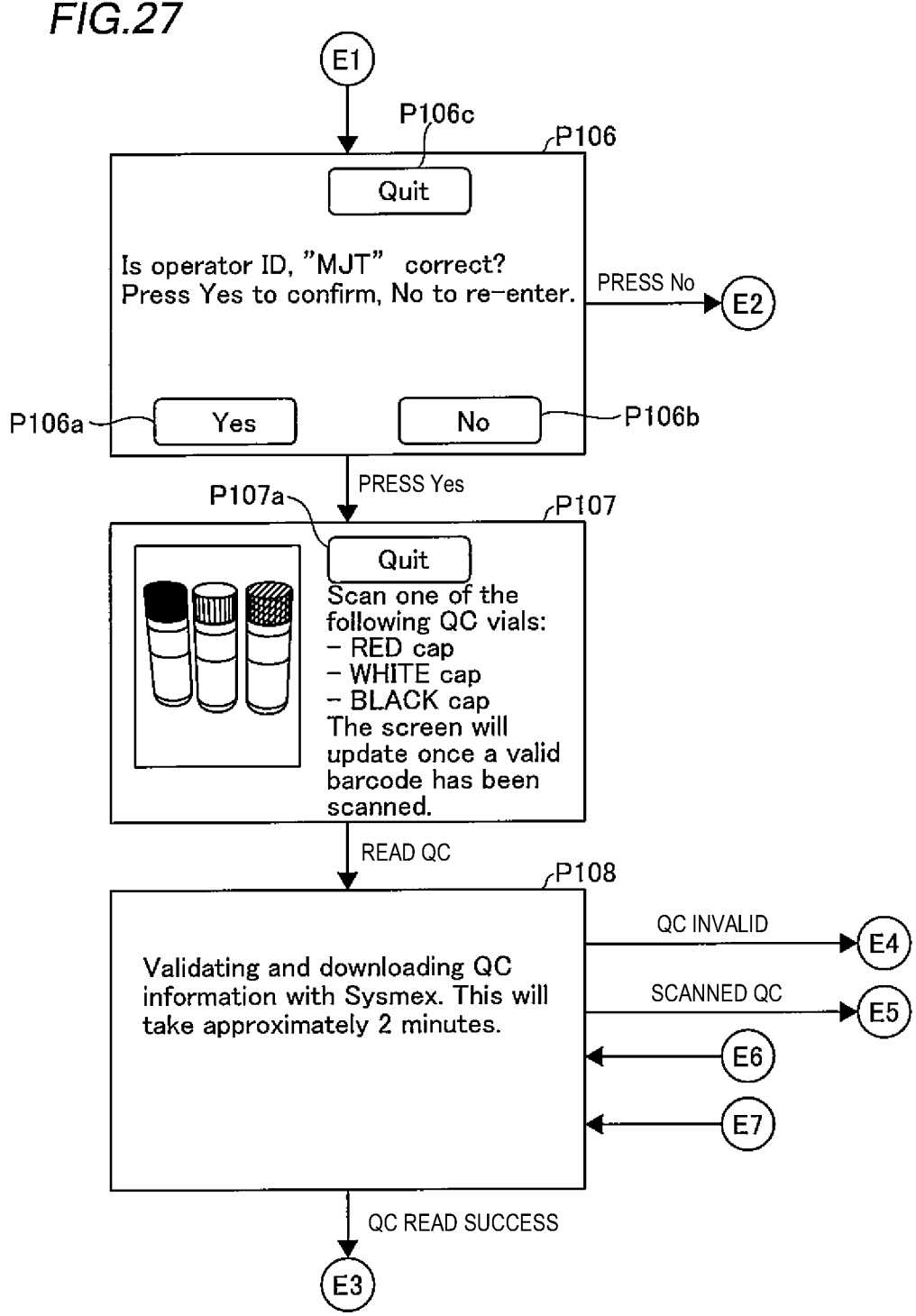
FIG. 27 is a diagram illustrating display example 2 for QC measurement.

As illustrated in FIG. 27, screen P106 shows a question asking whether or not the operator ID is correct, Yes button P106a and No button P106b, and Quit button P106c. When No button P106b is pressed, display unit 131 displays screen P103. When Yes button P106a is pressed, display unit 131 displays screen P107.

Screen P107 shows a picture and an instruction on how to read a barcode of a High QC reagent. Also, screen P107 shows Quit button P107a. When the barcode of the QC reagent is read, display unit 131 displays screen P108. Screen P108 shows a description on validation and download of information on the QC reagent. Once information on the QC reagent is downloaded from server 200, a range of the measurement value of the QC reagent is obtained.

Figure 28:
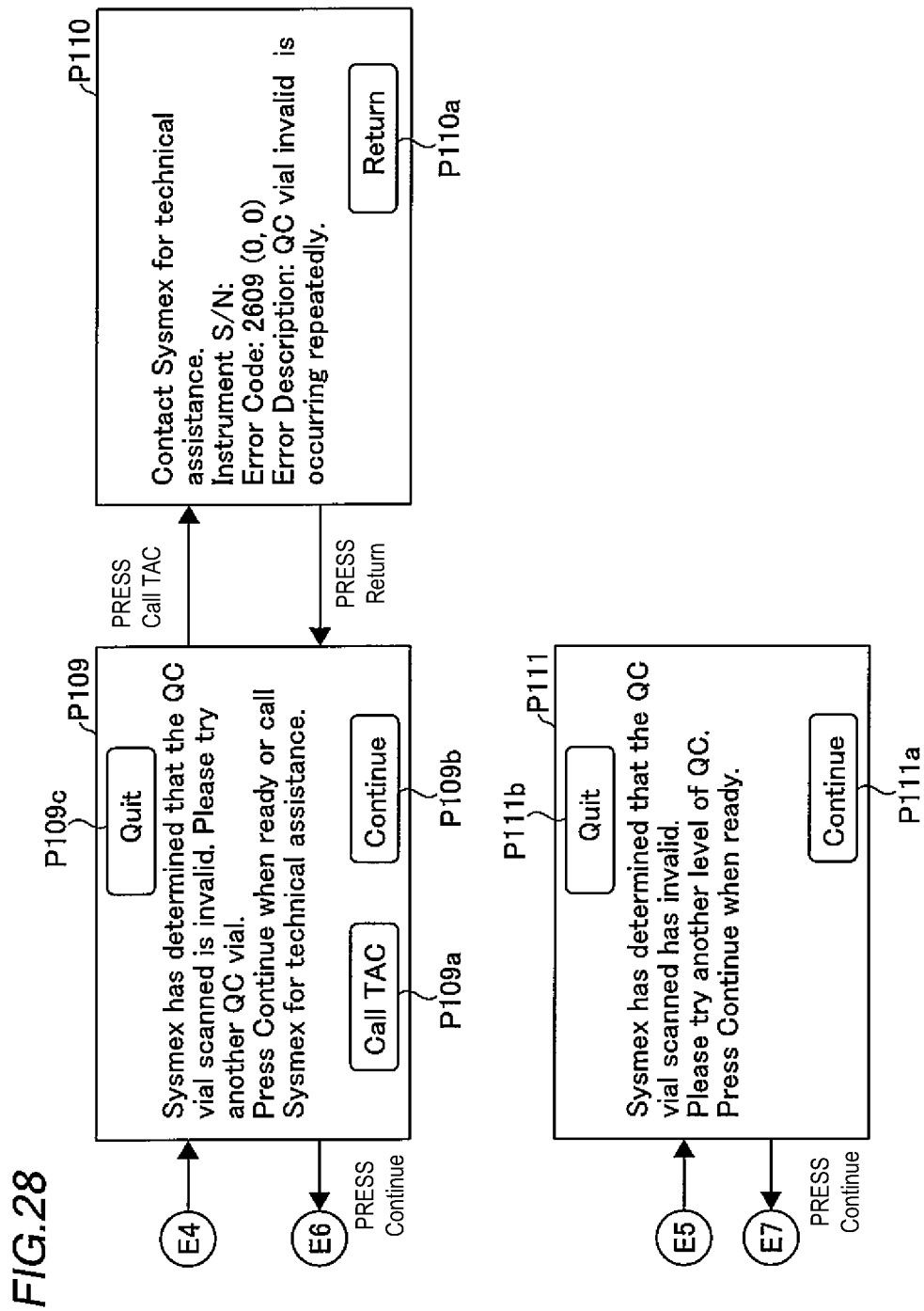
FIG. 28 is a diagram illustrating display example 3 for QC measurement.
Figure 29:
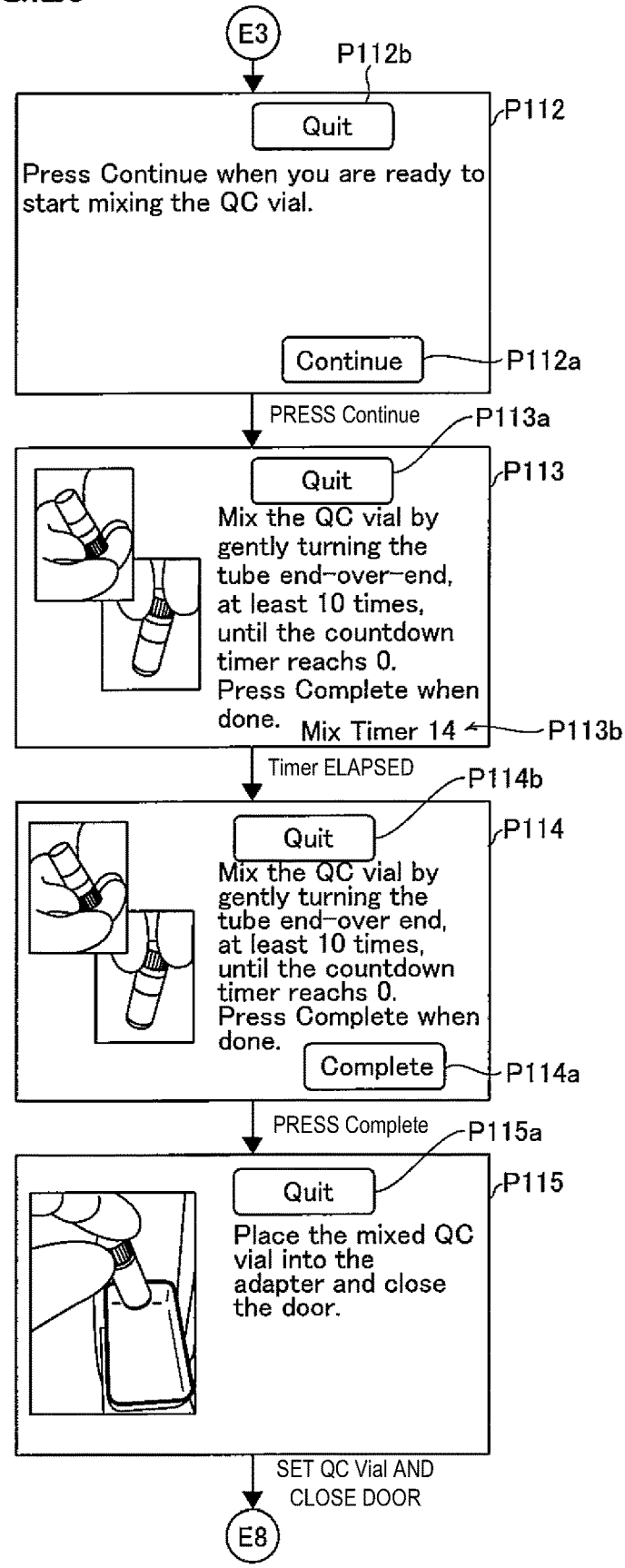
FIG. 29 is a diagram illustrating display example 4 for QC measurement.

When the validation and download of information on the QC reagent succeed, display unit 131 displays screen P112 (see FIG. 29). When the QC reagent is determined as invalid, display unit 131 displays screen P109 (see FIG. 28). When the QC reagent is determined as a scanned QC reagent, display unit 131 displays screen P111 (see FIG. 28).

As illustrated in FIG. 28, screen P109 shows a description that the QC reagent is invalid. Also, screen P109 shows Call TAC button P109a, Continue button P109b, and Quit button P109c. When Call TAC button P109a is pressed, display unit 131 displays screen P110. When Continue button P109b is pressed, display unit 131 displays screen P108 (see FIG. 27). Screen P110 shows error details. If the user telephones to the TAC and communicates the description of screen P110, he/she can receive support smoothly. Screen P110 shows Return button P110a. When Return button P110a is pressed, display unit 131 displays screen P109.

Screen P111 shows a description that the QC reagent is invalid. Also, screen P111 shows Continue button P111a and Quit button P111b. When Continue button P111a is pressed, display unit 131 displays screen P108 (see FIG. 27).

As illustrated in FIG. 29, screen P112 shows a description to start stirring the QC reagent, Continue button P112a, and Quit button P112b. When Continue button P112a is pressed, display unit 131 displays screen P113. Screen P113 shows a description to stir the QC reagent, Quit button P113a, and timer P113b. Timer P113b is displayed counting down from 15 sec, for example. When the time counted down by timer P113b has elapsed, display unit 131 displays screen P114.

Screen P114 shows Complete button P114a and Quit button P114b. When Complete button P114a is pressed, display unit 131 displays screen P115. Screen P115 shows a picture and an instruction on how to set the QC reagent. Also, screen P115 shows Quit button P115a.

Figure 30:
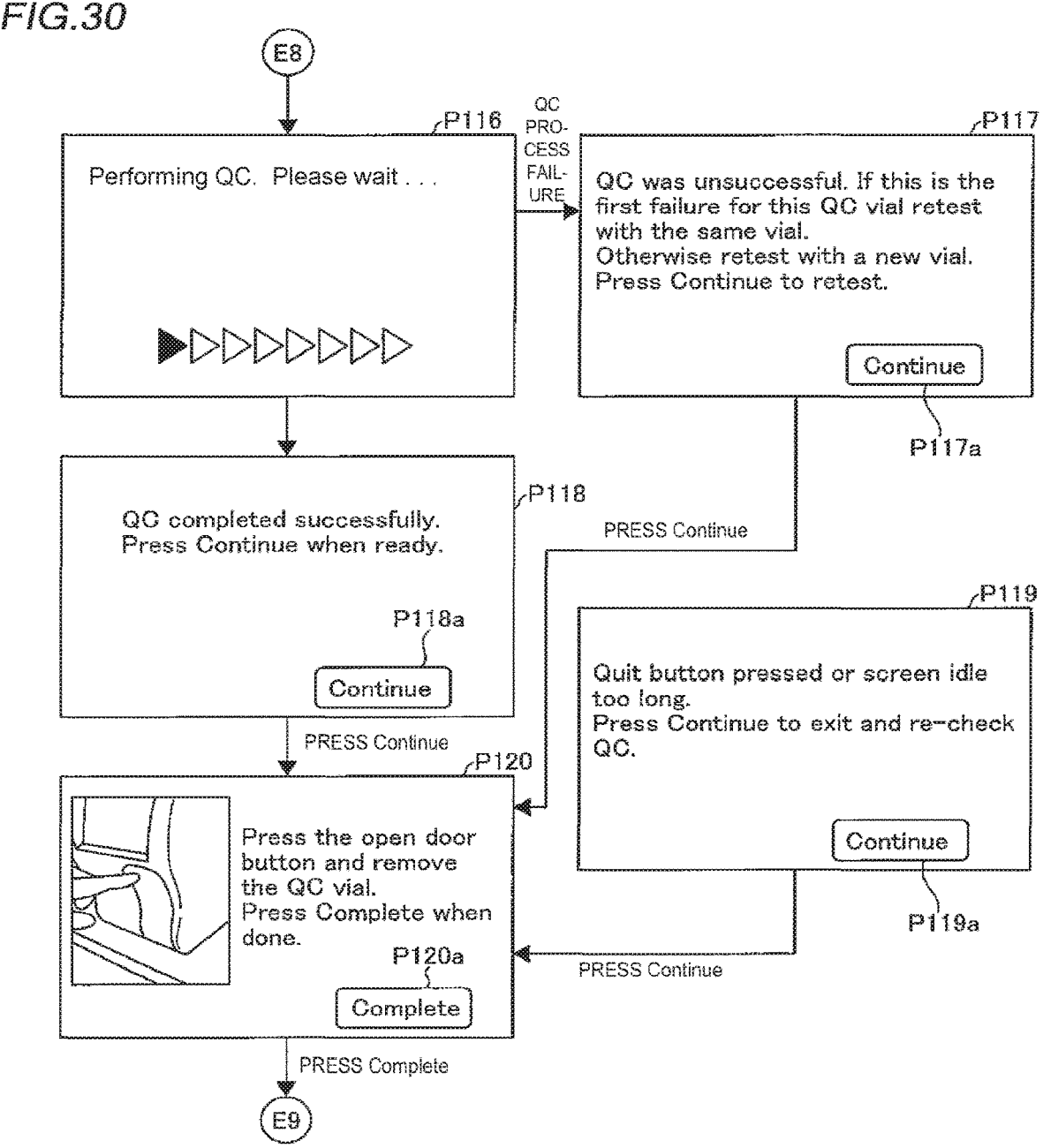
FIG. 30 is a diagram illustrating display example 5 for QC measurement.

When the QC reagent is set and the door is closed, display unit 131 displays screen P116, as illustrated in FIG. 30. Also, measurement of QC reagent is performed. When the treatment of the QC reagent fails, display unit 131 displays screen P117. Screen P117 shows a description to perform measurement again. Also, screen P117 shows Continue button P117a. When Continue button P117a is pressed, display unit 131 displays screen P120. When the measurement of the QC reagent finishes normally, display unit 131 displays screen P118. Screen P118 shows Continue button P118a. When Continue button P118a is pressed, display unit 131 displays screen P120.

Here, display unit 131 displays screen P119 when the Quit button is pressed in any of the screens, or when a predetermined time period has elapsed with the screen left unoperated. Screen P119 shows Continue button P119a. When Continue button P119a is pressed, display unit 131 displays screen P120.

Screen P120 shows a picture and an instruction on how to remove the container of the QC reagent from specimen analyzer 100. Also, screen P120 shows Complete button P120a. When Complete button P120a is pressed, display unit 131 displays screen P121 (see FIG. 31).

Figure 31:
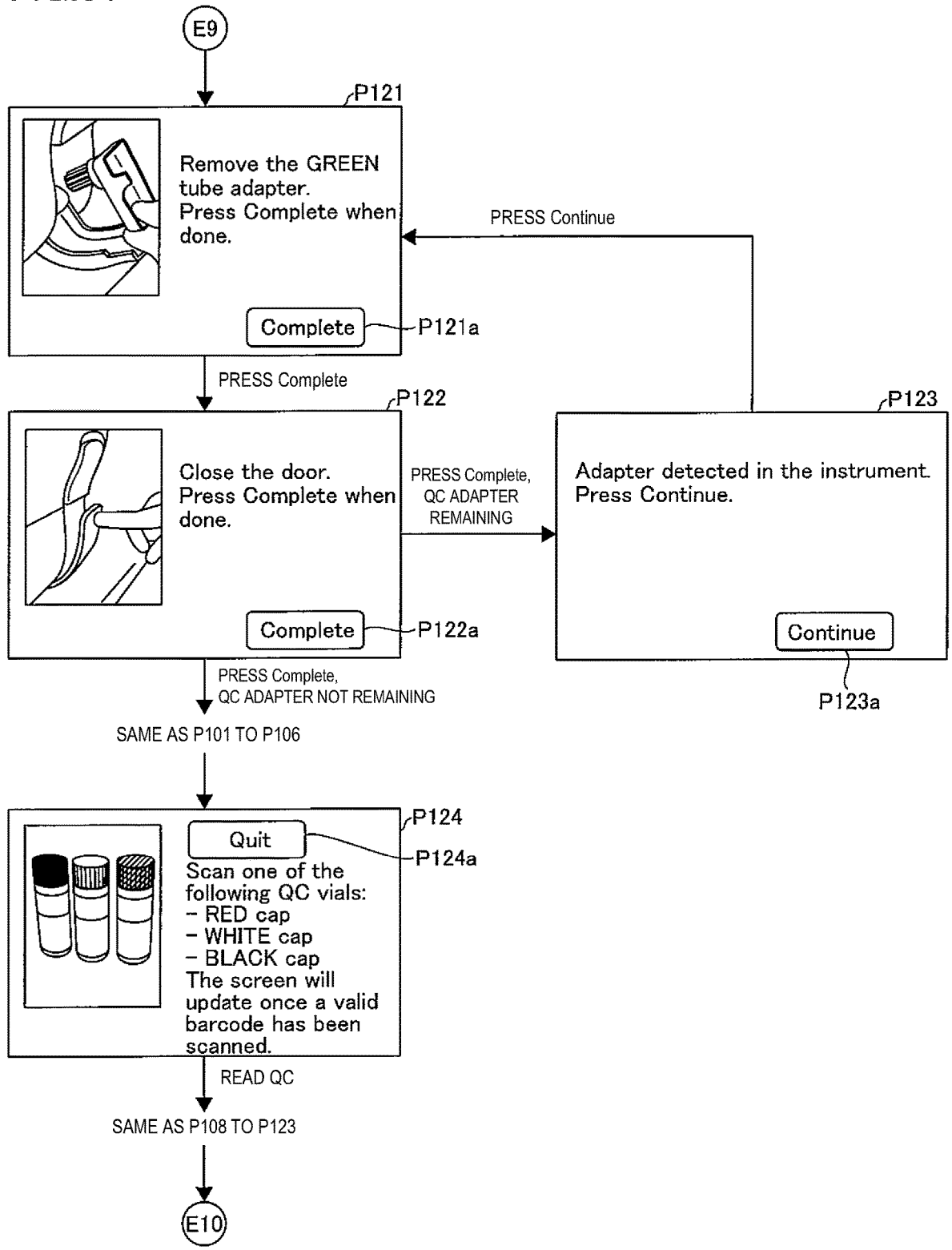
FIG. 31 is a diagram illustrating display example 6 for QC measurement.
Figure 32:
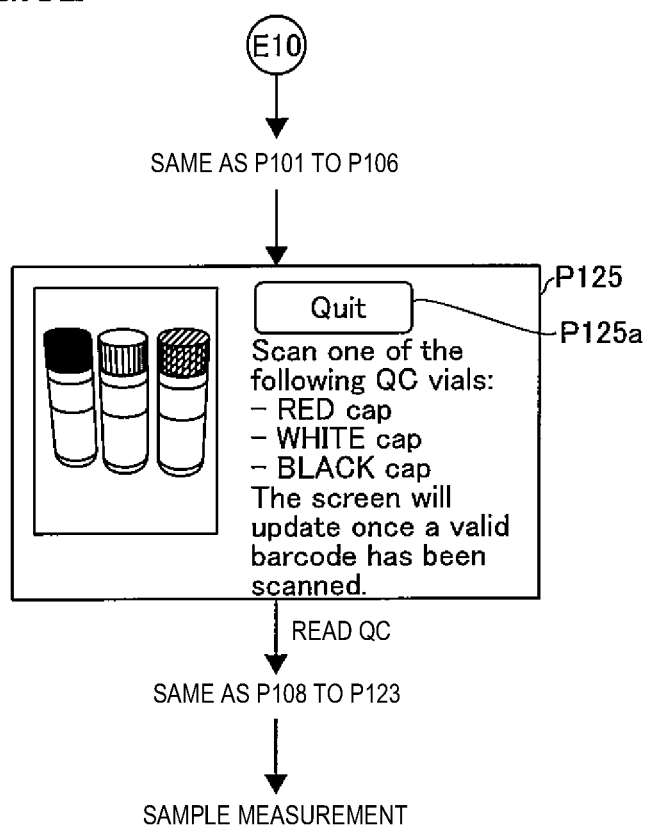
FIG. 32 is a diagram illustrating display example 7 for QC measurement.

As illustrated in FIG. 31, screen P121 shows a picture and an instruction on how to remove the adapter from specimen analyzer 100. In addition, screen P121 shows Complete button P121a. When Complete button P121a is pressed, display unit 131 displays screen P122. Screen P122 shows a picture and an instruction on how to close the door. Also, screen P122 shows Complete button P122a. When Complete button P122a is pressed, the measurement process of the High QC reagent finishes. Thereafter, a measurement process of a Low QC reagent is performed.

If the QC adapter is remaining when Complete button P122a is pressed, display unit 131 displays screen P123. Screen P123 shows Continue button P123a. When Continue button P123a is pressed, display unit 131 displays screen P121.

When the measurement process of the Low QC reagent starts, display unit 131 displays screens similar to screens P101 to P106, and similar processes are performed. Thereafter, display unit 131 displays screen P124. Screen P124 displays a picture and an instruction on how to read a barcode of the Low QC reagent. Also, screen P124 shows Quit button P124a. When the barcode of the QC reagent is read, display unit 131 displays screens similar to screen P108 to P123, and similar processes are performed. Finally, the measurement process of the Low QC reagent finishes. Thereafter, a measurement process of a Normal QC reagent is performed.

When the measurement process of the Normal QC reagent starts, display unit 131 displays screens similar to screen P101 to P106, and similar processes are performed. Thereafter, display unit 131 displays screen P125. Screen P125 displays a picture and an instruction on how to read a barcode of the Normal QC reagent. Also, screen P125 shows Quit button P125a. When the barcode of the QC reagent is read, display unit 131 displays screens similar to screen P108 to P123, and similar processes are performed. Finally, the measurement process of the Normal QC reagent finishes. Then, the screen of QC measurement stops being displayed.

Subsequently, the screen proceeds to a screen of sample measurement. Thus, the preparation for sample measurement is done.

(Display Example at Sample Measurement)

With reference to FIG. 33 to FIG. 40, display example at sample measurement is described.

Figure 33:
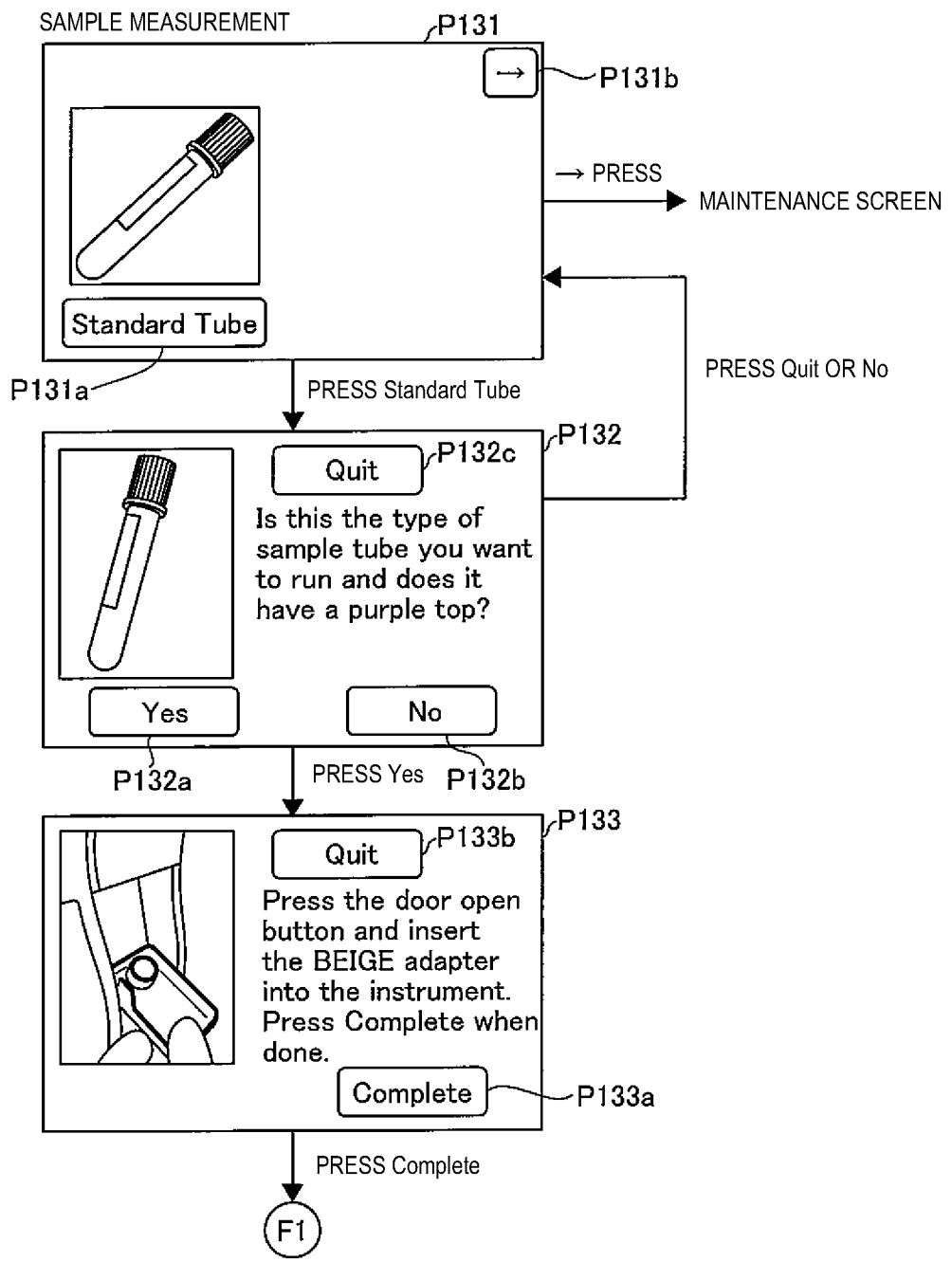
FIG. 33 is a diagram illustrating display example 1 for sample measurement.

As illustrated in FIG. 33, display unit 131 displays screen P131 for measuring the sample of the patient as the specimen. In the case of waiting for preparation of sample measurement, display unit 131 displays screen P131. Screen P131 shows Standard Tube button P131a and arrow button P131b. When arrow button P131b is pressed, display unit 131 displays screen P160 for maintenance (see FIG. 41). When Standard Tube button P131a is pressed, display unit 131 displays screen P132. Screen P132 shows a question asking whether or not the sample container is correct, Yes button P132a and No button P132b, and Quit button P132c. When No button P132b or Quit button P132c is pressed, display unit 131 displays screen P131. When Yes button P132a is pressed, display unit 131 displays screen P133.

Screen P133 shows a picture and an instruction on how to open the door and insert the adapter. Also, screen P133 shows Complete button P133a and Quit button P133b. When Complete button P133a is pressed, display unit 131 displays screen P134 (see FIG. 34).

Figure 34:
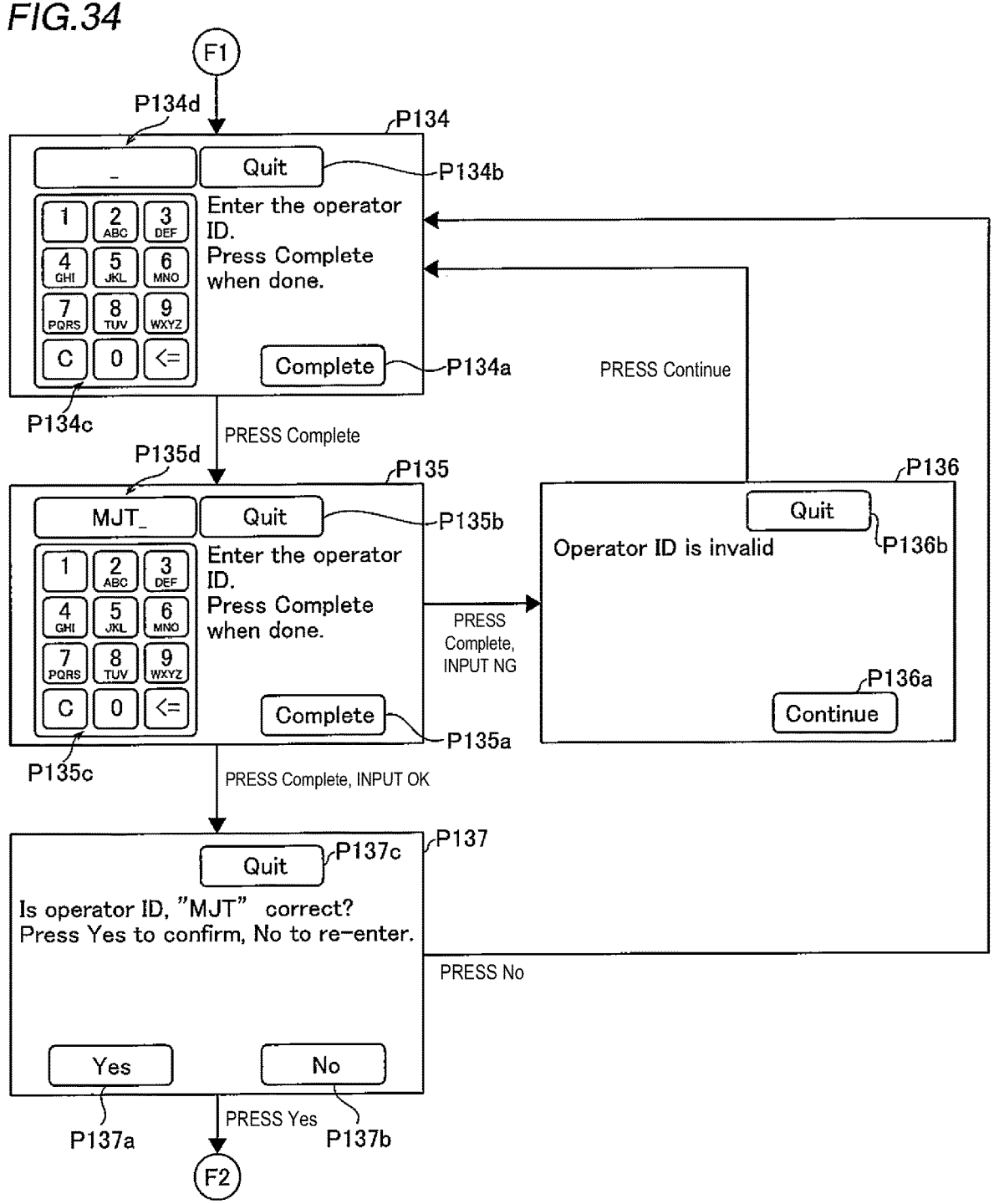
FIG. 34 is a diagram illustrating display example 2 for sample measurement.

As illustrated in FIG. 34, screen P134 shows a description for inputting the ID of the operator. Also, screen P134 shows Complete button P134a, Quit button P134b, input buttons P134c, and input region P134d. When input buttons P134c are operated, input region P134d displays inputted characters. The ID of the operator can be set using, for example, any one to three alphabetical letters.

When Complete button P134a is pressed, display unit 131 displays screen P135. In the example of FIG. 34, the string "MJT" is inputted as the ID of the operator. Screen P135 shows Complete button P135a, Quit button P135b, input buttons P135c, and input region P135d. When Complete button P135a is pressed and the input is OK, display unit 131 displays screen P137. When Complete button P135a is pressed but the input is NG, display unit 131 displays screen P136.

Screen P136 shows a description that the operator ID is invalid, Continue button P136a, and Quit button P136b. When Continue button P136a is pressed, display unit 131 displays screen P134.

Screen P137 shows a question asking whether or not the operator ID is correct, Yes button P137a and No button P137b, and Quit button P137c. When No button P137b is pressed, display unit 131 displays screen P134. When Yes button P137a is pressed, display unit 131 displays screen P138 (see FIG. 35).

Figure 35:
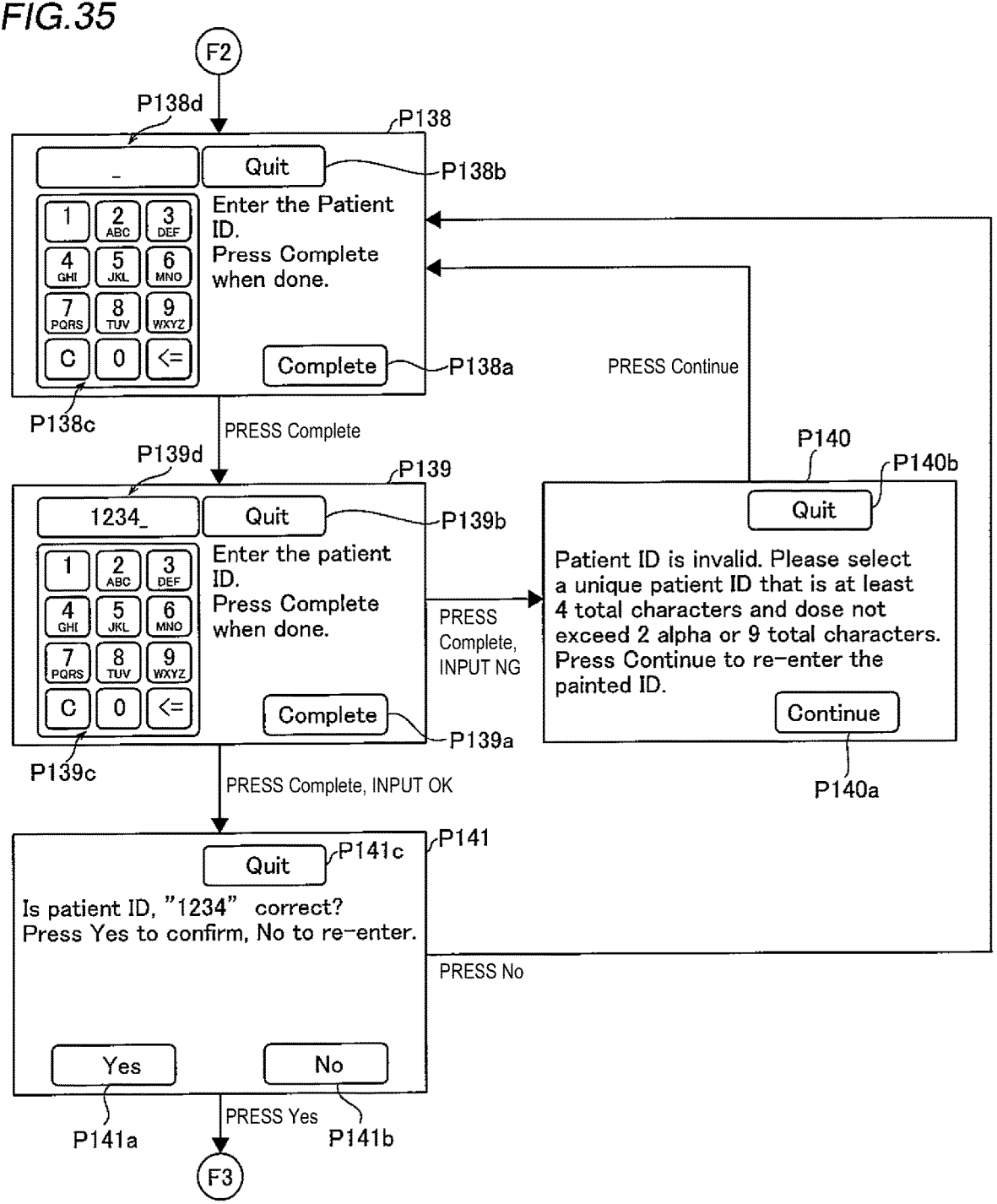
FIG. 35 is a diagram illustrating display example 3 for sample measurement.

As illustrated in FIG. 35, screen P138 shows a description for inputting the ID of the operator. Also, screen P138 shows Complete button P138a, Quit button P138b, input buttons P138c, and input region P138d. When input buttons P138c are operated, input region P138d displays inputted characters. The ID of the patient can be set using, for example, any four or more characters. The ID of the patient can be set using four to nine characters. Also, the ID of the patient can include zero to two alphabetical letters. In addition, the ID of the patient can include numbers from zero to eight characters.

When Complete button P138a is pressed, display unit 131 displays screen P139. In the example of FIG. 35, the string "1234" is inputted as the ID of the patient. Screen P139 shows Complete button P139a, Quit button P139b, input buttons P139c, and input region P139d. When Complete button P139*a* is pressed and the input is OK, display unit 131 displays screen P141. When Complete button P139*a* is pressed but the input is NG, display unit 131 displays screen P140.

Screen P140 shows a description that the patient ID is invalid, Continue button P140*a*, and Quit button P140*b*. When Continue button P140*a* is pressed, display unit 131 displays screen P138.

Screen P141 shows a question asking whether or not patient ID is correct, Yes button P141*a* and No button P141*b*, and Quit button P141*c*. When No button P141*b* is pressed, display unit 131 displays screen P138. When Yes button P141*a* is pressed, display unit 131 displays screen P142 (see FIG. 36).

Figure 36:
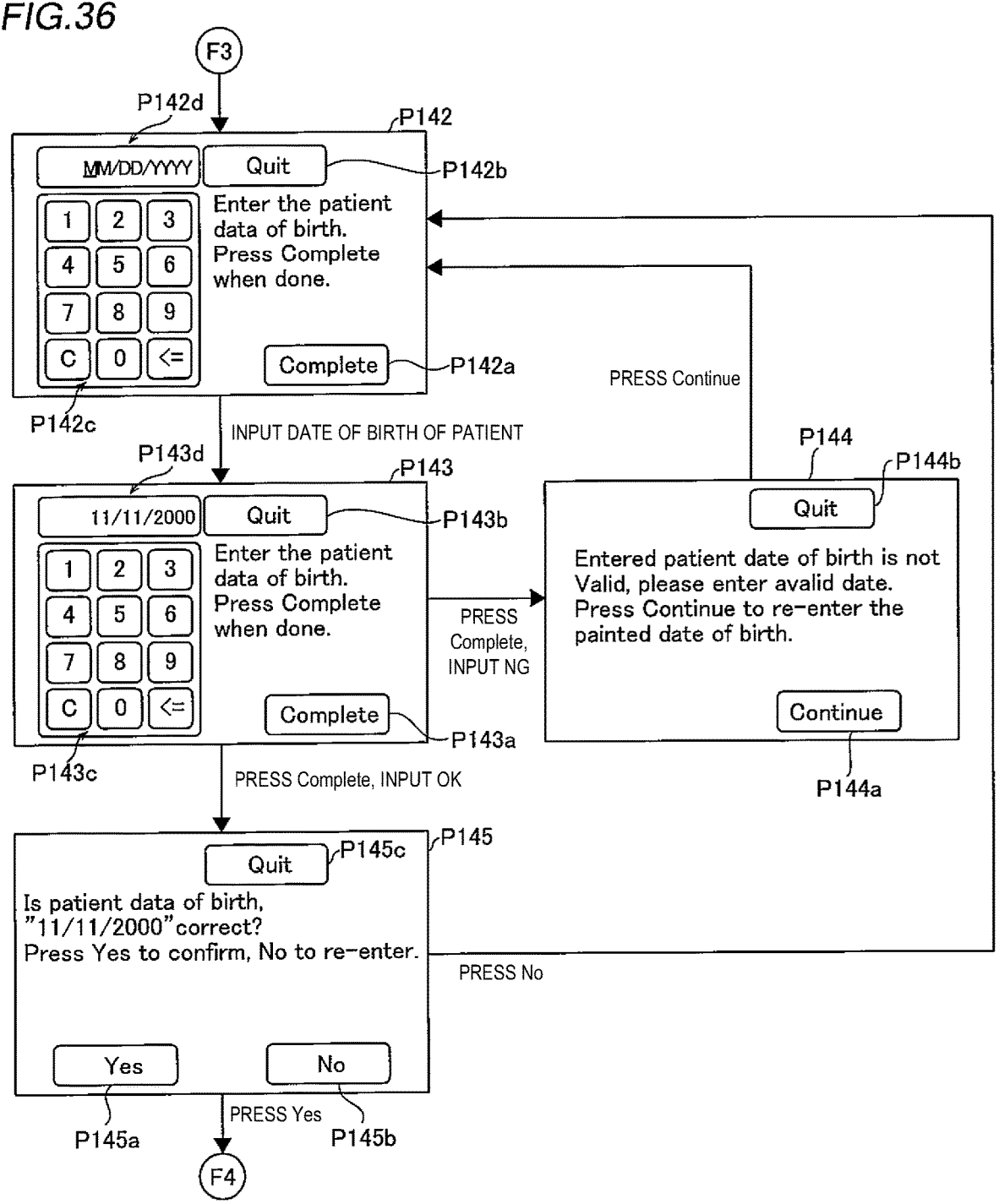
FIG. 36 is a diagram illustrating display example 4 for sample measurement.

As illustrated in FIG. 36, screen P142 shows a description for inputting the date of birth of the patient. Also, screen P142 shows Complete button P142*a*, Quit button P142*b*, input buttons P142*c*, and input region P142*d*. When input buttons P142*c* are operated, input region P142*d* displays inputted characters.

When Complete button P142*a* is pressed, display unit 131 displays screen P143. In the example of FIG. 36, "11/11/2000" is inputted as the date of birth of the patient. Screen P143 shows Complete button P143*a*, Quit button P143*b*, input buttons P143*c*, and input region P143*d*. When the Complete button P143*a* is pressed and the input is OK, display unit 131 displays screen P145. When Complete button P143*a* is pressed but the input is NG, display unit 131 displays screen P144.

Screen P144 shows a description that the date of birth of the patient is invalid, Continue button P144*a*, and Quit button P144*b*. When Continue button P144*a* is pressed, display unit 131 displays screen P142.

Screen P145 shows a question asking whether or not the date of birth of the patient is correct, Yes button P145*a* and No button P145*b*, and Quit button P145*c*. When No button P145*b* is pressed, display unit 131 displays screen P142. When Yes button P145*a* is pressed, display unit 131 displays screen P146 (see FIG. 37).

Figure 37:
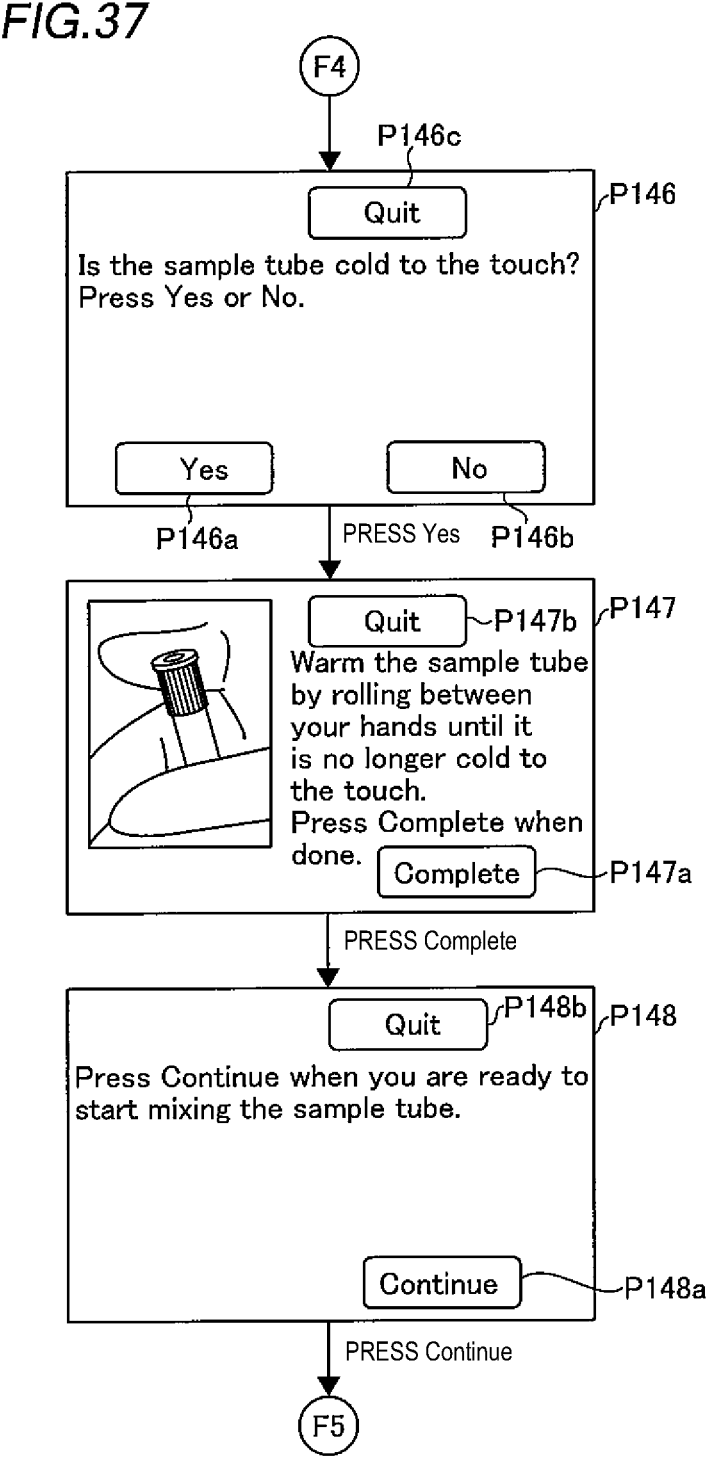
FIG. 37 is a diagram illustrating display example 5 for sample measurement.

As illustrated in FIG. 37, screen P146 shows a question asking whether or not the sample container is cold, Yes button P146*a* and No button P146*b*, and Quit button P146*c*. When Yes button P146*a* is pressed, display unit 131 displays screen P147. Screen P147 shows a picture and an instruction on how to warm the sample container. Also, screen P147 shows Complete button P147*a* and Quit button P147*b*. When Complete button P147*a* is pressed, display unit 131 displays screen P148.

Screen P148 shows a description to start stirring the sample, Continue button P148*a*, and Quit button P148*b*. When Continue button P148*a* is pressed, display unit 131 displays screen P149 (see FIG. 38).

Figure 38:
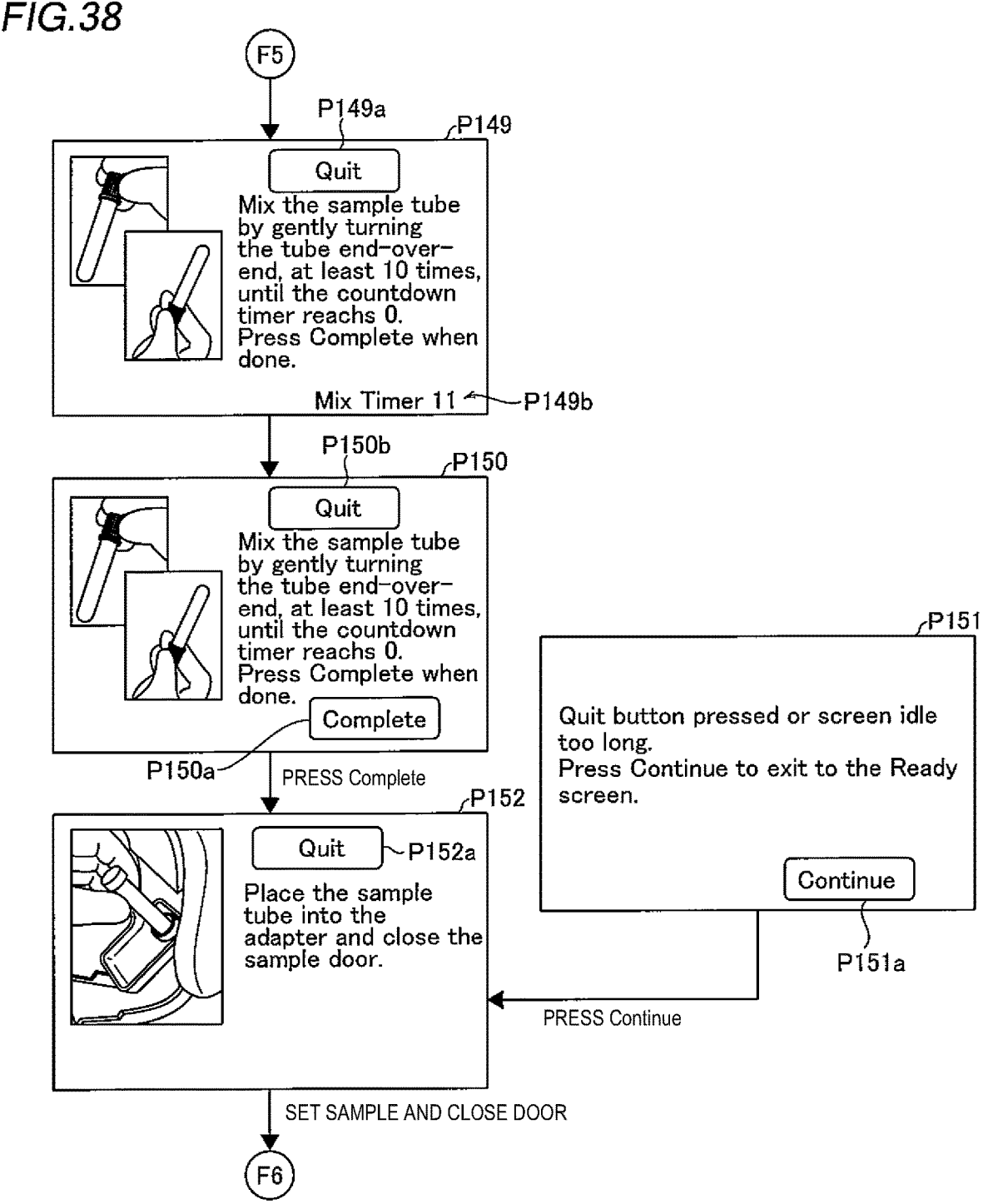
FIG. 38 is a diagram illustrating display example 6 for sample measurement.

As illustrated in FIG. 38, screen P149 shows a description to stir the sample, Quit button P149*a*, and timer P149*b*. Timer P149*b* is displayed counting down from 15 sec, for example. When the time counted down by timer P149*b* has elapsed, display unit 131 displays screen P150. Screen P150 shows Complete button P150*a* and Quit button P150*b*. When Complete button P150*a* is pressed, display unit 131 displays screen P152.

Here, display unit 131 displays screen P151 when the Quit button is pressed in any of the screens, or when a predetermined time period has elapsed with the screen left unoperated. Screen P151 shows Continue button P151*a*. When Continue button P151*a* is pressed, display unit 131 shows screen P152.

Screen P152 shows a picture and an instruction on how to set the sample container. Also, screen P152 shows Quit button P152*a*.

Figure 39:
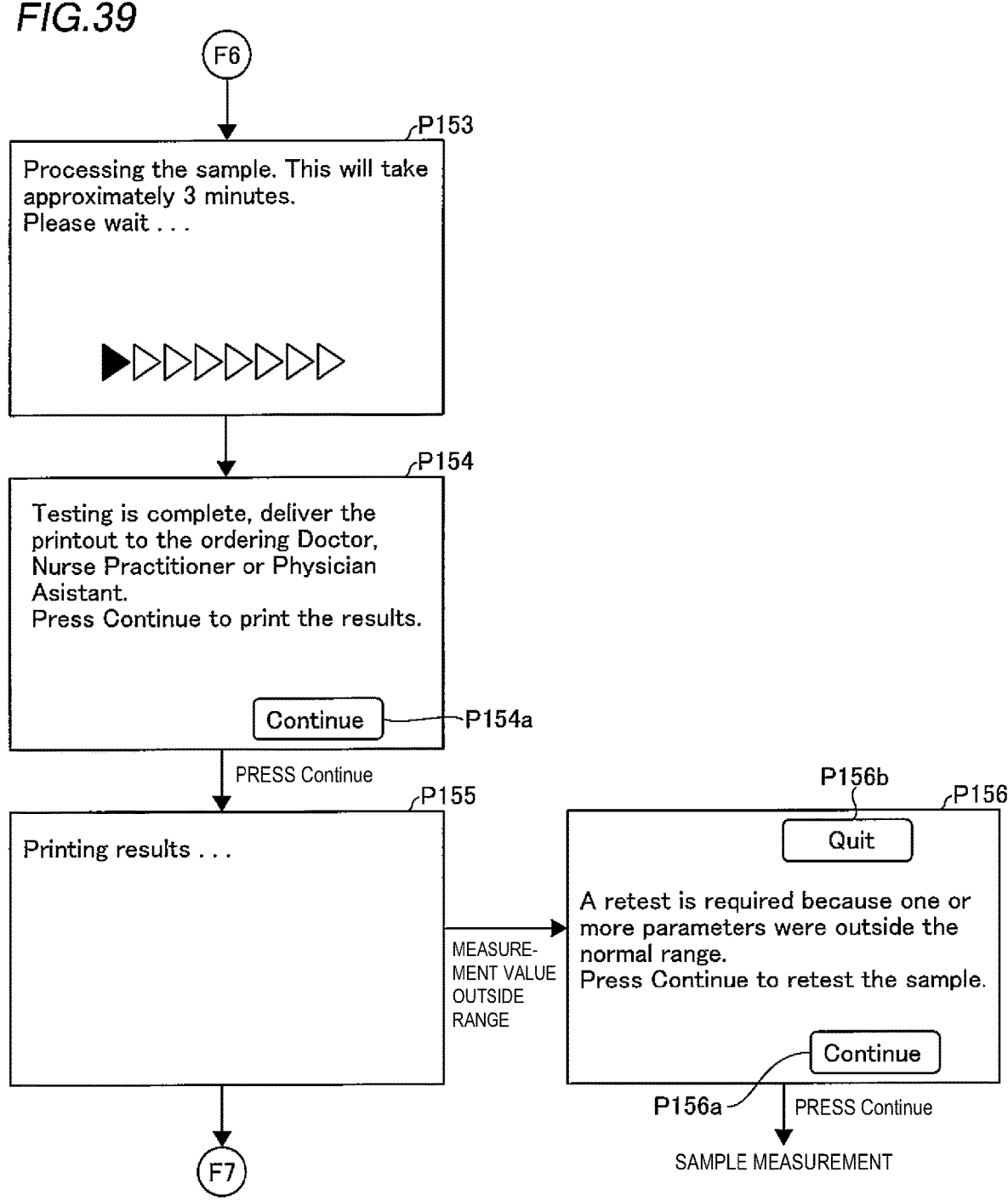
FIG. 39 is a diagram illustrating display example 7 for sample measurement.

When the sample container is set and the door is closed, display unit 131 displays screen P153, as illustrated in FIG. 39. Also, measurement of sample is performed. When the measurement of the sample finishes, display unit 131 displays screen P154. Screen P154 shows a description for printing and Continue button P154*a*. When Continue button P154*a* is pressed, display unit 131 displays screen P155.

Screen P155 shows a description that the printing is in progress. Also, print unit 135 prints the results. If one or more of the measurement results are outside normal range, display unit 131 displays screen P156. Screen P156 shows a description to perform measurement again, Continue button P156*a*, and Quit button P156*b*. When Continue button P156*a* is pressed, display unit 131 displays first screen P131 of sample measurement (see FIG. 33).

Figure 40:
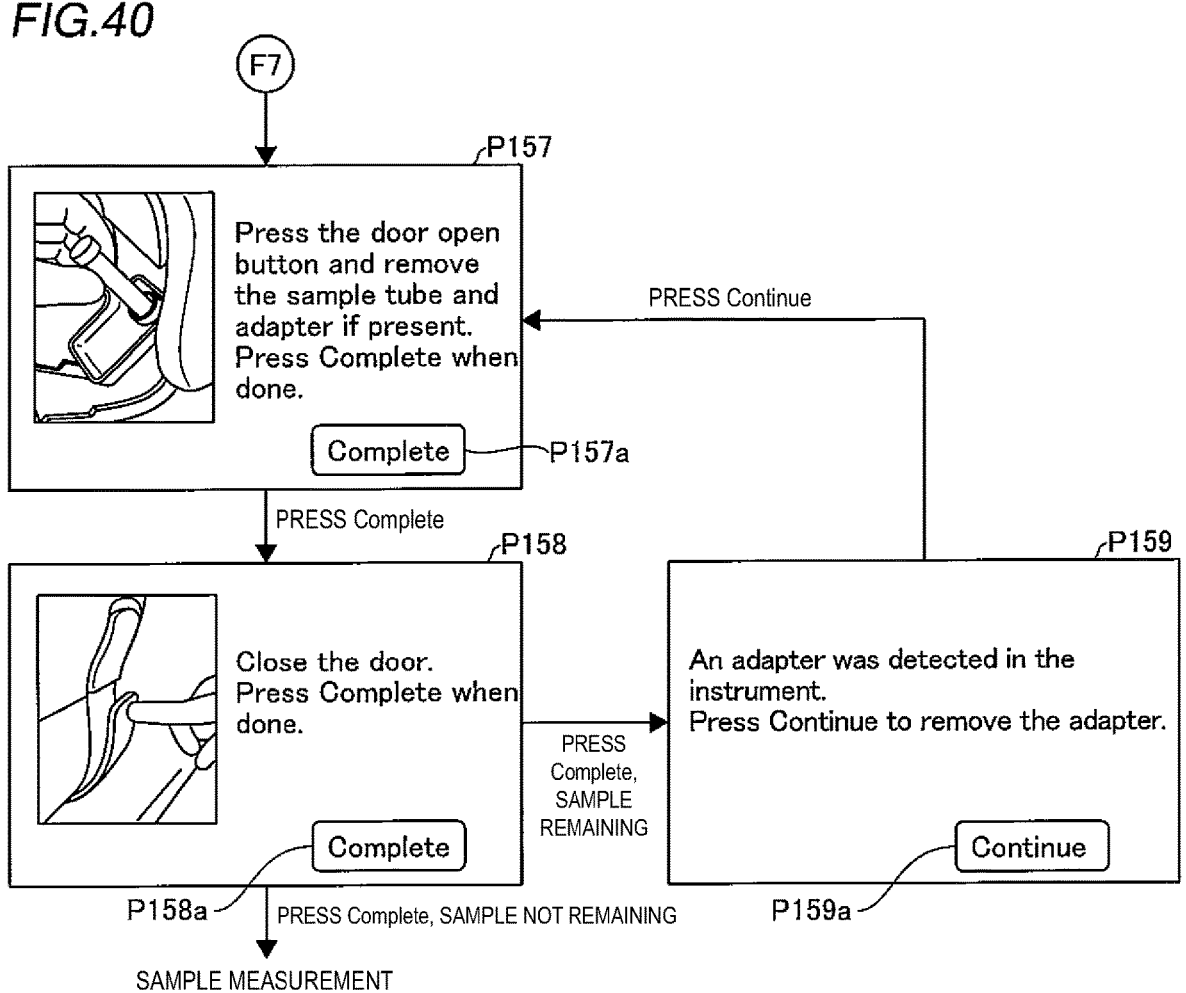
FIG. 40 is a diagram illustrating display example 8 for sample measurement.

As illustrated in FIG. 40, screen P157 shows a picture and an instruction on how to remove the sample container from specimen analyzer 100. Also, screen P157 shows Complete button P157*a*. When Complete button P157*a* is pressed, display unit 131 displays screen P158. Screen P158 shows a picture and an instruction on how to close the door. Also, screen P158 shows Complete button P158*a*. When Complete button P158*a* is pressed, the sample measurement process finishes. Thereafter, display unit 131 displays first screen P131 of sample measurement (see FIG. 33).

If the adapter is remaining when Complete button P158*a* is pressed, display unit 131 displays screen P159. Screen P159 shows Continue button P159*a*. When Continue button P159*a* is pressed, display unit 131 displays screen P157.

As described above, in the example of FIG. 39, display unit 131 displays print operation screen (see screen P154) for starting of the printing of analysis results 102.

In print operation screen P154, display unit 131 displays operational guidance and instructions to deal with printed sheet after printing. The instructions to deal with the printed sheet include a message instructing to deliver the printed sheet to the ordering doctor. As an explanation for the printing, screen P154 shows an example of operational guidance teaching to input Continue button P154*a*, and of delivering the printed sheet to the ordering doctor or the like.

Print unit 135 starts the printing of analysis results 102 based on the operations in accordance with print operation screen P154 (see screen P155). To be more specific, print unit 135 starts the printing of analysis results 102 based on the input of Continue button P154*a*.

Also, in the example of FIG. 39 and the example of FIG. 40, analysis unit 120 is capable of analyzing next specimen 101 if an operation is performed in accordance with the print operation screen. To be more specific, if a series of operations up to screen P158 including an operation on screen P154 completes, controller 140 causes display unit 131 to display P131 (see FIG. 33) to be ready for an analysis of next specimen 101.

In addition, if analysis results 102 include an abnormal value, controller 140 causes display unit 131 to display an abnormal value notification screen (see screen P156) to communicate that an abnormal value is included. When abnormal value notification screen P156 is displayed, analysis unit 120 is capable of retesting same specimen 101 when an operation is performed in accordance with abnormal value notification screen P156.

In addition, if analysis results 102 include an abnormal value, controller 140 causes display unit 131 to display an abnormal value notification screen (see screen P156) to communicate that an abnormal value is included. When abnormal value notification screen P156 is displayed, analysis unit 120 is capable of retesting same specimen 101 when an operation is performed in accordance with abnormal value notification screen P156.

If analysis results 102 include an abnormal value, controller 140 prohibits print unit 135 from printing analysis results 102, and causes abnormal value notification screen P156 to show a message prompting to perform retesting. The example of screen P156 shows a message communicating that it is necessary to retest because one or more analysis results 102 are outside normal range.

In the example of screen P156, when Continue button 156a is inputted, a series of processes for performing retest are executed. Here, by inputting Quit button 156b, analysis of another specimen 101 can be started.

(Display Example at Maintenance)

With reference to FIG. 41 to FIG. 48, a display example at maintenance is described.

Figure 41:
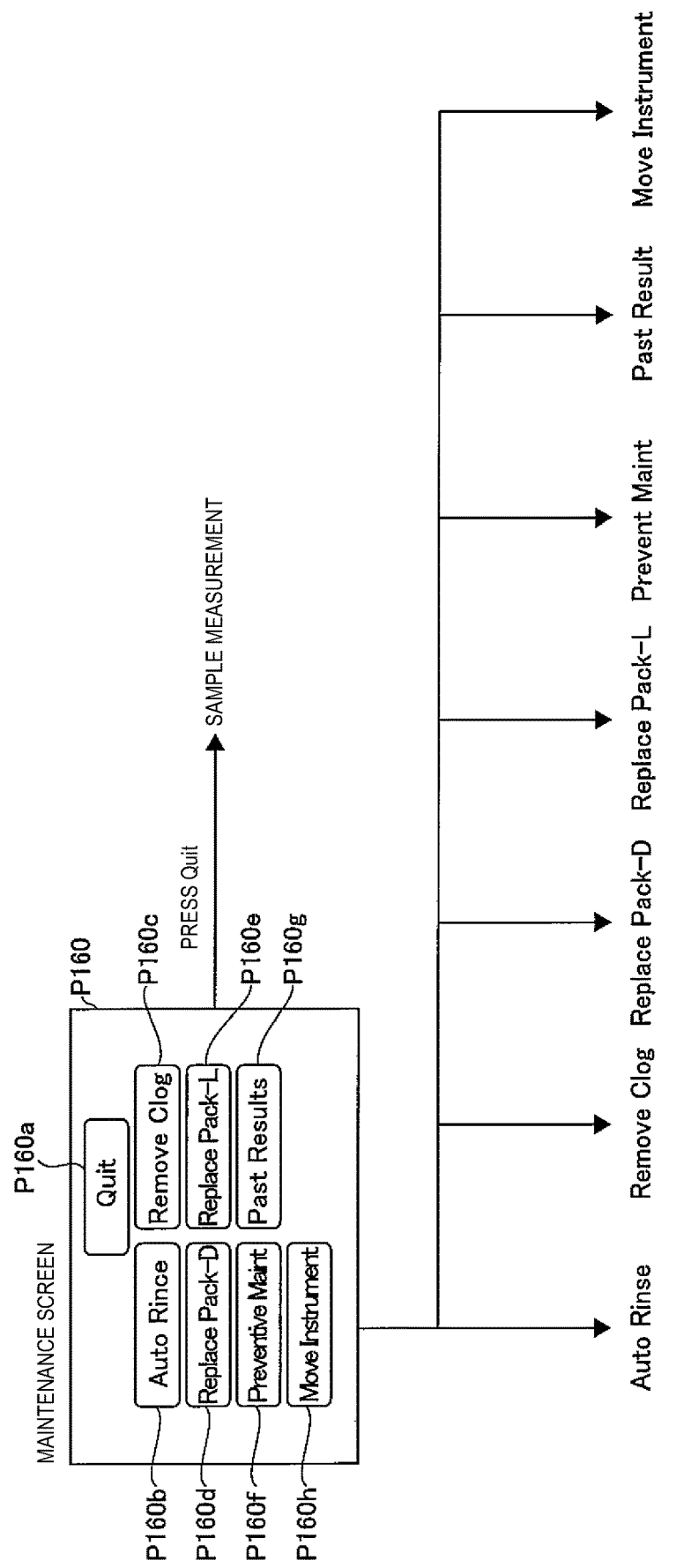
FIG. 41 is a diagram illustrating display example 1 for maintenance.

As illustrated in FIG. 41, screen P160 shows a screen for performing maintenance. To be more specific, screen P160 Quit button P160a, Auto Rince button P160b, Remove Clog button P160c, Replace Pack-D button P160d, Replace Pack-L button P160e, Preventive Maint button P160f, Past Results button P160g, and Move Instrument button P160h.

Figure 42:
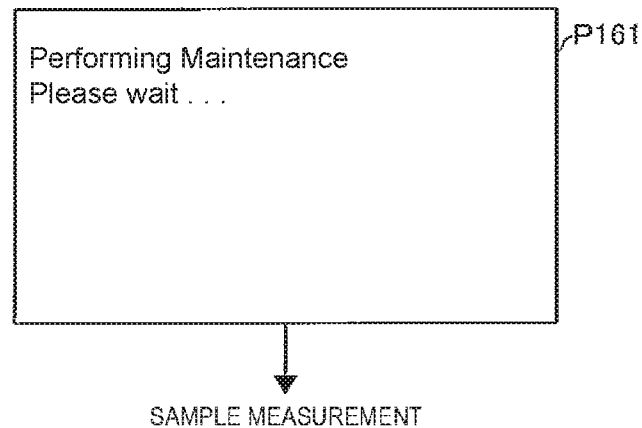
FIG. 42 is a diagram illustrating display example 2 for maintenance.

When Auto Rince button P160b is pressed, display unit 131 displays screen P161, as illustrated in FIG. 42. Also, a cleaning process with use of a diluted solution is performed. Thereafter, display unit 131 displays first screen P131 of sample measurement (see FIG. 33).

Figure 43:
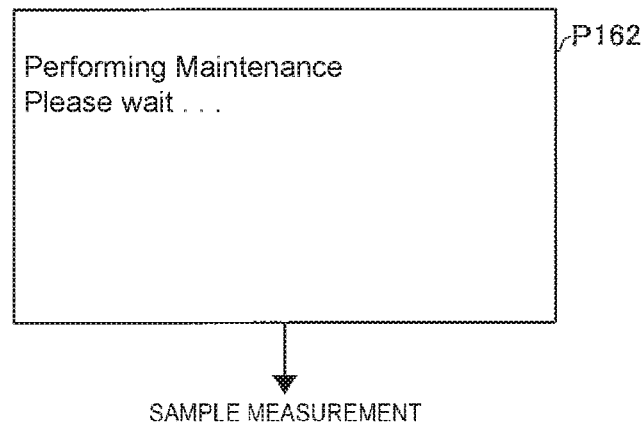
FIG. 43 is a diagram illustrating display example 3 for maintenance.

When Remove Clog button P160c is pressed, display unit 131 displays screen P162, as illustrated in FIG. 43. Also, a process of removing the clog of detector 123 is performed.

Figure 44:
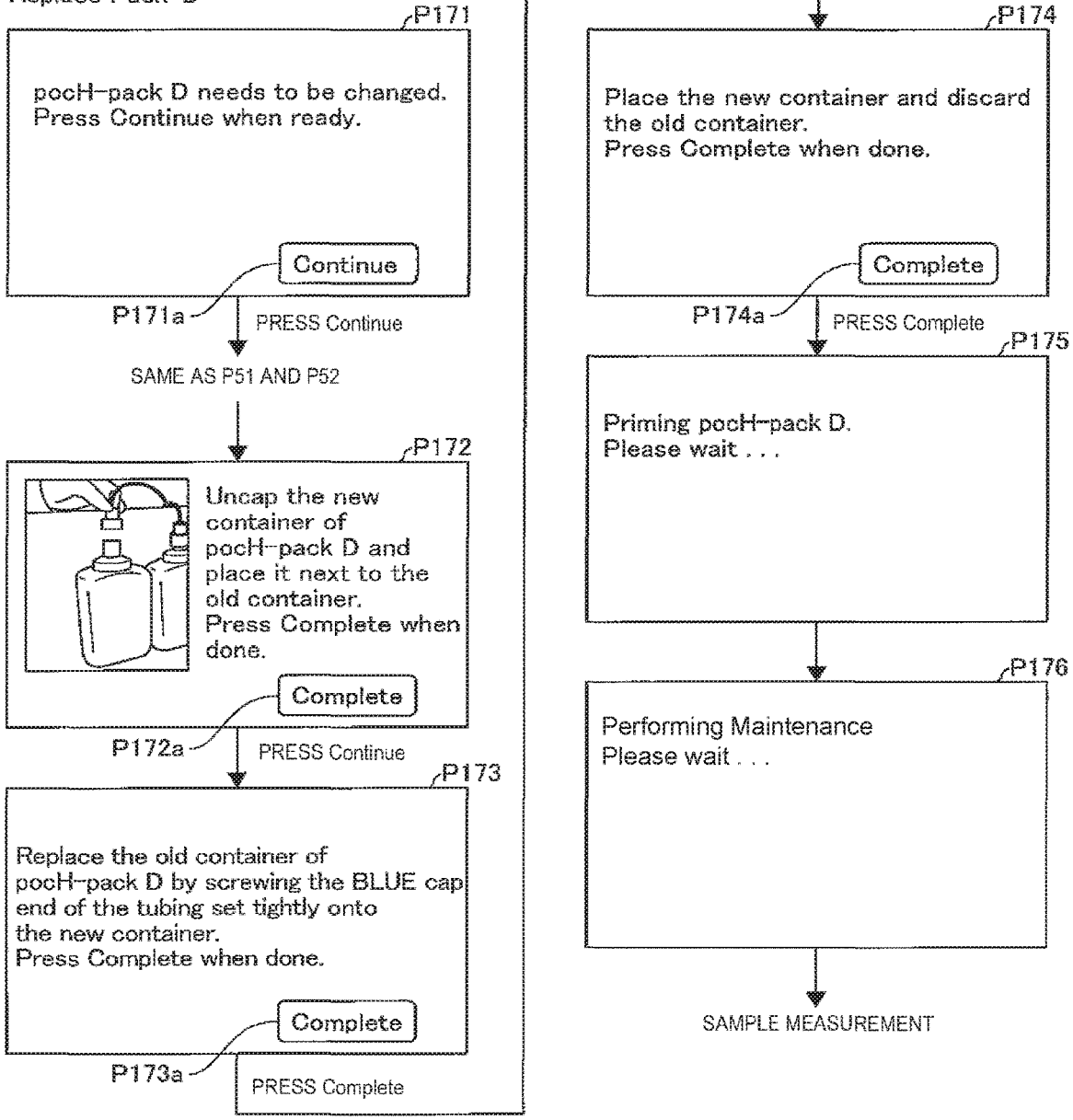
FIG. 44 is a diagram illustrating display example 4 for maintenance.

When Replace Pack-D button P160d, is pressed, display unit 131 displays screen P171, as illustrated in FIG. 44. In addition, display unit 131 displays screen P171 also in the case where it is determined that the diluted solution has been used up. Screen P171 displays Continue button P171a. When Continue button P171a is pressed, display unit 131 displays screens similar to screens P51 and P52, and similar processes are performed. Thereafter, display unit 131 displays screen P172.

Screen P172 shows a picture and an instruction on how to place the reagent container. Also, screen P172 shows Complete button P172a. When Complete button P172a is pressed, display unit 131 displays screen P173. Screen P173 shows a description for replacing the reagent container. Also, screen P173 shows Complete button P173a. When Complete button P173a is pressed, display unit 131 displays screen P174.

Screen P174 shows a description to place and dispose of the reagent container. Also, screen P174 shows Complete button P174a. When Complete button P174a is pressed, display unit 131 displays screen P175. Also, the diluted solution is fed to specimen analyzer 100. Thereafter, display unit 131 displays screen P176. After that, display unit 131 displays first screen P131 of sample measurement (see FIG. 33).

When Replace Pack-L button P160e is pressed, display unit 131 displays screen P181, as illustrated in FIG. 45. In addition, display unit 131 displays screen P181 also in the case where it is determined that the hemolyzer has been used up. Screen P181 displays Continue button P181a. When Continue button P181a is pressed, display unit 131 displays screens similar to screens P51, P52, and P172 to P176, and similar processes are performed. Thereafter, display unit 131 displays first screen P131 of sample measurement (see FIG. 33).

When Preventive Maint button P160f is pressed, display unit 131 displays screen P191, as illustrated in FIG. 46. Also, display unit 131 displays screen P191 when cleaning by CELLCLEAN is needed. Screen P191 shows Continue button P191a. When Continue button P191a is pressed, a process similar to the cleaning by CELLCLEAN is performed. Thereafter, a process similar to the QC measurement is performed, and display unit 131 displays first screen P131 of sample measurement (see FIG. 33).

Figure 47:
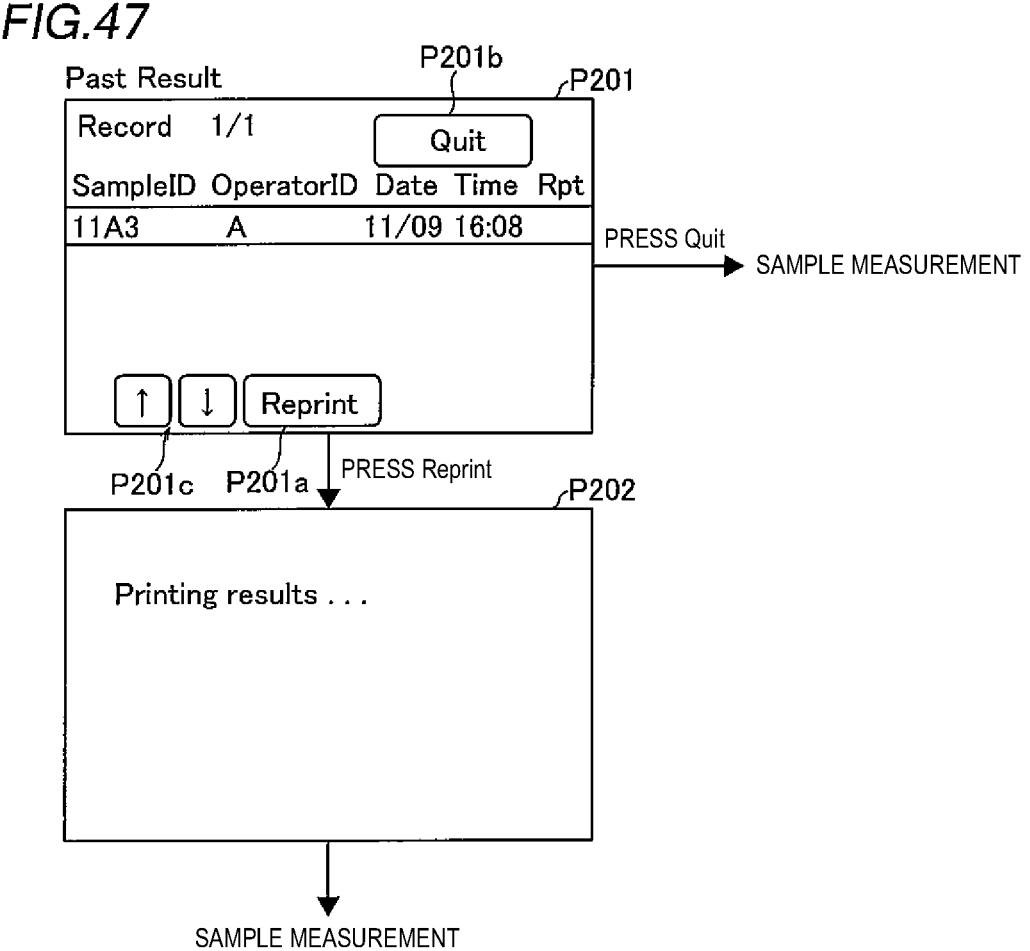
FIG. 47 is a diagram illustrating display example 7 for maintenance.

When Past Results button P160g is pressed, display unit 131 displays screen P201, as illustrated in FIG. 47. Screen P201 shows Reprint button P201a, Quit button P201b, and select button P201c. When select button P201c is used to select a past measurement and Reprint button P201a is pressed, past measurement results are printed. By pressing Reprint button 201a, display unit 131 displays screen P202. Then, print unit 135 prints the measurement results. Thereafter, display unit 131 displays first screen P131 of sample measurement (see FIG. 33).

Figure 48:
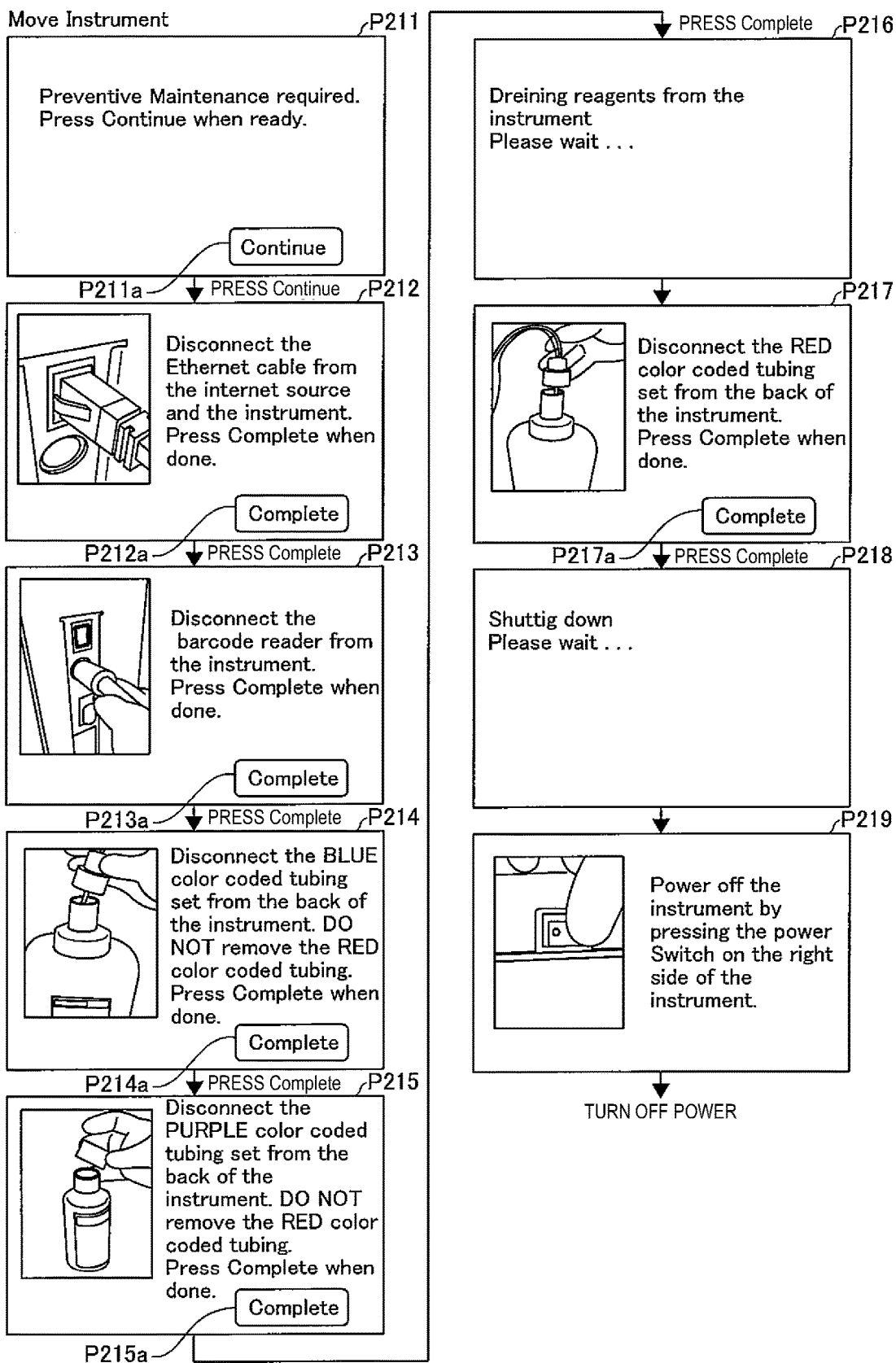
FIG. 48 is a diagram illustrating display example 8 for maintenance.

When Move Instrument button P160h is pressed, display unit 131 displays screen P211, as illustrated in FIG. 48. Screen P211 shows Continue button P211a. When Continue button P211a is pressed, display unit 131 displays screen P212. Screen P212 shows a picture and an instruction on how to remove the Ethernet cable from specimen analyzer 100. Also, screen P212 shows Complete button P212a. When Complete button P212a is pressed, display unit 131 displays screen P213.

Screen P213 shows a picture and an instruction on how to remove the barcode reader from specimen analyzer 100. Also, screen P213 shows Complete button P213a. When Complete button P213a is pressed, display unit 131 displays screen P214. Screen P214 shows a picture and an instruction on how to remove the container of the diluted solution from the tube. Also, screen P214 shows Complete button P214a. When Complete button P214a is pressed, display unit 131 displays screen P215.

Screen P215 shows a picture and an instruction on how to remove the container of the hemolyzer from the tube. Also, screen P215 shows Complete button P215a. When Complete button P215a is pressed, display unit 131 displays screen P216. Screen P216 shows a description to discharge the liquid. In addition, the liquid is discharged from specimen analyzer 100. Thereafter, display unit 131 displays screen P217.

Screen P217 shows a picture and an instruction on how to remove the container of the waste liquid from the tube. Also, screen P217 shows Complete button P217a. When Complete button P217a is pressed, display unit 131 displays screen P218. Screen P218 shows a description that shutdown is in progress. Thereafter, display unit 131 displays screen P219.

Screen P219 shows a picture and an instruction on how to power off specimen analyzer 100. Thereafter, the user powers off.

(Outputting of Analysis Results)

In the example illustrated in FIG. 2, analysis unit 120 perform analysis on seventeen analysis items in total, eight measurement items plus nine analysis items, as described above. In the embodiment, controller 140 performs control of causing print unit 135 to print analysis results 102, and prohibiting display unit 131 from displaying analysis results 102. Thus, as a result of analysis operations of specimen analyzer 100, the user obtains printed sheet 300 being print sheet 136 on which analysis results 102 are written, as illustrated in FIG. 49. This makes it possible to reliably grasp analysis results 102 by merely taking a look at printed sheet 300 because analysis results 102 are not displayed on display unit 131 but collectively outputted on printed sheet 300. Hence, it is possible to reliably report analysis results 102 by merely submitting only the printed sheet of analysis results 102 to the ordering doctor or the like.

In the example of FIG. 49, printed on printed sheet 300 are facility information 301, apparatus information 302, date information 303, operator information 304, subject information 305, subject attribute information 306, result displaying section 307, message section 308, and reference value information 309. Note that although printed sheet 300 is separated for convenience in FIG. 49, the separated portions are actually connected, and printed sheet 300 is one piece of print sheet 136 on which printing has been performed.

Facility information 301 includes information on the name and the address of the facility such as a hospital where specimen analyzer 100 is installed.

Apparatus information 302 is information for identifying specimen analyzer 100 which performed analysis. Apparatus information 302 includes, for example, the model, the name, and the serial number of the apparatus.

Date information 303 is information for identifying the time point at which analysis was performed. Date information 303 includes the analysis date. In FIG. 49, date information 303 includes the analysis time in addition to the analysis date.

Operator information 304 is ID information for identifying the operator who operated specimen analyzer 100. Operator information 304 is not particularly limited, and is represented by three alphabetical letters, for example.

Subject information 305 is ID information for identifying the subject from which specimen 101 is collected. Subject information 305 is represented by a seven-digit number, for example.

Subject attribute information 306 is information on the subject from which specimen 101 is collected, and shows the characteristics and nature of the subject. Preferable as subject attribute information 306 is information useful for a diagnosis based on analysis results 102. Subject attribute information 306 includes at least one of the date of birth, age, and sex, for example. It is possible to grasp the age of the subject using the date of birth. Subject attribute information 306 may be an age, or information on the corresponding one of the age sections. There is a case where the criteria for a diagnosis based on analysis results 102 differ depending on the sex, in addition to the age. Hence, subject attribute information 306 may include sex. Furthermore, subject attribute information 306 may include body information such as the height and the weight of the subject.

Result displaying section 307 is an area where analysis results 102 are printed. Analysis results 102 include component amount 102*a*. In addition, if analysis results 102 include an error, analysis results 102 include information 102*b* indicating the type of the abnormality. As illustrated in FIG. 49, regarding multiple analysis items, print unit 135 prints analysis results 102 for each of the analysis items. Regarding each analysis item, one line of result displaying section 307 is assigned one item. To be more specific, in each analysis item of result displaying section 307, the item name, component amount 102*a*, and information 102*b* indicating the type of the abnormality (flag) are displayed in sequential order from left.

Information 102*b* indicating the type of the abnormality is printed to notify the user of the type of the abnormality when one or more of analysis results 102 are outside normal range, or when there is a predetermined analysis result error. If analysis results 102 include an abnormal value, controller 140 prints information 102*b* indicating the type of the abnormality as analysis results 102. Determination as to whether or not the results are normal or erroneous is made based on the numerical ranges for analysis result determination.

In the example of FIG. 50, for example, as information 102*b* indicating the type of the abnormality, print unit 135 prints information 102*b* indicating the type of the abnormality if analysis results 102 includes an abnormal value. Information 102*b* indicating the content of the error includes information 314 indicating a first error showing that component amount 102*a* is included in a first abnormal ranges 372 (see FIG. 53), and information 315 indicating a second error showing that component amount 102*a* is included in a second abnormal range 373 (see FIG. 53). Information 314 indicating a first error can include an indicator indicating a high value (High) and an indicator indicating a low value (Low) for each of analysis results 102. Information 315 indicating a second error can include an indicator indicating an erroneously high value (ALERT H) and an indicator indicating an erroneously low value (ALERT L), for example. This makes it possible to distinguish and grasp, on the basis of the type of information 102*b* indicating the type of the abnormality, whether the component amount 102 a is a relatively mild abnormality corresponding to first abnormal range 372 or a relatively serious abnormality corresponding to second abnormal range 373.

If a certain abnormal value included in analysis results 102 is within a preset predetermined numerical range, controller 140 excludes the predetermined abnormal value in analysis result 102 from the content to be printed. An embodiment of displaying result displaying section 307 is described later.

In FIG. 49, displayed in message section 308 is a predetermined message to the user in a predetermined case. The predetermined message includes message 311 prompting further testing. Thus, message 311 prompting further testing allows the user to propose to the patient that he/she have a detailed examination at, for example, a specialized medical facility, enabling an appropriate diagnosis based on more appropriate analysis results. Moreover, it is possible to seek instructions of the ordering doctor or the like even if a non-expert staff member does not understand the content of analysis results 102. Furthermore, the predetermined message includes, for example, message 312 recommending the user to act immediately. If analysis results 102 have no particular problem, no message is displayed in message section 308.

The intention of reference value information 309 is to provide information for evaluating analysis results 102 to the user. Thus, in addition to analysis results 102, print unit 135 prints reference value information 309 to evaluate analysis results 102. Analysis result 102 of each analysis item has a numerical range considered a normal range. Reference value information 309 of FIG. 49 is information on numerical ranges indicating normal ranges 371 of analysis results 102. The normal range for each analysis item differs depending on subject attribute information 306 such as the age of the subject. In light of this, in FIG. 49, reference value information 309 possesses several types depending on subject attribute information 306 on the subject from which specimen 101 is collected. Print unit 135 prints: subject attribute information 306: and reference value information 309 corresponding to subject attribute information 306 out of several types of reference value information 309.

As described above, in the example of FIG. 49, in addition to analysis results 102, print unit 135 prints the analysis date, operator information 304 on the operator who performed analysis, and subject attribute information 306 on the subject from which the specimen is collected.

The information above is printed on the same surface of a single piece of print sheet 136. To be more specific, print unit 135 prints analysis results 102, subject attribute information 306, reference value information 309, and, if necessary, the predetermined message on the same surface of a single piece of print sheet 136. In the example of FIG. 49, all information to be printed is printed on the same surface of a single piece of print sheet 136.

(Output Rules and Display Embodiment of Analysis Results on Printed Sheet)

Subsequently, output rules and a display embodiment in result displaying section 307 of printed sheet 300 are described.

Controller 140 determines whether or not analysis results 102 can be outputted depending on component amount 102a as analysis results 102. If component amount 102a falls within a predetermined numerical value range, controller 140 prohibits outputting of component amount 102a to printed sheet 300. Memory 142 of controller 140 stores data of numerical ranges for analysis result determination.

<Predetermined Numerical Value Range>

As illustrated in FIG. 51, controller 140 determines whether or not component amount 102a included in analysis result 102 is a numerical value deemed to be reliable for the analysis depending on whether or not the component amount is within predetermined numerical value range 350.

FIG. 52 illustrates an example of predetermined numerical value range 350. Predetermined numerical value range 350 (see FIG. 52) are each a numerical range considered reliable enough for analysis itself by analysis unit 120. Predetermined numerical value range 350 are each a numerical range which surely has reproducibility, accuracy, linearity, etc. of analysis results 102 of specimen analyzer 100 within a predetermined range, and is a numerical range set as the specifications of specimen analyzer 100. Determination reference value 360 is set within predetermined numerical value range 350. This makes it possible to cause it not to provide certain abnormal component amount 102a to the user based on the comparison results between component amount 102a and determination reference value 360 even in a case where component amount 102a within predetermined numerical value range 350 is determined to be reliable for the analysis.

In the example of FIG. 52, predetermined numerical value range 350 are each a linearity guarantee range for specimen analyzer 100. To be more specific, analysis unit 120 outputs analysis results proportional to the number and the concentration of the target components in specimen 101. Here, the linearity guarantee range is a range where the analysis results match the line of proportionality within a predetermined range. In other words, the linearity guarantee range may be referred to as a measurable range for analysis unit 120. Out of the analysis items, predetermined numerical value range 350 are set for five measurement items, WBC, RBC, HGB, HCT, and PLT, which are measured by detector 123. Controller 140 performs control of prohibiting an output of component amount 102a which is not within predetermined numerical value range 350 relating analysis reliability among analysis results 102. More specifically, regarding the five measurement items, when component amount 102a outside the numerical ranges illustrated in FIG. 52 is obtained as analysis results 102, controller 140 prohibits the outputting of component amount 102a as a measurement error.

In the example of FIG. 51, even in the case of component amount 102a within predetermined numerical value range 350, controller 140 performs control of prohibiting an output when component amount 102a includes a predetermined abnormal value. Regarding component amount 102a within predetermined numerical value range 350, controller 140 prohibits an output in a case where component amount 102a exceeds determination reference value 360 indicating a predetermined abnormality of the specimen, and controller 140 performs control of permitting an output in a case where component amount 102a does not exceed determination reference value 360.

Figure 53:
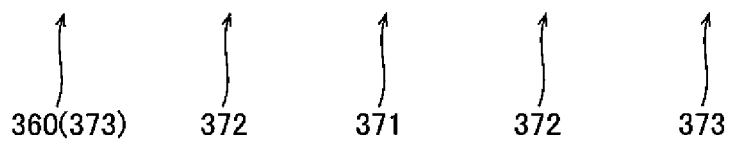
FIG. 53 is a diagram for explaining numerical ranges for evaluating analysis results for an infant.
Figure 55:
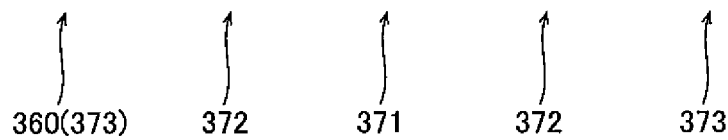
FIG. 55 is a diagram for explaining numerical ranges for evaluating analysis results for an adult.

First, regarding component amount 102a within predetermined numerical value range 350, analysis unit 120 performs analysis based on the numerical ranges for analysis result determination illustrated in FIG. 53 to FIG. 55. To be more specific, predetermined numerical value range 350 include normal ranges (reference ranges) 371 indicating normal values, first abnormal ranges 372 wider than corresponding normal ranges 371, and second abnormal ranges 373 wider than first abnormal ranges 372. In the embodiment, determination reference value 360 is set as second abnormal range 373. This makes it possible to output analysis results 102 of normal range 371 and first abnormal ranges 372 to the user. It is possible to perform control of determining whether to provide the user with component amount 102a whose analysis results 102 belong to second abnormal ranges 373 based on the comparison results between component amount 102a and determination reference value 360. Thus, without negatively affecting the convenience of the analyzer, it is possible to avoid the diagnosis of a particular disease by use of analysis results 102 determined to have certain abnormality based on the comparison results between component amount 102a and determination reference value 360.

<Normal Range>

Controller 140 outputs analysis results 102 included in normal ranges 371 illustrated in FIG. 53 to FIG. 55. In the example of printed sheet 300 illustrated in FIG. 50, for instance, the value of MCH (29.8 [pg]) falls within the normal range of an adult (see FIG. 55), and component amount 102a is printed as it is. If analysis results 102 are included in normal ranges 371, this means there is no error. Thus, information 102b indicating the type of the abnormality for the analysis items is not printed.

As illustrated in FIG. 53 to FIG. 55, first abnormal ranges 372 include ranges of low value (Low) and ranges of high value (High). Second abnormal ranges 373 include ranges of erroneously low value (ALERT LOW) and ranges of erroneously high value (ALERT HIGH). To be more specific, first abnormal ranges 372 are ranges indicating minor errors near normal ranges 371, and second abnormal ranges 373 are ranges indicating significant errors further deviating from first abnormal ranges 372.

<First Abnormal Range>

In the example of FIG. 51, in the initial test, controller 140 prohibits the outputting of printed sheet 300 if component amount 102a is included in first abnormal ranges 372. To be more specific, if component amount 102a is included in first abnormal ranges 372, controller 140 does not output printed sheet 300 but causes the user to perform retest on same specimen 101 using abnormal value notification screen P156 (see FIG. 39) for notifying that an abnormal value is included. Thus, in the initial test, all analysis results 102 are prohibited from being outputted if component amount 102a is included in first abnormal ranges 372.

Controller 140 causes printed sheet 300 to output analysis results 102 obtained in retest. If initial analysis results 102 match retested analysis results 102, controller 140 causes print unit 135 to print analysis results 102, and if initial analysis results 102 do not match retested analysis results 102, controller 140 prohibits the printing of mismatched analysis results 102. To be more specific, if component amount 102a of retest is included in first abnormal ranges 372 and if determination results of component amount 102a match those of the initial test, controller 140 permits the outputting of that component amount 102a, and outputs information indicating the type of the abnormality. For example, if component amount 102a of the initial test is included in the range of "Low" and if component amount 102a of retest is included in the range of "Low" as well, the controller outputs information 314 indicating a first error where component amount 102a is included in first abnormal ranges 372, together with component amount 102a.

In the example of printed sheet 300 illustrated in FIG. 50, the value of MCV (81.6 [fL]) corresponds to a low value (see FIG. 55) of an adult, and "Low" information 314 indicating a first error is printed together with analysis results. Note that if the analysis result corresponds to a high value, "High" is printed as information 314 indicating a first error.

If component amount 102a of retest is included in first abnormal ranges 372 and if determination results of component amount 102a do not match those of the initial test, controller 140 prohibits the outputting of that component amount 102a, and outputs information indicating the type of the abnormality. For example, if component amount 102a of the initial test is included in the range of "Low" and if component amount 102a of retest is included in the range of "High," the controller prohibits the outputting of component amount 102a. In this case, as the analysis items, information 314 indicating a first error is printed.

<Second Abnormal Range>

In the example of FIG. 51, component amount 102a included in second abnormal ranges 373, controller 140 perform control of causing component amount 102a to be outputted or not to be outputted based on a comparison result between determination reference value 360 and component amount 102a. In a case where component amount 102a included in second abnormal ranges 373 is outputted, controller 140 causes information 102b indicating the type of the abnormality to be outputted. To be more specific, as illustrated in FIG. 50, controller 140 displays an indicator indicating an erroneously high value (ALERT H) or an indicator indicating an erroneously low value (ALERT L) as information 315 indicating a second error where component amount 102a is included in second abnormal ranges 373.

Determination reference value 360 is a numerical value for determination of the possibility of having a predetermined serious disease. Possible predetermined serious diseases in the blood cell counting apparatus include, for example, leukemia, aplastic anemia, myelodysplastic syndromes, paroxysmal nocturnal hemoglobinuria, systemic lupus erythematosus, malignant lymphoma, disseminated intravascular coagulation, thrombotic thrombocytopenic purpura, hypersplenism, megaloblastic anemia, sepsis, tuberculosis, sarcoidosis, hemangioma, infectious diseases, and congenital thrombocytopenia. This makes it possible to avoid providing the user with abnormal component amount 102a as analysis results 102 which indicates that the subject is suspected to have a predetermined serious disease that could lead to a serious situation when inappropriately diagnosed or treated. For this reason, it is possible to avoid a potential inappropriate diagnosis and treatment of a predetermined serious disease by use of analysis results 102 including abnormal component amount 102a.

Determination reference value 360 is set in second abnormal range 373. Determination reference value 360 is set within a range of predetermined erroneously low value. In the example of FIG. 53 to FIG. 55, each of determination reference value 360 is set within a range of erroneously low value (ALERT LOW) of corresponding one of second abnormal ranges 373 set for at least one analysis item of white blood cell count (WBC), hemoglobin concentration (HGB), hematocrit value (HCT), and platelet count (PLT). White blood cell count is related to an immune function, hemoglobin concentration and hematocrit value is related to an oxygen carrying function, and platelet count is related to a coagulation function. A wrong diagnosis is not permitted because the abnormally low values for these analysis items concern the sustainment of life. For this reason, when determination reference value 360 is set particularly for the abnormally low values for the analysis items of white blood cell count, hemoglobin concentration, hematocrit value, and platelet count, it is possible to eliminate the risk of a wrong diagnosis based on analysis results 102 in the case of abnormally low values for particularly important analysis items.

In FIG. 53 to FIG. 55, determination reference value 360 is set as an upper limit value of erroneously low value (ALERT L) of each of white blood cell count, hemoglobin concentration, hematocrit value, and platelet count. More specifically, in examples in FIG. 53 to FIG. 55, determination reference value 360 of white blood cell count (WBC) is set to "2.9 ($\times 10^3$/µL)", determination reference value 360 of hemoglobin concentration (HGB) is set to "9.9 (g/dL)", determination reference value 360 of the hematocrit value (HCT) is set to "24.9(%)" and determination reference value 360 of the platelet number (PLT) is set to "99 ($\times 10^3$/µL)". Therefore, a numerical value within the predetermined numerical range 350 (see FIG. 52) and lower than determination reference value 360 corresponds to erroneously low value (ALERT L) in second abnormal range 373.

Thus, if component amount 102a is included in a range of erroneously low value (ALERT L) below determination reference value 360, based on a comparison result between reference value 360 and component amount 102a, controller 140 prohibits the outputting of component amount 102a. In a case where controller 140 causes component amount 102a not to be outputted on the basis of a comparison with determination reference value 360, controller 140 causes output unit 130 to output information 102b indicating the type of the abnormality of specimen 101. To be more specific, if component amount 102a is included in a range of erroneously low value (ALERT L), controller 140 prints information 315 indicating a second error (ALERT L) being an erroneously low value. This makes it possible for the user to grasp the type of the abnormality, even without expertise on analysis results 102, with information 102b indicating the type of the abnormality is outputted. In addition, since component amount 102a is not outputted, it is possible to bring the ordering doctor or the like to attention by use of information 102b indicating the type of the abnormality while reliably eliminating the risk of a wrong diagnosis or wrong treatment based on component amount 102a.

If component amount 102a is included in a range of erroneously high value (ALERT H), controller 140 permits the outputting of component amount 102a. If component amount 102a is included in a range of erroneously high value (ALERT H), controller 140 prints information 315 indicating a second error being an erroneously high value (ALERT H).

For example, in the example of printed sheet 300 illustrated in FIG. 50, the value of HGB (24.3 [g/dL]) corresponds to an erroneously high value of an adult, and "ALERT H" information 315 indicating a second error is printed together with component amount 102a.

On the other hand, in the example of printed sheet 300 illustrated in FIG. 50, component amount 102a is not printed for WBC and PLT. This is because component amount 102a of WBC and PLT falls within a range of erroneously low value (ALERT L) lower than determination reference value 360 (see FIG. 55). In the example of FIG. 50, "ALERT L" information 315 indicating a second error is printed for the analysis items of WBC and PLT. Thus, it is possible to know which analysis items fall within determination reference value 360 even though component amount 102a is not outputted.

In a case where component amount 102a is not outputted based on a comparison with determination reference value 360, controller 140 causes output unit 130 to output substitute indication 313 substituting for component amount 102a. Thus, even in a case where component amount 102a is not outputted based on a comparison with determination reference value 360, it is possible to let the user to recognize that certain analysis results 102 are obtained by using substitute indication 313. Hence, the user does not erroneously think that analysis has not been performed for a reason, unlike the case of simply excluding a predetermined abnormal value.

In the example of FIG. 50, numerical information WBC and PLT within determination reference value 360 is printed in the form of substitute indication 313 "****." Note that any display embodiment of substitute indication 313 is possible as long as it can be distinguished from component amount 102a. Thus, substitute indication 313 is preferably a character other than a number, a symbol, or a plane figure, for example. Controller 140 prints information 102b indicating the type of the abnormality together with substitute indication 313. This makes it possible to let the ordering doctor recognize that component amount 102a is not outputted on the basis of a comparison with determination reference value 360 by using information 102b indicating the type of the abnormality even in a case where substitute indication 313 substitutes for component amount 102a, thereby calling the ordering doctor's attention.

As described above, if component amount 102a is included in first abnormal ranges 372 or second abnormal ranges 373, controller 140 outputs information 102b indicating the type of the abnormality as analysis results 102. Controller 140 prohibits the outputting of component amount 102a within a range of erroneously low value (ALERT L) lower than determination reference value 360, and permits the outputting of information 102b indicating the type of the abnormality. It is possible for the user to grasp the type of the abnormality even without expertise on analysis results 102 in a case where information 102b indicating the type of the abnormality is outputted when component amount 102a belongs to first abnormal range 372 or second abnormal range 373. In addition, since it is prohibited to output component amount 102a, which is an abnormally low value, lower than determination reference value 360 and it is permitted to output information 102b indicating the type of the abnormality, it is possible to eliminate the risk of a wrong diagnosis or wrong treatment based on component amount 102a and to bring the ordering doctor or the like to attention by use of information 102b indicating the type of the abnormality.

On the other hand, if component amount 102a is not a numerical value deemed to be reliable for the analysis, controller 140 causes output unit 130 to output substitute indication substituting for component amount 102a instead of outputting information 102b indicating the type of the abnormality of specimen 101. In other words, if component amount 102a is outside predetermined numerical value range 350 (see FIG. 52), controller 140 causes component amount 102a outside predetermined numerical value range 350 to be substituted with substitute indication 313 and causes output unit 130 to output substitute indication 313, and prohibits the outputting of information 102b indicating the type of the abnormality. To be more specific, if component amount 102a falls within none of normal ranges 371, first abnormal ranges 372, and second abnormal ranges 373 described above, and is outside the linearity guarantee ranges, the numerical information is substituted for substitute indication 313 on printed sheet 300. Information indicating the type of the abnormality such as information 314 or 315 is not printed. By using information 102b indicating the type of the abnormality, this makes it possible in a distinguishable manner to know whether an analysis error has occurred in which component amount 102a is outside predetermined numerical value range 350 or component amount 102a is not outputted as a result of the comparison between component amount 102a and determination reference value 360, even when substitute indication 313 is substituted for component amount 102a.

In the example of FIG. 50, controller 140 causes output unit 130 to output an item name of a component type in a condition in which controller 140 prohibits output unit 130 from outputting component amount 102a as a result of the comparison between component amount 102a and determination reference value 360. This makes it possible for the user to recognize for which component item component amount 102a is prohibited from being outputted because the item name of the component type is outputted even when component amount 102a is prohibited from being outputted. When excluding a predetermined abnormal value from the content to be printed, print unit 135 prints substitute indication 313 in place of the predetermined abnormal value.

Note that in the example of FIG. 51, the case where component amount 102a is not outputted for the analysis items other than the measurement items includes the case of a fractionation error of the analysis results. In the case of a fractionation error, controller 140 prohibits the outputting of component amount 102a, and outputs information 102b indicating the type of the abnormality corresponding to the type of the fractionation error. Information 102b indicating the type of the abnormality corresponding to the type of the fractionation error includes "WBC," "RBC," "PLT," "WBC/PLT," and "WBC Diff". FIG. 50 illustrates an example where WBC Diff is displayed, and "WBC," "RBC," "PLT," and "WBC/PLT" are also displayed in the same manner.

"WBC" is printed if the number of particles of upper discriminator value or lower discriminator value is erroneously high in the particle size distribution of white blood cells. The discriminator value is a value for distinguishing the distribution of white blood cells from noise components called ghost. "RBC" is printed if the number of particles of upper discriminator value or lower discriminator value is erroneously high in the particle size distribution of red blood cells, if it is impossible to analyze red blood cell distribution width (RDW-SD and RDW-CV), or if the particle size distribution of red blood cells is bimodal. "PLT" is printed if the number of particles of upper discriminator value or lower discriminator value is erroneously high in the particle size distribution of platelets, or if it is impossible to analyze red blood cell distribution width (RDW-SD and RDW-CV). "WBC/PLT" is printed if the number of particles having a predetermined value or less is erroneously high in the particle size distribution of white blood cells. In the particle size distribution of white blood cells, "WBC Diff" is printed in any of the cases where it is impossible to fractionate into small-sized white blood cells and medium-sized white blood cells, where the discriminator value for fractionating into small-sized white blood cells and medium-sized white blood cells is high, where it is impossible to fractionate into medium-sized white blood cells and large-sized white blood cells, or where the discriminator value for fractionating into medium-sized white blood cells and large-sized white blood cells. In the cases of these fractionation errors, controller 140 causes component amount 102a to be substituted with a substitute indication.

As illustrated in FIG. 50, in a case where component amount 102a for each of a plurality of component types is a numerical value deemed to be reliable for the analysis, controller 140 causes, for each of the plurality of component types, output unit 130 to output or not to output component amount 102a based on the comparison result between component amount 102a and its corresponding determination reference value 360. In a case where component amount 102a outside the linearity guarantee range is obtained or component amount 102a of "ALERT L" is obtained for any of the analysis items, other analysis items for which printable numerical information 102a is obtained are printed. This makes it possible to avoid providing the user with component amount 102a which should not be outputted among the plurality of component types to be analyzed and to provide the user with component amount 102a which can be outputted based on the comparison results between component amount 102a and determination reference value 360. For this reason, it is possible to provide more analysis results 102 compared to the case where component amounts 102a for all component types are not provided when component amount 102a is obtained for a certain component type which should not be outputted. Hence, convenience of the apparatus can be improved.

(Age Section)

FIG. 53 to FIG. 55 illustrate data examples of numerical ranges for analysis result determination, for each of the age sections. As examples of age sections, FIG. 53 illustrates an infant at the ages of two to eleven, FIG. 54 illustrates a youth at the ages of twelve to twenty, and FIG. 55 illustrates an adult at the ages of twenty one or more. The number of sections may be other than three.

In the examples of FIG. 53 to FIG. 55, out of normal ranges 371, first abnormal ranges 372, and second abnormal ranges 373, which are included in predetermined numerical value range 350, at least normal ranges 371 differ depending on the age sections. Controller 140 calculates the age of the subject from subject attribute information 306, and obtains the numerical ranges of the age section corresponding to the calculated age. Then, when component amount 102a is obtained for each of the analysis items, controller 140 analyzes which of normal ranges 371, first abnormal ranges 372, and second abnormal ranges 373, component amount 102a falls within, based on the numerical ranges of the age section to which the subject belongs.

In addition, controller 140 prints normal ranges 371 of the age section to which the subject belongs on printed sheet 300 as reference value information 309. In the example of FIG. 49, it is possible to know from subject attribute information 306 (born in 1965) that the subject is an adult at the age of twenty one or more as of date information 303. Thus, FIG. 55 illustrates normal ranges 371 of the age section of an adult printed as reference value information 309. Reference value information 309 is printed for each of the analysis items. Here, in FIG. 53 to FIG. 55, determination reference value 360 of the numerical ranges of "ALERT L" is the same regardless of the age section. However, determination reference value 360 may be different for each age section.

(Predetermined Message)

Subsequently, the predetermined message printed on printed sheet 300 is described. In the example of FIG. 49, if component amount 102a is not outputted on the basis of the comparison with determination reference value 360, controller 140 causes output unit 130 to output the predetermined message. This makes it possible to notify the user of helpful information or a recommended measure if component amount 102a is not outputted. In particular, since output is performed in the form of a message, not of e.g. a sign indicating an abnormal value, it is possible for the user to more reliably grasp information that an abnormal value of great importance is obtained or information on how to deal with analysis results 102 even when a non-expert staff member uses the analyzer.

If component amount 102a is within second abnormal ranges 373, controller 140 prints message 311 prompting further testing. To be more specific, if there is component amount 102a corresponding to an erroneously high value (ALERT H) or an erroneously low value (ALERT L) lower than determination reference value 360 for any of the analysis items, message 311 prompting further testing is printed. In FIG. 49, as an example, the message "RECOMMEND FURTHER TESTING" is printed.

Also, if component amount 102a is within second abnormal ranges 373, controller 140 further prints message 312 recommending immediate action. In FIG. 49, as an example, message 312 "Potential ALERT Value should be acted upon IMMEDIATELY" is printed.

Also, component amount 102a of all analysis items is within normal ranges 371, controller 140 does not display message 311 and message 312. Controller 140 may display a message in message section 308 based on display conditions for other messages. For example, regarding component amount 102a of three analysis items of WBC, RBC, and HGB, if those three items are not erroneously low values (ALERT L), but if all of those three items are low values (Low), controller 140 prints message 311 prompting further testing but does not print message 312.

As described above, controller 140 controls the print content of analysis results 102. "END REPORT" printed on the end of printed information shows the end of printed sheet 300. Note that memory 142 of controller 140 stores data necessary to output analysis results 102 such as predetermined numerical value range 350 and determination reference value 360, information 102b indicating the type of the abnormality, and message 311 and message 312.

(Modified Example of Determination Reference Value)

FIG. 53 to FIG. 55 illustrates an example where determination reference value 360 is set to an upper limit of abnormally low value (ALERT L) within second abnormal ranges 373. However, all of second abnormal ranges 373 may be set to determination reference value 360, for example. To be more specific, determination reference value 360 may be set also to a lower limit of abnormally high value (ALERT H), in addition to the upper limit of abnormally low value (ALERT L). In the example of FIG. 53 to FIG. 55, for example, the numerical value of the lower limit of the abnormally high value (ALERT H) range for white blood cell count (WBC) "50.1 (×10³/μL)" and the numerical value of the lower limit of the abnormally high value (ALERT H) range for hemoglobin concentration (HGB) "24.1 (g/dL)" may be set as determination reference value 360. In this case, determination reference value 360 is set to both the abnormally low value range (ALERT L) and the abnormally high value range (ALERT H).

FIG. 56 illustrates a printing example where reference value 360 is set to both abnormally low values (ALERT L) and an abnormally high value (ALERT H). In the example of FIG. 50, component amount 102a is printed for the HGB item corresponding to an abnormally high value (ALERT H). In the example of FIG. 56, on the other hand, the outputting of component amount 102a is prohibited for the HGB item corresponding to an abnormally high value (ALERT H), and substitute indication 313 is printed instead of component amount 102a. In FIG. 56, substitute indication 313 is substituted for component amount 102a corresponding to an item being an abnormally low value. "ALERT L" is assigned to an item of abnormally low value as information 315 indicating a second error, and "ALERT H" is assigned to an item of abnormally high value (ALERT H) as information 315 indicating a second error. Thus, it is possible to recognize which of an abnormally low value and abnormally high value component amount 102a is even when the numerical information is not printed.

(Modified Example of Printing Embodiment)

The example of FIG. 50 and the example of FIG. 56 illustrate examples of substituting substitute indication 313 for component amount 102a exceeding determination reference value 360 and printing the symbol. However, the configuration may be such that component amount 102a equal to determination reference value 360 is not displayed, for example. The example of FIG. 57 illustrates an example where component amount 102a equal to an abnormally low value or an abnormally high value exceeding determination reference value 360 is not displayed when both abnormally low values and an abnormally high value are set as determination reference value 360. In FIG. 57, controller 140 excludes, from printing, non-displayed component amount 102a together with the item names of the analysis items. Thus, information 102b indicating the type of the abnormality is not printed either. For this reason, in the example of FIG. 57, the analysis items themselves of WBC, HGB, and PLT with component amount 102a equal to determination reference value 360 have been excluded from result displaying section 307.

On the other hand, also in the example of FIG. 57, if there is non-displayed component amount 102a, controller 140 prints message 311 prompting further testing in message section 308. In the example of FIG. 57, message 312 recommending immediate action is also printed. The user is allowed to recognize there is an error in analysis results 102 by message 311 prompting further testing and message 312 recommending immediate action even in the case where component amount 102a equal to determination reference value 360 is deleted together with the analysis items in result displaying section 307.

(Modified Example of Output Rules for Analysis Result on Printed Sheet)

The example of FIG. 51 illustrates an example where in the initial test, controller 140 prohibits the outputting of printed sheet 300 if component amount 102a is included in first abnormal ranges 372, and performs retest. However, printed sheet 300 may be outputted in the initial test. In the initial test, if component amount 102a is included in first abnormal ranges 372, controller 140 may cause component amount 102a to be substituted with substitute indication 313 for outputting, or controller 140 may cause component amount 102a to be removed as a not-displayed item from the print content together with the item names of the analysis items.

FIG. 58 illustrates a modified example of output rules for analysis results 102. In a first modification of FIG. 58, controller 140 permits the outputting of component amount 102a included in normal ranges 371. Controller 140 prohibits the outputting of component amount 102a outside predetermined numerical ranges 350, component amount 102a within first abnormal ranges 372, component amount 102a within second abnormal ranges 373, and component amount 102a in the case of a fractionation error. Controller 140 causes component amount 102a to be substituted with substitute indication 313 as in FIG. 56, where the outputting of the numerical information is prohibited. In the first modification, controller 140 permits the outputting of information 102b indicating the type of the abnormality, out of analysis results 102.

In the case of a second modification of FIG. 58, controller 140 permits the outputting of component amount 102a included in normal ranges 371. Controller 140 prohibits the outputting of component amount 102a outside predetermined numerical ranges 350, component amount 102a within first abnormal ranges 372, component amount 102a within second abnormal ranges 373, and component amount 102a in the case of a fractionation error. Controller 140 does not display component amount 102a on printed sheet 300, where the outputting of the numerical information is prohibited. To be more specific, component amount 102a not within normal ranges 371 is not printed on printed sheet 300 as in FIG. 57. In the second modification, controller 140 also prohibits the outputting of information 102b indicating the type of the abnormality, out of analysis results 102. Thus, in the second modification, when an analysis item having component amount 102a outside normal ranges 371 is obtained, all of its item name, component amount 102a, and information 102b indicating the type of the abnormality are removed from printed sheet 300, and the item itself is not printed.

Additionally, the initial test and the retest are not distinguished in the first modification and the second modification of FIG. 58. To be more specific, in the initial test, if component amount 102a is included in first abnormal ranges 372, the outputting of component amount 102a is prohibited and printed sheet 300 is outputted.

(Error Display of Display Unit)

Subsequently, an error display of display unit 131 is described. If analysis results 102 include an abnormal value, controller 140 causes print unit 135 to print information 102b indicating the type of the abnormality as analysis results 102, and if there is an error with the apparatus other than with analysis results 102, the controller causes display unit 131 to display information indicating there is an error. Analysis results 102 are outputted collectively on printed sheet 300, and display unit 131 displays information other than on analysis results 102. Information displayed by display unit 131 includes information on instructions concerning the series of operations illustrated in FIG. 7 to FIG. 48, and on an apparatus error.

To be more specific, display unit 131 displays information indicating there is an error if there is an error with the apparatus other than with analysis results 102. Thus, print unit 135 prints an error with analysis results 102, and display unit 131 displays an apparatus error. An apparatus error is not printed by print unit 135, but is displayed by display unit 131.

Figure 59:
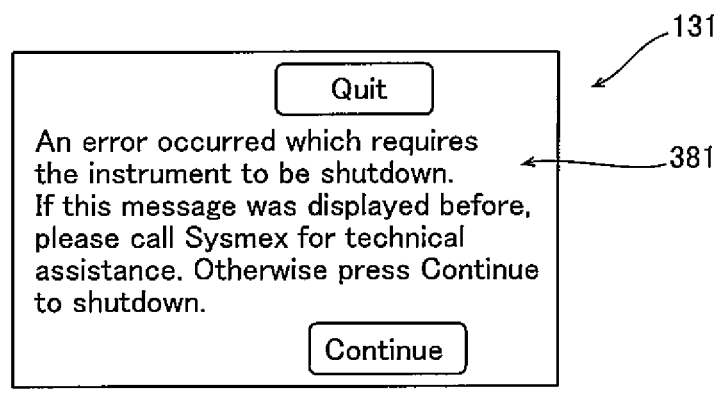
FIG. 59 is a diagram illustrating an example of an error display screen.
Figure 60:
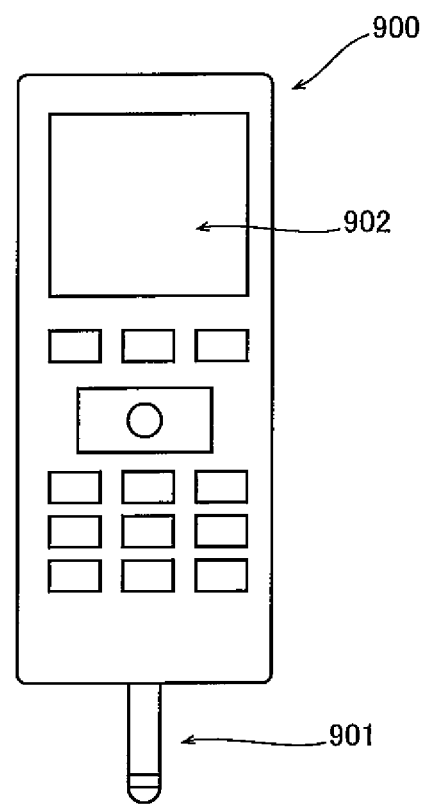
FIG. 60 is a diagram for explaining related art.

Display unit 131 displays information indicating there is an error for at least one of an error with analysis unit 120 and an error with a quality control process of analysis unit 120, for example. In analysis unit 120, when an error occurs in e.g. drive mechanism 122, fluid circuit 124, or detector 123, controller 140 causes display unit 131 to display information 381 indicating there is an error as illustrated in FIG. 59. In addition, in the quality control process, for example, controller 140 causes display unit 131 to display information (screen P117) indicating there is an error illustrated in FIG. 30 when the quality control process fails such as when an analysis result of a QC reagent exceeds a reference range set for the QC reagent.

Note that the embodiments disclosed herein should be considered illustrative and non-limited in all respects. The scope of the invention is given by the scope of claims, not by the description of the embodiments described above, and moreover includes all modifications (modified examples) within the meaning and the scope equivalent to the scope of claims.

The invention claimed is:

1. A specimen analyzer comprising:
an analysis unit comprising one or more detectors which are configured to perform measurement of an amount of a target component in a specimen collected from a subject, the analysis unit configured to generate an analysis result comprising the amount of the target component in the specimen measured by the detectors;
an output unit comprising one or more of a printer, a display, and an external printer; and
a controller comprising a memory recording a program and a processor configured with the program to perform operations comprising:
obtaining the analysis result of the performed measurement of the amount of the target component from the analysis unit;
comparing the amount of the target component with a first numerical value range which is recorded in the memory and defines a range of a guaranteed linearity of an analysis result within a measurable range of the analysis unit;
determining whether the amount of the target component is reliable based on whether the amount of the target component is within the first numerical value range;
comparing the amount of the target component with a set of second numerical value ranges recorded in the memory, in response to determining that the amount of the target component is reliable, wherein the set of second numerical value ranges comprises at least a normal range indicating values for which a level of the amount of the target component is normal, a first abnormal range outside the normal range indicating values for which the level of the amount of the target component is lower or higher than a normal specimen and indicating a first abnormal condition of the subject, and a second abnormal range outside the first abnormal range indicating values for which the level of the amount of the target component is lower or higher than the normal specimen and indicating a second abnormal condition of the subject more serious than the first abnormal condition;
determining whether the amount of the target component is within the normal range, the first abnormal range, or the second abnormal range based on the comparing;
causing the output unit to output the amount of the target component in response to determining that the amount of the target component is within the normal range; and
causing the output unit to output an indication that the amount of the target component is an erroneously high value or an erroneously low value and prohibiting the output unit from outputting the amount of the target component in response to determining that the amount of the target component is within the second abnormal range.

2. The specimen analyzer according to claim 1, wherein the amount of the target component equals a number of target particles in the specimen.

3. The specimen analyzer according to claim 2, wherein the processor is configured with the program to perform operations further comprising causing the output unit to output a substitute indication substituting for the amount of the target component in response to the amount of the target component being within the second abnormal range.

4. The specimen analyzer according to claim 3, wherein the processor is configured with the program to perform operations further comprising causing the output unit to output the substitute indication and information indicating a type of an abnormality of the specimen.

5. The specimen analyzer according to claim 4, wherein in response to determining that the amount of the target component is not reliable, the processor is configured with the program to perform operations further comprising causing the output unit to output the substitute indication substituting for the amount of the target component without outputting the information indicating the type of the abnormality of the specimen.

6. The specimen analyzer according to claim 1, wherein the specimen comprises blood, and
the set of second numerical value ranges are established according to the analysis result of the target component being at least one of a white blood cell count, a hemoglobin concentration, a hematocrit value, and a platelet count.

7. The specimen analyzer according to claim 1, wherein the processor is configured with the program to perform operations further comprising causing the output unit to output information indicating a type of an abnormality of the specimen in response to the amount of the target component being within the second abnormal range.

8. The specimen analyzer according to claim 1, wherein the processor is configured with the program to perform operations further comprising causing the output unit to output a predetermined message in response to the amount of the target component being within the first abnormal range.

9. The specimen analyzer according to claim 8, wherein the predetermined message comprises a message prompting further testing.

10. The specimen analyzer according to claim 1, wherein the processor is configured with the program to perform operations comprising causing the printer to print the analysis result in response to determining that the amount of the target component is within the normal range while prohibiting the display from displaying the amount of the target component in the analysis result which is determined to be within the normal range.

11. The specimen analyzer according to claim 1, wherein
in response to the amount of the target component being within the second abnormal range, the processor is configured with the program to perform operations comprising determining from the second abnormal condition that the subject may have a predetermined disease.

12. The specimen analyzer according to claim 1, wherein
the target component comprises a plurality of target components,
the processor is configured with the program to perform operations comprising:
obtaining an amount of each of the plurality of target components,
causing, for each of the plurality of target components, the output unit to output the amount of the each of the plurality of target components, in response to determining that the amount of the each of the plurality of target components is reliable and within the normal range, and
prohibiting, for each of the plurality of target components, the output unit from outputting the amount of the each of the plurality of target components, in response to determining that the amount of the each of the plurality of target components is reliable and within the second abnormal range to avoid an erroneous diagnosis of the condition of the subject.

13. The specimen analyzer according to claim 1, wherein
in response to the amount of the target component being within the second abnormal range, the processor is configured with the program to perform operations comprising causing the output unit to output a name of the target component.

14. The specimen analyzer according to claim 1, wherein
the specimen comprises blood, and
the processor is configured with the program to perform operations comprising obtaining the number of blood cells and a concentration of a component contained in the blood.

15. The specimen analyzer according to claim 1, wherein the processor is configured with the program to perform operations further comprising:
causing the output unit to output information prompting a retesting on the specimen, in response to the amount of the target component being within the first abnormal range, and
causing the output unit to output the amount of the target component obtained by the retesting, in response to the amount of the target component being within the first abnormal range again.

16. A specimen analysis method performed in a specimen analyzer comprising a processor configured with a program, the method comprising:
analyzing, by the processor, a specimen collected from a subject to obtain an analysis result comprising an amount of a target component in the specimen;
comparing, by the processor, the amount of the target component with a first numerical value range which defines a range of a guaranteed linearity of an analysis result;
determining whether the amount of the target component is reliable based on whether the amount of the target component is within the first numerical value range;
comparing, by the processor, the amount of the target component with a set of second numerical value ranges, in response to determining that the amount of the target component is reliable, wherein the second set of numerical value ranges comprises at least a normal range indicating values for which a level of the amount of the target component is normal, a first abnormal range outside the normal range indicating values for which the level of the amount of the target component is lower or higher than a normal specimen and indicating a first abnormal condition of the subject, and a second abnormal range outside the first abnormal range indicating values for which the level of the amount of the target component is lower or higher than the normal specimen and indicating a second abnormal condition of the subject more serious than the first abnormal condition;
determining, by the processor, whether the amount of the target component is within the normal range, the first abnormal range, or the second abnormal range based on the comparing;
outputting, by the processor, the amount of the target component in response to determining that the amount of the target component is within the normal range; and
outputting, by the processor, an indication that the amount of the target component is an erroneously high value or an erroneously low value and prohibiting, by the processor, outputting the amount of the target component in response to determining that the amount of the target component is within the second abnormal range.

* * * * *